(12) United States Patent
Asterjadhi et al.

(10) Patent No.: US 11,894,929 B2
(45) Date of Patent: Feb. 6, 2024

(54) HYBRID AUTOMATIC REPEAT REQUEST (HARQ) IN A WIRELESS LOCAL AREA NETWORK (WLAN)

(71) Applicant: QUALCOMM Incorporated, San Diego, CA (US)

(72) Inventors: Alfred Asterjadhi, San Diego, CA (US); George Cherian, San Diego, CA (US); Abhishek Pramod Patil, San Diego, CA (US); Lochan Verma, Danville, CA (US); Jialing Li Chen, San Diego, CA (US); Stephen Jay Shellhammer, Ramona, CA (US); Dung Ngoc Doan, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/946,666

(22) Filed: Sep. 16, 2022

(65) Prior Publication Data
US 2023/0020559 A1    Jan. 19, 2023

Related U.S. Application Data

(63) Continuation of application No. 16/917,605, filed on Jun. 30, 2020, now Pat. No. 11,451,341.
(Continued)

(51) Int. Cl.
*H04L 5/00* (2006.01)
*H04L 1/1812* (2023.01)
(Continued)

(52) U.S. Cl.
CPC .......... *H04L 1/1812* (2013.01); *H04L 1/1614* (2013.01); *H04L 1/1621* (2013.01);
(Continued)

(58) Field of Classification Search
CPC ... H04L 1/1812; H04L 1/1614; H04L 1/1621; H04L 1/1819; H04L 1/1896; H04W 84/12
See application file for complete search history.

(56) References Cited

U.S. PATENT DOCUMENTS

| 8,131,295 B2 | 3/2012 | Wang et al. |
| 9,307,419 B1 * | 4/2016 | Singh .................... H04W 24/02 |

(Continued)

FOREIGN PATENT DOCUMENTS

| WO | WO2007092257 A1 | 8/2007 |
| WO | WO2015006640 A1 | 1/2015 |
| WO | WO2018102098 A1 | 6/2018 |

OTHER PUBLICATIONS

U.S. Appl. No. 16/917,543 Office Action, dated Nov. 12, 2021, 25 pages.
(Continued)

*Primary Examiner* — Fahmida S Chowdhury
(74) *Attorney, Agent, or Firm* — Holland & Hart / Qualcomm

(57) ABSTRACT

This disclosure provides systems, methods, and apparatus, including computer programs encoded on computer-readable media, for implementing a hybrid automatic repeat request (HARQ) protocol in a wireless local area network (WLAN). In some aspects, a first WLAN device may transmit a first HARQ frame to a second WLAN device. The first WLAN device may determine whether a first feedback message received from the second WLAN device includes HARQ acknowledgement information or non-HARQ acknowledgment information. The first feedback message may be a HARQ Block Acknowledgement (H-BA) message having a multi-station Block ACK (M-BA) frame format that includes HARQ acknowledgment information. The first WLAN device may transmit a second HARQ frame to the second WLAN device in response to determining the first
(Continued)

feedback message includes the HARQ acknowledgment information. The first WLAN device may transmit a non-HARQ frame in response to determining the first feedback message includes non-HARQ acknowledgement information.

20 Claims, 22 Drawing Sheets

Related U.S. Application Data

(60) Provisional application No. 62/869,512, filed on Jul. 1, 2019, provisional application No. 62/869,496, filed on Jul. 1, 2019.

(51) Int. Cl.
*H04W 74/08* (2009.01)
*H04L 1/1607* (2023.01)
*H04W 80/02* (2009.01)
*H04W 84/12* (2009.01)

(52) U.S. Cl.
CPC .......... *H04L 1/1819* (2013.01); *H04L 5/0055* (2013.01); *H04W 74/0816* (2013.01); *H04W 80/02* (2013.01); *H04W 84/12* (2013.01)

(56) References Cited

U.S. PATENT DOCUMENTS

| | | | | |
|---|---|---|---|---|
| 9,876,614 | B1* | 1/2018 | Sun | H04L 1/1685 |
| 2007/0060146 | A1* | 3/2007 | Won | H04L 5/0053 455/445 |
| 2009/0141673 | A1* | 6/2009 | Hwang | H04L 1/18 370/328 |
| 2010/0074209 | A1* | 3/2010 | Montojo | H04W 72/542 455/501 |
| 2010/0281322 | A1 | 11/2010 | Park et al. | |
| 2011/0286340 | A1* | 11/2011 | Janecek | H04L 1/0036 370/252 |
| 2011/0310809 | A1* | 12/2011 | Nishio | H04L 1/1861 370/329 |
| 2012/0188907 | A1* | 7/2012 | Dayal | H04W 72/1215 370/254 |
| 2014/0126580 | A1 | 5/2014 | Sampath et al. | |
| 2014/0321293 | A1* | 10/2014 | Hwang | H04L 1/1692 370/242 |
| 2015/0222394 | A1* | 8/2015 | Cheng | H04L 5/001 370/280 |
| 2015/0236822 | A1* | 8/2015 | Pirskanen | H04L 1/1864 370/329 |
| 2016/0128060 | A1 | 5/2016 | Azarian et al. | |
| 2017/0230149 | A1* | 8/2017 | Wang | H04L 1/1819 |
| 2017/0310446 | A1* | 10/2017 | Asterjadhi | H04L 1/1685 |
| 2017/0331602 | A1* | 11/2017 | Hugl | H04W 72/1268 |
| 2018/0110076 | A1* | 4/2018 | Ko | H04L 1/1614 |
| 2018/0139012 | A1 | 5/2018 | Hosseini et al. | |
| 2019/0150189 | A1 | 5/2019 | Ghosh et al. | |
| 2020/0275307 | A1* | 8/2020 | Kedem | H04W 28/22 |
| 2021/0006360 | A1 | 1/2021 | Asterjadhi et al. | |
| 2021/0006361 | A1 | 1/2021 | Asterjadhi et al. | |
| 2022/0158771 | A1* | 5/2022 | Pettersson | H04L 1/1614 |

OTHER PUBLICATIONS

U.S. Appl. No. 16/917,605 Office Action, filed Nov. 24, 2021, 15 pages.
International Search Report and Written Opinion—PCT/US2020/040443—ISA/EPO—dated Oct. 22, 2020.

* cited by examiner

1900

1910 — OBTAIN, BY AN APPARATUS OF A SECOND WLAN DEVICE FOR IMPLEMENTING A HARQ PROTOCOL, A FIRST HARQ FRAME FROM A FIRST WLAN DEVICE

1920 — DETERMINE WHETHER TO GENERATE A FIRST FEEDBACK MESSAGE THAT INCLUDES HARQ ACKNOWLEDGEMENT INFORMATION OR NON-HARQ ACKNOWLEDGEMENT INFORMATION BASED, AT LEAST IN PART, ON THE FIRST HARQ FRAME

1930 — RESPONSIVE TO A DETERMINATION TO GENERATE THE FIRST FEEDBACK MESSAGE THAT INCLUDES THE HARQ ACKNOWLEDGEMENT INFORMATION, OUTPUT THE FIRST FEEDBACK MESSAGE INCLUDING THE HARQ ACKNOWLEDGEMENT INFORMATION FOR TRANSMISSION TO THE FIRST WLAN DEVICE

FIGURE 19

HYBRID AUTOMATIC REPEAT REQUEST (HARQ) IN A WIRELESS LOCAL AREA NETWORK (WLAN)

CROSS-REFERENCE TO RELATED APPLICATION

The present application for patent is a Continuation of U.S. patent application Ser. No. 16/917,605 filed Jun. 30, 2020, which claims priority to U.S. Provisional Patent Application No. 62/869,496, filed on Jul. 1, 2019, and U.S. Provisional Patent Application No. 62/869,512, filed on Jul. 1, 2019, assigned to the assignee hereof, and expressly incorporated by reference in its entirety herein.

TECHNICAL FIELD

This disclosure relates generally to the field of wireless communication, and more particularly to implementing hybrid automatic repeat request (HARQ) in a wireless local area network (WLAN).

DESCRIPTION OF THE RELATED TECHNOLOGY

A wireless local area network (WLAN) may be formed by two or more WLAN devices (which may be referred to as stations (STAs)) that share a wireless communication medium using common service settings. One or more of the WLAN devices (which may be referred to as an access point (AP)) may establish the common service settings. An AP is a type of STA that performs a distribution system access function in the WLAN. The basic building block of a WLAN conforming to the Institute of Electrical and Electronics Engineers (IEEE) 802.11 family of standards is a Basic Service Set (BSS), which is managed by an AP. Each BSS is identified by a service set identifier (SSID) that is advertised by the AP. An AP periodically broadcasts beacon frames to enable other STAs within wireless range of the AP to establish or maintain a communication link with the WLAN.

A wireless communication between two WLAN devices (which may be referred to as a sending STA and a receiving STA) may be susceptible to interference or other challenges which impair the wireless communication medium. A wireless transmission from a sending STA may include error checking and redundancy information that enables a receiving STA to discover or correct errors in the wireless transmission. If the errors cannot be corrected, the receiving STA may request the data to be retransmitted by the sending STA. For example, the receiving STA may send a feedback message (including an acknowledgment (ACK) or negative acknowledgment (NACK)) to indicate whether the data was successfully received. The receiving STA and the sending STA may utilize a first retransmission protocol implemented in the WLAN. However, it may be desirable to support additional retransmission protocols.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method performed by an apparatus of a first wireless local area network (WLAN) device for implementing a hybrid automatic repeat request (HARQ) protocol. The method may include outputting a first HARQ frame for transmission to a second WLAN device. The method may include obtaining a first feedback message from the second WLAN device. The first feedback message may indicate whether to enable the HARQ protocol. The method may include determining to enable the HARQ protocol based, at least in part, on the first feedback message indicating to enable the HARQ protocol. The method may include obtaining an indication of an amount of memory available at the second WLAN device for processing HARQ transmissions. The method may include outputting a second HARQ frame for transmission to the second WLAN device based, at least in part, on the amount of memory available at the second WLAN device for processing HARQ transmissions.

In some implementations, the first feedback message obtained from the second WLAN device may be a HARQ Block Acknowledgement (H-BA) message.

In some implementations, the first feedback message may include an indication to enable the HARQ protocol and the indication of the amount of memory available at the second WLAN device for processing HARQ transmissions.

In some implementations, the method may include, prior to transmission of the first HARQ frame, outputting a HARQ request to send (H-RTS) message for transmission to the second WLAN device. The H-RTS message may include a request for the amount of memory available at the second WLAN device for processing HARQ transmissions. The method may include obtaining a HARQ clear to send (H-CTS) message from the second WLAN device in response to transmission of the H-RTS message. The H-CTS message may include the indication of the amount of memory available at the second WLAN device for processing HARQ transmissions.

In some implementations, the first feedback message and the H-CTS message may include the indication of the amount of memory available at the second WLAN device for processing HARQ transmissions.

In some implementations, the method may include outputting the first HARQ frame for transmission to the second WLAN device based, at least in part, on the amount of memory available at the second WLAN device for processing HARQ transmissions indicated by the H-CTS message.

In some implementations, the method may include, prior to transmission of the first HARQ frame, obtaining a management frame from the second WLAN device. The management frame may include the indication of the amount of memory available at the second WLAN device for processing HARQ transmissions.

In some implementations, the method may include, prior to transmission of the first HARQ frame, obtaining a block acknowledgment setup message from the second WLAN device. The block acknowledgment setup message may include the indication of the amount of memory available at the second WLAN device for processing HARQ transmissions.

In some implementations, the method may include, prior to transmission of the first HARQ frame, obtaining a HARQ setup message from the second WLAN device. The HARQ setup message may include the indication of the amount of memory available at the second WLAN device for processing HARQ transmissions.

In some implementations, the first feedback message may be a non-HARQ acknowledgement message. The method may include determining the non-HARQ acknowledgement message indicates to disable the HARQ protocol and enable a non-HARQ protocol. The method may include outputting a non-HARQ frame for transmission to the second WLAN device.

In some implementations, the non-HARQ acknowledgement message may indicate the second WLAN device does not have memory available for processing HARQ transmissions.

In some implementations, the non-HARQ protocol may be an ARQ protocol and the non-HARQ frame may be an ARQ frame.

In some implementations, the method may include determining that the first feedback message obtained from the second WLAN device indicates a maximum number of HARQ transmissions per HARQ transmission opportunity (TXOP).

In some implementations, the method may include determining that the first feedback message obtained from the second WLAN device includes the indication of the amount of memory available at the second WLAN device for processing HARQ transmissions for a single HARQ stream or for multiple HARQ streams.

In some implementations, the first feedback message may be an A-Control message. The A-Control message may include a HARQ status report (HSR) having the indication of the amount of memory available at the second WLAN device for processing HARQ transmissions.

Another innovative aspect of the subject matter described in this disclosure can be implemented in a method performed by an apparatus of a first WLAN device for implementing a HARQ protocol. The method may include determining a HARQ acknowledgement policy for HARQ transmissions in a HARQ transmission opportunity (TXOP). The method may include determining timing information of HARQ transmissions within the HARQ TXOP. The method may include outputting a first HARQ frame for transmission to a second WLAN device. The physical (PHY) layer header of the first HARQ frame may include at least the HARQ acknowledgement policy. The method may include providing signaling from a PHY layer of the first WLAN device to a media access control (MAC) layer of the first WLAN device indicating the timing information of the HARQ transmissions within the HARQ TXOP.

In some implementations, the method may include encoding addressing information for the first HARQ frame, where the encoded addressing information may provide a means for deriving the MAC address of the first WLAN device and the MAC address of the second WLAN device. The PHY layer header of the first HARQ frame may include the encoded addressing information.

In some implementations, the addressing information may include one or more of a receiver identifier, a transmitter identifier, Basic Service Set (BSS) color, and uplink flag.

In some implementations, the method may include determining hashed addressing information by hashing addressing information with at least a portion of a BSS identifier (BSSID) to reduce collisions. The PHY layer header of the first HARQ frame may include the hashed addressing information.

In some implementations, the HARQ acknowledgement policy included in the PHY layer header of the first HARQ frame may indicate whether to enable the HARQ protocol and whether a HARQ Block Acknowledgement (H-BA) message is requested from the second WLAN device.

In some implementations, the HARQ acknowledgement policy may further indicate whether to bypass a MAC layer of the second WLAN device when processing the first HARQ frame.

In some implementations, the method of determining the timing information of HARQ transmissions within the HARQ TXOP may include determining, by the PHY layer of the first WLAN device, start and end times of each of the HARQ transmissions within the HARQ TXOP to determine intermediate time periods between the HARQ transmissions within the HARQ TXOP.

In some implementations, the first HARQ frame may be associated with a first HARQ stream. The method may include, on detecting a low latency communication associated with a different stream, determining, by the MAC layer of the first WLAN device, intermediate time periods between the HARQ transmissions within the HARQ TXOP for transmitting the low latency communication based, at least in part, on the timing information of the HARQ transmissions within the HARQ TXOP.

In some implementations, the method may include outputting the low latency communication for transmission during one of the intermediate time periods between the HARQ transmissions, and determining whether to delay one or more of the HARQ transmissions of the HARQ TXOP.

In some implementations, the method may include outputting an H-RTS message for transmission to the second WLAN device, the H-RTS message including a receiver address (RA) and a transmitter address (TA).

In some implementations, the method may include determining a HARQ feedback message is not obtained in response to transmission of the first HARQ frame, and providing signaling from the PHY layer to the MAC layer of the first WLAN device to activate an acknowledgement timeout and implement an exponential back-off operation.

In some implementations, the method may include determining a non-HARQ feedback message is obtained in response to transmission of the first HARQ frame. The method may include determining the non-HARQ feedback message includes at least one member selected from the group consisting of a frame duration indicator, a modulation and coding scheme (MCS) indicator, a number of spatial streams (NSS) indicator, a bandwidth (BW) indicator, a guard interval (GI) indicator, a target transmit time, a target retransmission channel, and a transmit power indicator. The method may include outputting a retransmission frame for transmission to the second WLAN device based on the at least one member selected from the group consisting of the frame duration indicator, the MCS indicator, the NSS indicator, the BW indicator, the GI indicator, the target transmit time, the target retransmission channel, and the transmit power indicator.

Another innovative aspect of the subject matter described in this disclosure can be implemented in a method performed by an apparatus of a second WLAN device for implementing a HARQ protocol. The method may include determining an amount of memory available at the second WLAN device for processing HARQ transmissions associated with a first WLAN device, and determining whether to enable the HARQ protocol with the first WLAN device. The method may include, responsive to determining to enable the HARQ protocol, outputting a HARQ feedback message for transmission to the first WLAN device indicating to enable the HARQ protocol, providing an indication of the amount of memory available at the second WLAN device for processing HARQ transmissions, and obtaining a first HARQ frame from the first WLAN device, where the first HARQ frame may be generated by the first WLAN device based, at least in part, on the amount of memory available at the second WLAN for processing HARQ transmissions.

In some implementations, the HARQ feedback message may be an H-BA message.

In some implementations, the HARQ feedback message may include an indication to enable the HARQ protocol and the indication of the amount of memory available at the second WLAN device for processing HARQ transmissions.

In some implementations, the method may include obtaining an H-RTS message from the first WLAN device, where the H-RTS message may include a request for the amount of memory available at the second WLAN device for processing HARQ transmissions. The method may include outputting an H-CTS message for transmission to the first WLAN device in response to obtaining the H-RTS message, where the H-CTS message may include the indication of the amount of memory available at the second WLAN device for processing HARQ transmissions.

In some implementations, the method may include outputting a management frame for transmission to the first WLAN device, where the management frame may include the indication of the amount of memory available at the second WLAN device for processing HARQ transmissions.

In some implementations, the method may include outputting a block acknowledgment setup message for transmission to the first WLAN device, where the block acknowledgment setup message may include the indication of the amount of memory available at the second WLAN device for processing HARQ transmissions.

In some implementations, the HARQ feedback message may be an A-Control message, where the A-Control message may include an HSR having the indication of the amount of memory available at the second WLAN device for processing HARQ transmissions In some implementations, the HARQ feedback message may be an H-BA message, where the H-BA message may include an indication of a maximum number of HARQ transmissions per HARQ TXOP.

In some implementations, the method of determining the amount of memory available at the second WLAN device for processing HARQ transmissions may include the amount of memory available at the second WLAN device for processing HARQ transmissions for a single HARQ stream or for multiple HARQ streams.

In some implementations, the method of determining whether to enable the HARQ protocol with the first WLAN may be based, at least in part, on the amount of memory available at the second WLAN device for processing HARQ transmissions.

In some implementations, the method may include obtaining a second HARQ frame from the first WLAN device, where the second HARQ frame may be a first physical convergence layer protocol data unit (PPDU) including at least a first media access control protocol data unit (MPDU). The method of determining whether to enable the HARQ protocol with the first WLAN device may be based, at least in part, on whether at least a portion of the first MPDU is successfully received by the second WLAN device.

In some implementations, the method of determining whether to enable the HARQ protocol with the first WLAN device may include obtaining a second HARQ frame from the first WLAN device, where the second HARQ frame may be a PPDU, determining a reception failure of one or more MPDUs of the PPDU, determining to disable the HARQ protocol with the first WLAN device based on the reception failure, and outputting a non-HARQ feedback message for transmission to the first WLAN device in response to determining to disable the HARQ protocol.

In some implementations, the non-HARQ feedback message may include a negative acknowledgement (N-ACK) message, where the N-ACK message may indicate to the first WLAN device to disable the HARQ protocol.

In some implementations, the N-ACK message may further indicates to the first WLAN device one or more parameters to use for generating a retransmission PPDU.

In some implementations, the method may include determining at least one member selected from the group consisting of a target transit time, a target retransmission channel, and a transmit power for a retransmission PPDU. The non-HARQ feedback message may include the at least one member selected from the group consisting of the target transit time, the target retransmission channel, and the transmit power for the retransmission PPDU.

In some implementations, the method may include obtaining the retransmission PPDU from the first WLAN device, where the retransmission PPDU may be generated based on the at least one member selected from the group consisting of the target transit time, the target retransmission channel, and the transmit power for the retransmission PPDU. The method may include outputting an acknowledgement message for transmission to the first WLAN device to indicate the second WLAN device successfully received the retransmission PPDU.

Another innovative aspect of the subject matter described in this disclosure can be performed by an apparatus of a first WLAN device for implementing a HARQ protocol. The apparatus may include one or more interfaces and one or more processors. The one or more interfaces may be configured to output a first HARQ frame for transmission to a second WLAN device, obtain a first feedback message from the second WLAN device, the first feedback message indicating whether to enable the HARQ protocol, and obtain an indication of an amount of memory available at the second WLAN device for processing HARQ transmissions. The one or more processors may be configured to determine to enable the HARQ protocol based, at least in part, on the first feedback message indicating to enable the HARQ protocol. The one or more interfaces may be configured to output a second HARQ frame for transmission to the second WLAN device based, at least in part, on the amount of memory available at the second WLAN device for processing HARQ transmissions.

In some implementations, prior to transmission of the first HARQ frame, the one or more interfaces may be configured to output a H-RTS message for transmission to the second WLAN device, where the H-RTS message may include a request for the amount of memory available at the second WLAN device for processing HARQ transmissions, and obtain a H-CTS message from the second WLAN device in response to transmission of the H-RTS message, where the H-CTS message may include the indication of the amount of memory available at the second WLAN device for processing HARQ transmissions.

In some implementations, the one or more interfaces may be configured to output the first HARQ frame for transmission to the second WLAN device based, at least in part, on the amount of memory available at the second WLAN device for processing HARQ transmissions indicated by the H-CTS message.

In some implementations, prior to transmission of the first HARQ frame, the one or more interfaces may be configured to obtain a management frame from the second WLAN device, where the management frame may include the indication of the amount of memory available at the second WLAN device for processing HARQ transmissions.

In some implementations, prior to transmission of the first HARQ frame, the one or more interfaces may be configured to obtain a block acknowledgment setup message from the second WLAN device, where the block acknowledgment setup message may include the indication of the amount of memory available at the second WLAN device for processing HARQ transmissions.

In some implementations, prior to transmission of the first HARQ frame, the one or more interfaces may be configured to obtain a HARQ setup message from the second WLAN device, where the HARQ setup message may include the indication of the amount of memory available at the second WLAN device for processing HARQ transmissions.

In some implementations, the first feedback message may be a non-HARQ acknowledgement message. The one or more processors may be configured to determine the non-HARQ acknowledgement message indicates to disable the HARQ protocol and enable a non-HARQ protocol, and the one or more interfaces may be configured to output a non-HARQ frame for transmission to the second WLAN device.

In some implementations, the one or more processors may be configured to determine that the first feedback message obtained from the second WLAN device may indicate a maximum number of HARQ transmissions per HARQ TXOP.

In some implementations, the one or more processors may be configured to determine that the first feedback message obtained from the second WLAN device includes the indication of the amount of memory available at the second WLAN device for processing HARQ transmissions for a single HARQ stream or for multiple HARQ streams.

Another innovative aspect of the subject matter described in this disclosure can be performed by an apparatus of a first WLAN device for implementing a HARQ protocol. The apparatus may include one or more interfaces and one or more processors. The one or more processors may be configured to determine a HARQ acknowledgement policy for HARQ transmissions in a HARQ TXOP, determine timing information of HARQ transmissions within the HARQ TXOP, and provide signaling from a PHY layer of the first WLAN device to a MAC layer of the first WLAN device indicating the timing information of the HARQ transmissions within the HARQ TXOP. The one or more interfaces may be configured to output a first HARQ frame for transmission to a second WLAN device, where a PHY layer header of the first HARQ frame may include at least the HARQ acknowledgement policy.

In some implementations, the one or more processors may be configured to encode addressing information for the first HARQ frame, where the encoded addressing information may provide a means for deriving the MAC address of the first WLAN device and the MAC address of the second WLAN device, and where the PHY layer header of the first HARQ frame may include the encoded addressing information.

In some implementations, the one or more processors may be configured to determine hashed addressing information by hashing addressing information with at least a portion of a BSSID to reduce collisions, where the PHY layer header of the first HARQ frame may include the hashed addressing information.

In some implementations, the one or more processors may be configured to determine, by the PHY layer of the first WLAN device, start and end times of each of the HARQ transmissions within the HARQ TXOP to determine intermediate time periods between the HARQ transmissions within the HARQ TXOP.

In some implementations, the first HARQ frame may be associated with a first HARQ stream, and responsive to detecting a low latency communication associated with a different stream, the one or more processors may be configured to determine, by the MAC layer of the first WLAN device, intermediate time periods between the HARQ transmissions within the HARQ TXOP for transmitting the low latency communication based, at least in part, on the timing information of the HARQ transmissions within the HARQ TXOP.

In some implementations, the one or more interfaces may be configured to output the low latency communication for transmission during one of the intermediate time periods between the HARQ transmissions, and the one or more processors may be configured to determine whether to delay one or more of the HARQ transmissions of the HARQ TXOP.

In some implementations, the one or more interfaces may be configured to output an H-RTS message for transmission to the second WLAN device, where the H-RTS message may include an RA and a TA.

Another innovative aspect of the subject matter described in this disclosure can be performed by an apparatus of a second WLAN device for implementing a HARQ protocol. The apparatus may include one or more interfaces and one or more processors. The one or more processors may be configured to determine an amount of memory available at the second WLAN device for processing HARQ transmissions associated with a first WLAN device, and determine whether to enable the HARQ protocol with the first WLAN device. The one or more interfaces may be configured to, responsive to a determination to enable the HARQ protocol, output a HARQ feedback message for transmission to the first WLAN device, where the HARQ feedback message may indicate to enable the HARQ protocol, provide an indication of the amount of memory available at the second WLAN device for processing HARQ transmissions, and obtain a first HARQ frame from the first WLAN device, where the first HARQ frame may be generated by the first WLAN device based, at least in part, on the amount of memory available at the second WLAN for processing HARQ transmissions.

In some implementations, the one or more interfaces may be configured to obtain an H-RTS message from the first WLAN device, where the H-RTS message may include a request for the amount of memory available at the second WLAN device for processing HARQ transmissions, and output an H-CTS message for transmission to the first WLAN device in response to obtainment of the H-RTS message, where the H-CTS message may include the indication of the amount of memory available at the second WLAN device for processing HARQ transmissions.

In some implementations, the one or more interfaces may be configured to output a management frame for transmission to the first WLAN device, where the management frame may include the indication of the amount of memory available at the second WLAN device for processing HARQ transmissions.

In some implementations, the one or more interfaces may be configured to output a block acknowledgment setup message for transmission to the first WLAN device, where the block acknowledgment setup message may include the indication of the amount of memory available at the second WLAN device for processing HARQ transmissions.

In some implementations, the one or more interfaces may be configured to obtain a second HARQ frame from the first WLAN device, where the second HARQ frame may be a PPDU including at least a first MPDU, and the one or more processors may be configured to determine whether to enable the HARQ protocol with the first WLAN device based, at least in part, on whether at least a portion of the first MPDU is successfully received by the second WLAN device.

In some implementations, the one or more interfaces may be configured to obtain a second HARQ frame from the first WLAN device, where the second HARQ frame may be a PPDU, and the one or more processors may be configured to determine a reception failure of one or more MPDUs of the PPDU, and determine to disable the HARQ protocol with the first WLAN device based on the reception failure. The one or more interfaces may be configured to output a non-HARQ feedback message for transmission to the first WLAN device in response to a determination to disable the HARQ protocol.

Another innovative aspect of the subject matter described in this disclosure can be implemented in a method performed by an apparatus of a first WLAN device for implementing a HARQ protocol. The method may include outputting a first HARQ frame for transmission to a second WLAN device, and determining whether a first feedback message is obtained from the second WLAN device. The method may include, responsive to obtaining the first feedback message, determining whether the first feedback message includes HARQ acknowledgement information or non-HARQ acknowledgment information, and outputting a second HARQ frame for transmission to the second WLAN device in response to determining the first feedback message includes the HARQ acknowledgment information.

In some implementations, the first feedback message may be an H-BA message, where the H-BA message may include the HARQ acknowledgment information, and the HARQ acknowledgement information may include one or more bitmaps.

In some implementations, the one or more bitmaps of the H-BA message may include at least one of one or more codeword-level bitmaps and one or more MPDU-level bitmaps.

In some implementations, the one or more codeword-level bitmaps may provide a receive status of codewords associated with the first HARQ frame, and the one or more MPDU-level bitmaps may provide a receive status of MPDUs.

In some implementations, codewords of each of the one or more codeword-level bitmaps may be identified by one or more starting codeword indexes.

In some implementations, the one or more codeword-level bitmaps may identify one or more groups of codewords.

In some implementations, the method may include outputting the second HARQ frame for transmission to the second WLAN device based, at least in part, on the one or more bitmaps included in the H-BA message.

In some implementations, the first feedback message may be an H-BA message having an M-BA frame format, where the M-BA frame format may include a first indicator to indicate the first feedback message is the H-BA message.

In some implementations, the M-BA frame format may include a BA information field, where the BA information field may include at least the first indicator and one or more codeword-level bitmaps of the H-BA message.

In some implementations, the BA information field may include one or more BA control fields and each of the one or more BA control fields may include the first indicator.

In some implementations, the M-BA frame format may further include one or more C-BA messages from one or more additional WLAN devices.

In some implementations, the M-BA frame format may further include at least one additional H-BA message from at least one additional WLAN device.

In some implementations, in response to determining the first feedback message includes non-HARQ acknowledgement information, the method may include outputting a non-HARQ frame for transmission to the second WLAN device.

In some implementations, the non-HARQ frame may be a retransmission frame that is output for transmission to the second WLAN device using an automatic repeat request (ARQ) protocol.

In some implementations, the first feedback message obtained from the second WLAN device may be a C-BA message, where the C-BA message may include one or more MPDU-level bitmaps.

In some implementations, the first feedback message obtained from the second WLAN device may be a N-ACK message, where the N-ACK message may indicate a reception failure of the first HARQ frame.

In some implementations, the N-ACK message may have an M-BA frame format, and the M-BA frame format may include a second indicator to indicate the first feedback message is the N-ACK message, or a bitmap having bits set to zero to indicate the first feedback message is the N-ACK message.

In some implementations, the M-BA frame format may include a BA information field, where the BA information field including at least the second indicator.

In some implementations, in response to determining the first feedback message is not obtained from the second WLAN device, the method may include retransmitting the first HARQ frame to the second WLAN device, outputting a different HARQ frame for transmission to the second WLAN device, or outputting an H-BAR message for transmission to the second WLAN device.

In some implementations, in response to determining the first feedback message is not obtained from the second WLAN device within a time period after transmission of the first HARQ frame, the method may include outputting an H-BAR message for transmission to the second WLAN device, where the H-BAR message may include an H-BA request or a HARQ reset request.

In some implementations, in response to the H-BAR message including the H-BA request, the method may include obtaining an H-BA message from the second WLAN device.

In some implementations, in response to the H-BAR message including the HARQ reset request, the method may include obtaining an ACK message from the second WLAN device, where the ACK message may acknowledge completion of a HARQ reset.

In some implementations, the H-BAR message may include a BAR control field having a third indicator that indicates a type of message is the H-BAR message.

In some implementations, the method of outputting the H-BAR message for transmission to the second WLAN device may include outputting a multi-user (MU) BAR trigger frame that includes the H-BAR message.

Another innovative aspect of the subject matter described in this disclosure can be implemented in a method performed by an apparatus of a second WLAN device for implementing a HARQ protocol. The method may include obtaining a first HARQ frame from a first WLAN device, and determining whether to generate a first feedback message that includes HARQ acknowledgement information or non-HARQ acknowledgement information based, at least in part, on the first HARQ frame. The method may include, responsive to determining to generate the first feedback message that includes the HARQ acknowledgement information, outputting the first feedback message including the HARQ acknowledgement information for transmission to the first WLAN device.

In some implementations, the first feedback message may be an H-BA message, where the H-BA message may include the HARQ acknowledgement information.

In some implementations, the H-BA message may include at least one of one or more codeword-level bitmaps and one or more MPDU level bitmaps.

In some implementations, the method may include determining to generate the H-BA message based, at least in part, on determining at least a portion of codewords associated with the first HARQ frame were successfully received and a remaining portion of the codewords were unsuccessfully received, and determining to enable the HARQ protocol.

In some implementations, the method may include determining to disable the HARQ protocol based, at least in part, on the first HARQ frame, determining to generate the first feedback message that includes the non-HARQ acknowledgement information in response to determining to disable the HARQ protocol, and responsive to determining to generate the first feedback message that includes the non-HARQ acknowledgement information, outputting the first feedback message including the non-HARQ acknowledgement information for transmission to the first WLAN device.

In some implementations, the first feedback message that includes the non-HARQ acknowledgement information may be a C-BA message, where the C-BA message may include one or more MPDU-level bitmaps.

In some implementations, the first feedback message that includes the non-HARQ acknowledgement information may be a N-ACK message, where the N-ACK message may indicate a reception failure of the first HARQ frame.

In some implementations, the N-ACK message may have an M-BA frame format, where the M-BA frame format may include a second indicator to indicate the first feedback message is the N-ACK message, or a bitmap having bits set to zero to indicate the first feedback message is the N-ACK message.

In some implementations, the M-BA frame format may include a BA information field, where the BA information field may include at least the second indicator.

In some implementations, the method may include obtaining an H-BAR message from the first WLAN device, and determining whether the H-BAR message includes an H-BA request or a HARQ reset request.

In some implementations, in response to determining the H-BAR message includes the H-BA request, the method may include outputting an H-BA message for transmission to the first WLAN device.

In some implementations, in response to determining the H-BAR message includes the HARQ reset request, the method may include performing a HARQ reset at the second WLAN device and outputting an ACK message for transmission to the first WLAN device to acknowledge completion of the HARQ reset.

Another innovative aspect of the subject matter described in this disclosure can be performed by an apparatus of a first WLAN device for implementing a HARQ protocol. The apparatus may include one or more interfaces and one or more processors. The one or more interfaces may be configured to output a first HARQ frame for transmission to a second WLAN device. The one or more processors may be configured to determine whether a first feedback message is obtained from the second WLAN device, and responsive to obtainment of the first feedback message, determine whether the first feedback message includes HARQ acknowledgement information or non-HARQ acknowledgment information. The one or more interfaces may be configured to output a second HARQ frame for transmission to the second WLAN device in response to a determination that the first feedback message includes the HARQ acknowledgment information.

In some implementations, in response to a determination that the first feedback message includes non-HARQ acknowledgement information, the one or more interfaces may be configured to output a non-HARQ frame for transmission to the second WLAN device.

In some implementations, in response to a determination that the first feedback message is not obtained from the second WLAN device, the one or more interfaces may be configured to retransmit the first HARQ frame to the second WLAN device, output a different HARQ frame for transmission to the second WLAN device, or output an H-BAR message for transmission to the second WLAN device.

In some implementations, in response to a determination that the first feedback message is not obtained from the second WLAN device within a time period after transmission of the first HARQ frame, the one or more interfaces may be configured to output an H-BAR message for transmission to the second WLAN device, where the H-BAR message may include an H-BA request or a HARQ reset request.

In some implementations, in response to the H-BAR message including the H-BA request, the one or more interfaces may be configured to obtain an H-BA message from the second WLAN device.

In some implementations, in response to the H-BAR message including the HARQ reset request, the one or more interfaces may be configured to obtain an ACK message from the second WLAN device, where the ACK message may acknowledge completion of a HARQ reset.

Another innovative aspect of the subject matter described in this disclosure can be performed by an apparatus of a second WLAN device for implementing a HARQ protocol. The apparatus may include one or more interfaces and one or more processors. The one or more interfaces may be configured to obtain a first HARQ frame from a first WLAN device. The one or more processors may be configured to determine whether to generate a first feedback message that includes HARQ acknowledgement information or non-HARQ acknowledgement information based, at least in part, on the first HARQ frame. The one or more interfaces may be configured to, responsive to a determination to generate the first feedback message that includes the HARQ acknowledgement information, output the first feedback message including the HARQ acknowledgement information for transmission to the first WLAN device.

In some implementations, the one or more processors may be configured to determine to generate the H-BA message based, at least in part, on a determination that at least a portion of codewords associated with the first HARQ frame were successfully received and a remaining portion of the codewords were unsuccessfully received, and a determination to enable the HARQ protocol.

In some implementations, the one or more processors may be configured to determine to disable the HARQ protocol based, at least in part, on the first HARQ frame, and determine to generate the first feedback message that includes the non-HARQ acknowledgement information in response to a determination to disable the HARQ protocol. The one or more interfaces may be configured to, responsive to a determination to generate the first feedback message that includes the non-HARQ acknowledgement information, output the first feedback message including the non-HARQ acknowledgement information for transmission to the first WLAN device.

In some implementations, the one or more interfaces may be configured to obtain an H-BAR message from the first WLAN device. The one or more processors may be configured to determine whether the H-BAR message includes an H-BA request or a HARQ reset request.

Aspects of the subject matter described in this disclosure can be implemented in a device, a software program, a system, or other means to perform any of the above-mentioned methods.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 19 depicts a flowchart with example operations performed by an apparatus of a second WLAN device for implementing a HARQ protocol using Block ACK messages.

Like reference numbers and designations in the various drawings indicate like elements.

DETAILED DESCRIPTION

Figure 1:
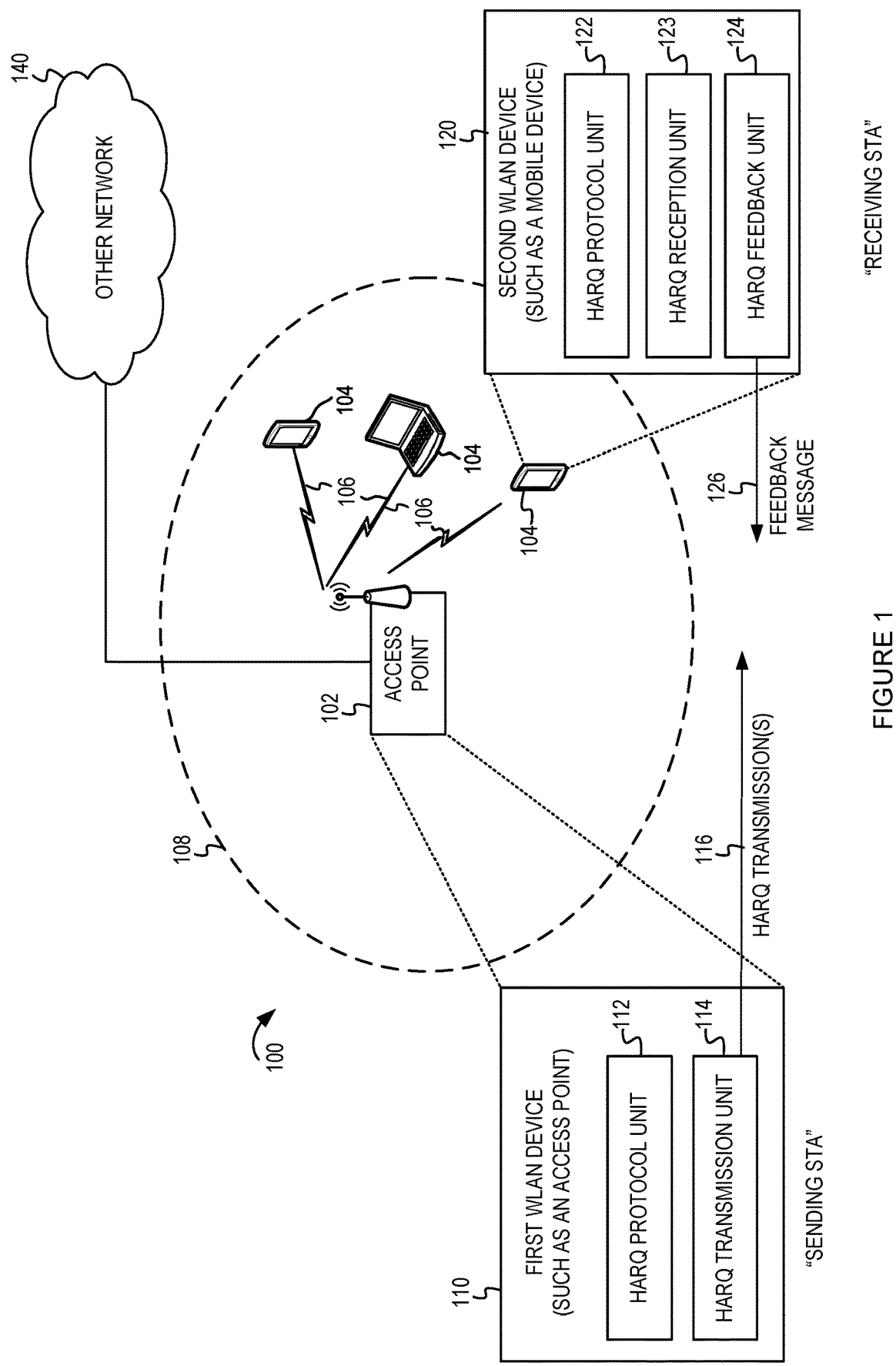
FIG. 1 depicts a system diagram of an example wireless local area network (WLAN) for implementing retransmission protocols, such as a hybrid automatic repeat request (HARQ) protocol.

The following description is directed to certain implementations for the purposes of describing the innovative aspects of this disclosure. However, a person having ordinary skill in the art will readily recognize that the teachings herein can be applied in a multitude of different ways. The examples in this disclosure are based on wireless local area network (WLAN) communication according to the Institute of Electrical and Electronics Engineers (IEEE) 802.11 wireless standards. However, the described implementations may be implemented in any device, system or network that is capable of transmitting and receiving radio frequency (RF) signals according to one or more of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G, 5G, 6G, or further implementations thereof, technology.

A wireless local area network (WLAN) in a home, apartment, business, or other area may include one or more WLAN devices. Each WLAN device may have a station (STA) interface which is an addressable entity that shares a wireless communication medium with other STAs. An access point (AP) is a WLAN device that includes a STA interface as well as a distribution system access function. For brevity in this disclosure, WLAN devices may be referred to as STAs, regardless of whether the WLAN device is an AP or a non-AP STA. A first WLAN device (acting as a sending STA) may communicate data to a second WLAN device (acting as a receiving STA) via a wireless channel. Due to the nature of wireless communication, the WLAN devices may implement a retransmission protocol to provide reliable delivery of a media access control (MAC) protocol data unit (MPDU). An MPDU also may be referred to as a frame in some aspects of this disclosure. A physical convergence layer (PHY) protocol data unit (PPDU) may contain one or more PHY service data units (PSDUs), each of which addressed to one or more STAs. Each PSDU may contain an MPDU or one or more MPDUs in the form of an Aggregated MPDU (A-MPDU). A PPDU also may be referred to as a packet in some aspects of this disclosure. In some implementations, a PPDU may contain an MPDU or an A-MPDU that is addressed to a receiver. In some implementations, the examples described in this disclosure are applicable in the cases where the transmitted PPDU may contain more than one PSDU, each of which is addressed to independent receivers, or generated by independent transmitters.

A traditional retransmission protocol (which may be referred to as a baseline approach, or as automatic repeat request (ARQ)) may use a first type of feedback message that includes an acknowledgment (ACK). In some implementations, the absence of an ACK may be interpreted as a negative acknowledgment (NACK). For example, the first type of feedback message may be referred to as a traditional ACK message type. A receiving STA may send a traditional ACK message to the sending STA to indicate whether the receiving STA has successfully received the frame. If the sending STA does not receive a traditional ACK message (such as by an expected time) in response to a frame, the sending STA may retransmit the original frame. In some implementations, the sending STA may retransmit the frame with a lower data rate compared to the initial transmission to increase the likelihood of reception of the frame. In another retransmission protocol, the receiving STA may bundle ACKs or NACKs for multiple MPDUs in a block acknowledgment feedback message, where each MPDU can be sent in separate frames or as an A-MPDU in a single frame. The block acknowledgment feedback message may be referred to as a Block ACK message type. The Block ACK message type may indicate which MPDUs in an A-MPDU have been successfully received. A sending STA may retransmit those MPDUs which are not indicated as being received correctly in the Block ACK feedback message.

Hybrid automatic repeat request (hybrid ARQ or HARQ) is another retransmission protocol. HARQ has previously been used in wide area wireless communication systems. HARQ uses a combination of error detection and error correction. A HARQ transmission may include error checking bits that are added to data to be transmitted using an error-detecting (ED) code, such as a cyclic redundancy check (CRC). The error checking bits may be used by a receiving STA to determine if it has properly decoded the received HARQ transmission. Additionally, the HARQ transmission may utilize an error correction technique. For example, the original data may be encoded with a forward error correction (FEC) code. Both original data and parity bits may be sent in the HARQ transmission. A receiving STA may be able to use the parity bits to correct errors in the transmission, thus avoiding a retransmission. The ED code may be omitted when encoding is used that can perform both FEC and ED, such as Reed-Solomon codes and Low Density Parity Check (LDPC) codes.

Another feature of HARQ is that a receiving STA may combine a first HARQ transmission with a second HARQ transmission. For example, if the receiving STA cannot properly decode (and cannot correct the errors) the first HARQ transmission, the receiving STA may send a HARQ feedback message that indicates at least part of the first HARQ transmission was not properly decoded. The HARQ feedback message is another type of feedback message, different from the traditional ACK/NACK feedback message type and the Block ACK feedback message type (which also may be referred to as non-HARQ feedback message types). In response to receiving the HARQ feedback message, the sending STA may transmit a second HARQ transmission to the receiving STA to communicate at least part of the first HARQ transmission that was not acknowledged. The combined HARQ transmissions may be processed for decoding and error correction. The receiving STA may combine the second HARQ transmission with the first HARQ transmission so that the complete signal associated with the HARQ transmissions can be decoded.

Implementing HARQ in a WLAN may improve reliability of wireless communication. However, because WLAN devices may not have previously implemented HARQ, a WLAN device may not recognize a HARQ transmission or a HARQ feedback message. A HARQ protocol for use in a WLAN may involve some changes to a traditional HARQ concept as well as some changes to WLAN retransmission concepts.

This disclosure provides several techniques for using HARQ on a WLAN. The various implementations described in this disclosure may be combined or modified for use with standards-compliant WLAN devices. Some implementations include signaling regarding HARQ capabilities, HARQ transmissions, and various types of acknowledgements that may be used.

In some implementations, the HARQ protocol may allow control of various aspects of memory management typically used to implement HARQ transmissions between a sending STA and a receiving STA. In some implementations, the receiving STA may control the amount of memory that is allocated for HARQ transmissions on a per PPDU or a per transmission opportunity (TXOP) basis. For example, the receiving STA may provide an indication to the sending STA of the amount of memory available to process HARQ transmissions. The sending STA may generate HARQ transmission based on the memory availability at the receiving STA. The receiving STA also may control whether to enable or disable the HARQ protocol for a particular PPDU or TXOP, such as based on the amount of available memory. For example, the receiving STA may have little or no memory available to process HARQ transmissions, and therefore may disable the HARQ protocol. In some implementations, the receiving STA may indicate the amount of memory to allocate for HARQ transmissions on one or more of a per PPDU, a per TXOP, a per association, or a per Block ACK setup basis. The receiving STA may implement memory management signaling as part of the HARQ protocol between the receiving STA and a sending STA to allow the receiving STA to indicate whether to implement the HARQ protocol, and the amount of memory available for the HARQ transmissions.

In some implementations, signaling for the HARQ protocol may be added to a physical (PHY) layer header of a PPDU to implement HARQ transmissions. In some implementations, even when a substantial amount, a majority, or even all of the MPDUs of a PPDU are corrupted, the PHY header can be received successfully. This is because in general the PHY header is typically sent at a lower data rate compared to the PSDU portion which is typically sent at a higher data rate. Thus, including signaling in the PHY header for the HARQ protocol may increase the probability of receiving the HARQ signaling. In some implementations, HARQ request to send (H-RTS) and HARQ clear to send (H-CTS) messages also may be used to provide HARQ-related information and signaling. In some implementations, for similar reasons as the HARQ protocol, signaling may be added to the PHY header of a PPDU to implement an automatic repeat request (ARQ) protocol.

In some implementations, the HARQ protocol may use HARQ Block ACK (H-BA) messages (which also may be referred to as hybrid Block ACK messages). The H-BA messages may include one or more codeword-level bitmaps, one or more MPDU-level bitmaps, or both. In some implementations, the one or more codeword-level bitmaps may indicate the receive status of codewords, such as LDPC codewords. For example, for each LDPC codeword, a codeword-level bitmap may indicate success or failure of decoding the LDPC codeword. In some implementations, the one or more codeword-level bitmaps may indicate the receive status of codeword groups. For example, for each codeword group, a codeword-level bitmap may indicate success or failure of decoding the codeword group. In some implementations, the one or more MPDU-level bitmaps may indicate the receive status of MPDUs. For example, for each MPDU, an MPDU-level bitmap may indicate success or failure of decoding the MPDU.

In some implementations, an H-BA message may be generated using the multi-STA Block ACK (M-BA) frame format. Other messages, such as a compressed Block ACK (C-BA) and a negative ACK (N-ACK) also may use the M-BA frame format. In some implementations, a HARQ Block ACK request (H-BAR) message may be used to request an H-BA or to request a HARQ reset.

Particular implementations of the subject matter described in this disclosure can be implemented to realize one or more of the following potential advantages. Implementing a HARQ protocol in a WLAN may improve reliability of data communicated from a sending STA to a receiving STA. The HARQ protocol may support the establishment of a HARQ session between two WLAN devices. The HARQ protocol may enable the receiving STA to control whether to continue the HARQ process or revert to a non-HARQ retransmission scheme (such as the ARQ protocol). The HARQ protocol may support various HARQ signaling between the sending and the receiving STAs and between the PHY and MAC layers to improve the retransmission operations in a WLAN. The HARQ protocol may reduce feedback overhead and increase the flexibility for retransmissions by allowing STAs to dynamically switch between ARQ and HARQ protocols during frame exchanges. The HARQ protocol also may allow multiplexing of frames (such as multi-user frames) that employ ARQ and frames that employ HARQ. Furthermore, the HARQ protocol may allow a sending STA to transmit an initial HARQ transmission at a relatively high data rate, which may improve the overall link throughput compared to non-HARQ protocols. Even when the signal-to-noise ratio (SNR) level at the receiving STA is lower than estimated and the sending STA transmits a second HARQ transmission to the receiving STA in order to successfully decode the data, the HARQ protocol may improve the overall link throughput.

FIG. 1 depicts a system diagram of an example WLAN for implementing retransmission protocols, such as a HARQ protocol. FIG. 1 includes a block diagram of an example wireless communication network 100. According to some aspects, the wireless communication network 100 can be an example of a WLAN such as a Wi-Fi network (and will hereinafter be referred to as WLAN 100). For example, the WLAN 100 can be a network implementing at least one of the IEEE 802.11 family of standards defined by the IEEE 802.11-2016 specification or amendments thereof (such as IEEE 802.11ax or IEEE 802.11be). The WLAN 100 may include numerous wireless communication devices such as an AP 102 and multiple STAs 104 having wireless associations with the AP 102. The IEEE 802.11-2016 specification defines a STA as an addressable unit. An AP is an entity that contains at least one STA and provides access via a wireless medium (WM) for associated STAs to access a distribution service (such as another network 140). Thus, an AP includes a STA and a distribution system access function (DSAF). In the example of FIG. 1, the AP 102 may be connected to a gateway device (not shown) which provides connectivity to the other network 140. The DSAF of the AP 102 may provide access between the STAs 104 and another network 140. While AP 102 is described as an access point using an infrastructure mode, in some implementations, the AP 102 may be a traditional STA which is operating as an AP. For example, the AP 102 may be a STA capable of operating in a peer-to-peer mode or independent mode. In some other examples, the AP 102 may be a software AP (SoftAP) operating on a computer system.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), wearable devices, music or other audio or stereo devices, remote control devices ("remotes"), printers, kitchen or other household appliances, key fobs (for example, for passive keyless entry and start (PKES) systems), among other possibilities.

The AP 102 and the associated STAs 104 may be referred to as a basic service set (BSS), which is managed by the AP 102. A BSS refers to one STA (such as an AP) that has established service settings and one or more STAs that have successfully synchronized the service settings. Alternatively, a BSS may describe a set of STAs have synchronized matching mesh service profiles. Using the example architecture in FIG. 1, the BSS may be identified by a service set identifier (SSID) that is advertised by the AP 102. The AP 102 may periodically broadcast beacon frames ("beacons") to enable any STAs 104 within wireless range of the AP 102 to establish or maintain a respective communication link 106 (also referred to as a "Wi-Fi link" or "wireless association") with the AP. An "unassociated STA" (not shown) may not be considered part of the BSS because they do not have a wireless session established at the AP 102. The various STAs 104 in the WLAN 100 may be able to communicate with external networks as well as with one another via the AP 102 and respective communication links 106. To establish a communication link 106 with an AP 102, each of the STAs is configured to perform passive or active scanning operations ("scans") on frequency channels in one or more frequency bands (for example, the 2.4 GHz, 5 GHz, 6 GHz, or 60 GHz bands). To perform passive scanning, a STA listens for beacons, which are transmitted by respective APs 102 at a periodic time interval referred to as the target beacon transmission time (TBTT) (measured in time units (TUs) where one TU is equal to 1024 microseconds (s)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link with the selected AP.

FIG. 1 additionally shows an example coverage area 108 of the AP 102, which may represent a basic service area (BSA) of the WLAN 100. While one AP 102 is shown in FIG. 1, the WLAN 100 can include multiple APs. As a result of the increasing ubiquity of wireless networks, a STA 104 may have the opportunity to select one of many BSSs within range of the STA 104 or select among multiple APs that together form an extended service set (ESS) including multiple connected BSSs. An extended network station associated with the WLAN 100 may be connected to a wired or wireless distribution system that may allow multiple APs to be connected in such an ESS. As such, a STA 104 can be covered by more than one AP 102 and can associate with different APs at different times for different transmissions. Additionally, after association with an AP 102, a STA 104 also may be configured to periodically scan its surroundings to find a more suitable AP with which to associate. For example, a STA 104 that is moving relative to its associated AP 102 may perform a "roaming" scan to find another AP having more desirable network characteristics such as a greater received signal strength indicator (RSSI).

The APs 102 and STAs 104 may function and communicate (via the respective communication links 106) according to the IEEE 802.11 family of standards (such as that defined by the IEEE 802.11-2016 specification or amendments thereof including, but not limited to, 802.11aa, 802.11ah, 802.11aq, 802.11ay, 802.11ax, 802.11be, 802.11az and 802.11ba). These standards define the WLAN radio and baseband protocols for the physical (PHY) and medium access control (MAC) layers. The APs 102 and STAs 104 transmit and receive packets (which also may be referred to as transmissions, communications, or wireless communications) to and from one another in the form of PPDUs. Each PPDU is a composite frame that includes a PLCP preamble and header (which also may be referred to as a PHY preamble and header) and a Data field. The Data field may include one or more PSDUs, which may include an MPDU or one or more MPDUs in the form of an A-MPDU. Each MPDU may include a MAC header.

The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be (which also may be referred to as extreme high throughput (EHT)) standard amendments may be transmitted over one or more of the 2.4 GHz, 5 GHz and 6 GHz bands, each of which is divided into multiple 20 MHz channels. As such, these PPDUs may be transmitted over a physical channel having a minimum bandwidth of 20 MHz. But larger channels can be formed through channel bonding, channel aggregation, etc. For example, PPDUs conforming to the IEEE 802.11n, 802.11ac, 802.11ax, and 802.11be standard amendments may be transmitted over physical channels having bandwidths of 40 MHz, 80 MHz, 80+80 MHz, 160 MHz, 160+160 MHz or 320 MHz by bonding together two or more 20 MHz channels, which can be contiguously allocated or non-contiguously allocated. For example, IEEE 802.11n described the use of up to 2 channels (for a combined 40 MHz bandwidth) and defined a High Throughput (HT) transmission format. IEEE 802.11ac described the use of up to 8 channels (for a maximum combined 160 MHz bandwidth) and defined a Very High Throughput (VHT) transmission format. IEEE 802.11ax also supports up to a combined 160 MHz bandwidth (which may be a combination of up to 8 channels of 20 MHz width each). IEEE 802.11be may support up to a combined 320 MHz bandwidth (which may be a combination of up to 16 channels of 20 MHz width each).

The AP 102 may be an example of a first WLAN device 110. Regardless of whether the first WLAN device 110 is an AP or a traditional STA, it may be referred to as a "sending STA" for the example HARQ processes in this disclosure. The STAs 104 may be examples of the second WLAN device 120 and may be referred to as a "receiving STA" in the example HARQ processes in this disclosure. To be clear, the designations of sending STA and receiving STA may be reversed in other example HARQ processes. In the example HARQ processes, the first WLAN device 110 may send HARQ transmissions 116 to the second WLAN device 120 and the second WLAN device 120 may respond with feedback message 126. In this disclosure, we describe examples of a PPDU that may contain an MPDU or an A-MPDU that is addressed to a receiving STA. The examples described in this disclosure also may be applicable in the cases where the transmitted PPDU may contain more than one PSDU, each of which is addressed to independent receiving STAs, or generated by independent sending STAs.

The first WLAN device 110 (as sending STA) may include a HARQ protocol unit 112 and a HARQ transmission unit 114. The HARQ protocol unit 112 may implement a HARQ protocol in accordance with aspects of this disclosure. The HARQ transmission unit 114 may prepare and communicate the HARQ transmissions 116. The second WLAN device 120 (as receiving STA) may include a HARQ protocol unit 122, a HARQ reception unit 123 and a HARQ feedback unit 124. The HARQ protocol unit 122 may implement the HARQ protocol in accordance with aspects of this disclosure. The HARQ reception unit 123 may receive, decode, and process the HARQ transmissions 116. The HARQ feedback unit 124 may prepare and communicate the feedback 126.

In some implementations, the HARQ protocol may allow the receiving STA (such as the second WLAN device 120) to control memory management aspects for HARQ transmissions between a sending STA (such as the first WLAN device 110) and the receiving STA. In some implementations, the second WLAN device 120 may control the amount of memory that is allocated for HARQ transmissions. The second WLAN device 120 may process one HARQ stream or multiple HARQ streams concurrently. Each of the HARQ streams (and other applications and processes executing at the second WLAN device 120) may utilize a portion of the memory available at the second WLAN device 120. Further, to implement the HARQ protocol, the second WLAN device 120 may utilize additional memory to store information (such as codewords, for example) associated with the failed portions of a HARQ transmission (such as portions that were not properly decoded). For example, in a HARQ stream, the second WLAN device 120 may store the information while the second WLAN 120 waits to receive a second HARQ transmission having information that can be combined with the stored information to decode the portion of the first HARQ transmission that previously failed. In some implementations, for each code bit (such as either an information bit or a parity bit) associated with the codewords that were not successfully decoded, the second WLAN device 120 may store a logarithm likelihood ratio (LLR) which may take multiple bits. For example, storing an LLR for each code bit may take 5 bits. Thus, the second WLAN device 120 may allocate multiple bits (such as 5 bits) of storage for each code bit. For a single HARQ stream, when LLR storage is used for each code bit, the second WLAN device 120 may allocate an amount of memory to process a HARQ transmission that may be equal to a multiple of (such as five times) the payload of the corresponding PPDU. For multiple HARQ streams, when LLR storage is used for each code bit, the amount of memory that may be allocated to processes HARQ transmissions for the multiple HARQ streams may be a multiple of the amount of memory that is allocated for a single HARQ stream. For example, if the second WLAN device 120 is processing eight HARQ streams, the second WLAN device 120 may receive up to eight PPDUs, each of which includes an A-MPDUs with different MPDUs (for example, one or more MPDUs for each HARQ stream). The size of the memory to store the information of the PPDUs for eight HARQ streams (and therefore the amount of memory that may be allocated for the HARQ protocol) may be eight times the amount of memory that is allocated for a single HARQ stream, which may be unmanageable for a receiving STA. For a receiving AP, multiple STAs may send HARQ transmissions to the AP, and each STA may separately send HARQ transmissions for one HARQ stream or multiple HARQ streams, and therefore the memory requirement also may be unmanageable for the AP for similar reasons.

In some implementations, the second WLAN device 120 (as the receiving STA) may control the amount of memory that is allocated for each HARQ transmission of one or more HARQ streams. For example, the second WLAN device 120 may control the amount of memory that is allocated on a per PPDU basis or a per TXOP basis to implement the HARQ protocol. In some implementations, the second WLAN device 120 may send the feedback message 116 (also referred to as a HARQ feedback message), such as a HARQ acknowledgement (H-ACK) message, to the first WLAN device 110. The feedback message 116 may indicate the amount of memory available at the second WLAN device 120 to process one or more HARQ transmissions, such as one or more HARQ PPDUs (as described in FIG. 2). In some implementations, the H-ACK may be a HARQ Block ACK (H-BA), which also may be referred to as a hybrid Block ACK. In some implementations, the H-BA may include an indicator (such as multiple bits) in a control field (such as an A-Control field) that indicates the amount of available memory. The amount of available memory for one or more of the HARQ streams may be indicated in one or more fields of the H-BA. For example, the amount of available memory may be formatted as HARQ Stream 1, HARQ memory 1, HARQ Stream 2, HARQ memory 2, and so on, where the memory can be expressed in multiples of bytes (or octets), in numbers of codewords, etc. In some implementations, the H-BA may indicate the amount of memory available at the second WLAN device 120 for each HARQ stream by indicating the number of codewords that may be stored at the second WLAN device 120 for each HARQ stream. For example, the H-BA may indicate the number of LDPC codewords that may be stored at the second WLAN device 120 for each HARQ stream. The first WLAN device 110 (as the sending STA) may receive the H-ACK (such as an H-BA) and generate a HARQ transmission based on the amount of available memory at the second WLAN device 120.

Figure 3:
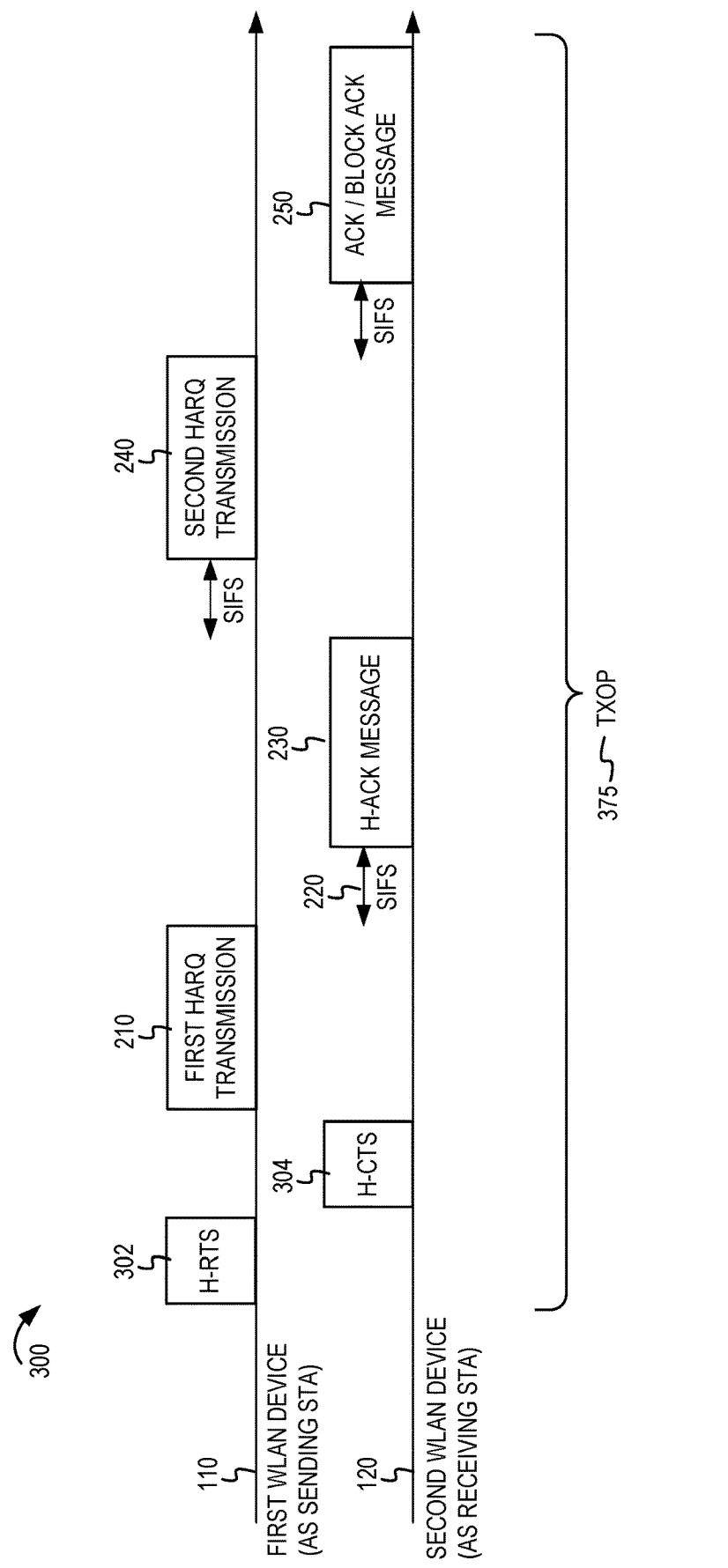
FIG. 3 depicts another example of HARQ transmissions for implementing a HARQ protocol.

In some implementations, the second WLAN device 120 may indicate the amount of memory available for a HARQ transmission on a per PPDU basis or a per TXOP basis in a HARQ clear to send (H-CTS) message in response to receiving a HARQ request to send (H-RTS) message from the first WLAN device 110 (as described in FIG. 3). In some implementations, the second WLAN device 120 may indicate the amount of memory available for one or more HARQ streams in a HARQ status report (HSR) that may be included in an A-Control field of an H-BA (which also may be referred to as an A-Control message). In some implementations, the A-Control field may be present in the MAC header, and may be 4, 8, 16, or 32 octets in length. In some implementations, in addition to the available memory, the HSR may include signal-to-noise ratio (SNR) information, or a combination of suggested quadrature amplitude modulation (QAM) and suggested puncturing ratio in the next transmission or retransmission for rate adaptation in HARQ. The rate adaptation in HARQ may be used to improve packet error rate (PER), or ease the core processing burden of the low-density parity-check (LDPC) decoder (such as by suggesting a slower transmission rate).

In some implementations, the second WLAN device 120 may indicate the amount of available memory for HARQ transmissions on a per association basis. For example, during the association process between the second WLAN device 120 and the first WLAN device 110, the second WLAN device 120 may indicate the amount of memory that will be allocated for each HARQ transmission or for all HARQ transmissions (after the association process) in a management frame (such as Association Request/Response, Probe Request/Response, etc.). The indication may be included in an EHT Capabilities element, in a HARQ Parameters, or in a HARQ Control element contained in the management frame. Such an element may contain all information/parameters that are related to the HARQ protocol (which may be referred to as HARQ control information), such as support/enablement, memory, HARQ mode (such as chase combining, increased redundancy, HARQ feedback size, fast feedback mechanism support, max HARQ PPDU size support, etc.). In some implementations, a control field (such as a HARQ Control field or element) contained in the MAC header of frames transmitted by the second WLAN device 120 may contain one or more of these parameters. In some implementations, the control field may be carried in the HT Control field of the frame or in the EHT Control field of the frame. In some implementations, the H-ACK frame may contain the HARQ Control field or element described herein. The first WLAN device 110 may receive the frame (for example, a frame that includes the HARQ Control field or element) and determine the amount of memory that the second WLAN device 120 will allocate for each HARQ transmission. The first WLAN 110 may generate each of the HARQ transmissions (such as HARQ PPDUs) that will be sent to the second WLAN device 120 based on the amount of available memory indicated in the most recently received frame that includes HARQ control information.

In some implementations, the second WLAN device 120 may indicate the amount of available memory for HARQ transmissions during a Block acknowledgement (which may be referred to as Block ACK or BA) setup message exchange. For example, the second WLAN device 120 may indicate in a Block ACK response message (sent in response to receiving a Block ACK request message from the first WLAN device 110) the amount of memory to allocate to HARQ transmissions associated with different MPDUs. For example, the Block ACK response message may indicate to allocate the same or different amount of memory to the different PPDUs. Each PPDU may include an A-MPDU having one or more MPDUs, and each PPDU may be associated with a different HARQ stream.

As described herein, the second WLAN device 120 may indicate the amount of memory to allocate for HARQ transmissions on a per PPDU, a per TXOP, a per association, or a per Block ACK setup basis. In some implementations, the second WLAN device 120 also may use HARQ feedback messages (such as H-ACK or H-BA messages), H-CTS messages, control frames, management frames, or Block ACK setup messages to specify the amount of memory to allocate for HARQ transmissions on a per traffic identifier (TID) basis or a per access category (AC) basis. For example, the four ACs that are defined in the IEEE 802.11 family of standards are background (BK) traffic, best effort (BE) traffic, voice (VO) traffic, and video (VI) traffic. TIDs may be used to provide additional priority levels (such as for Quality of Service (QoS)) to the four ACs. For example, each of the BK, BE, VO, and VI traffic ACs may be associated with two TIDs for a total of eight TIDs (such as TID0-TID7). Since a data session may be categorized according to the different ACs or TIDs, the HARQ transmissions for each of the data sessions are also associated with the corresponding AC or TID. Thus, in some implementations, the second WLAN device 120 may indicate the amount of memory (which may be the same or different) to allocate to each of the different ACs or TIDs in one or more messages that are transmitted to the first WLAN device 110, such as HARQ feedback messages, H-CTS messages, management frames, control frames, or Block ACK setup messages. In some implementations, ADDBA Requests and ADDBA Responses may be example BA setup messages that can be used to specify the amount of memory to allocate for HARQ transmissions on a per TID basis or a per AC basis. Additionally, or alternatively, the STAs can use HARQ setup messages (such as ADDHARQ Requests and ADDHARQ Responses).

In some implementations, the second WLAN device 120 also may indicate whether to enable or disable the HARQ protocol on a per PPDU or a per TXOP basis. For example, the second WLAN device 120 also may indicate whether to enable or disable the HARQ protocol in HARQ feedback messages (such as H-ACK or H-BA messages) or in H-CTS messages. In some implementations, if the second WLAN device 120 indicates to enable the HARQ protocol for one or more transmissions (HARQ PPDUs) between the first WLAN device 110 and the second WLAN device 120, the second WLAN device 120 also may indicate (such as in a HARQ feedback message or a H-CTS message) the amount of memory to allocate to the one or more HARQ transmissions, as described in this disclosure. In some implementations, if the second WLAN device 120 indicates to disable the HARQ protocol for one or more transmissions between the first WLAN device 110 and the second WLAN device 120, the second WLAN device 120 may send a feedback message 116, such as a negative acknowledgement (N-ACK or NACK) message indicating to the first WLAN device 110 to disable the HARQ protocol for subsequent PPDUs and implement a different retransmission protocol, such as an ARQ protocol. In some implementations, the transmission of any feedback (other than H-ACK) in response to the HARQ transmission (such as an ACK frame, C-BA frame, Multi-TID BA frame) may be considered as an indication to the first WLAN device 110 to not continue transmission of HARQ PPDUs to the second WLAN device 120 for a certain amount of time (such as for the remainder of the TXOP). In some instances, the second WLAN device 120 may have little or no memory available to process HARQ transmissions, and therefore second WLAN device 120 may indicate to the first WLAN device 110 to enable the ARQ protocol. Instead of retransmitting only a portion of a MPDU to the second WLAN device 120, the ARQ protocol may retransmit the full MPDU to the second WLAN device 120. Such an indication to disable the HARQ protocol and enable the ARQ protocol may be provided by the second WLAN device 120 to the first WLAN device 110 by sending any feedback message that does not contain a HARQ feedback (such as any message other than an H-ACK or H-BA).

In some implementations, signaling to enable the HARQ protocol may be added to a physical layer (PHY) header of a PPDU (which also may be referred to as a PHY layer header). In some instances, a HARQ PPDU received by the second WLAN device 120 (as the receiving STA) from the first WLAN device 110 (as the sending STA) may include corrupt MPDUs. Since the MPDUs are corrupted, the second WLAN device 120 may not be able to decode the MAC header information, such as the transmitter address (TA), the receiver address (RA), and the acknowledgement policy. Without the addressing information, the second WLAN device 120 may not know what device to respond to, and without the acknowledgment policy, the second WLAN device 120 may not know how to respond, such as whether to send an H-ACK message or a non-HARQ feedback message. When the second WLAN device 120 receives corrupted MPDUs (which may have been sent using a high MCS), the PHY header is typically received and successfully decoded (since it may have been sent using a low MCS). Thus, in some implementations, the first WLAN device 110 may include the addressing information and the acknowledgment policy in the PHY header in HARQ transmissions (such as in HARQ PPDUs).

In some implementations, the first WLAN device 110 may generate and send a HARQ PPDU that includes the addressing information in the PHY header. In some implementations, the first WLAN device 110 may translate the receiver address (RA) and transmitter address (TA) contained in the MAC header of MPDUs contained in the PPDU into a receiver association identifier (RX AID), a transmitter association identifier (TX AID), and include the RX AID, TX AID, and a BSS color in the PHY header of the HARQ PPDU. In some implementations, the first WLAN device 110 may include encoded or randomized addressing information in the PHY header of the HARQ PPDU. For example, the first WLAN device 110 may hash the TX AID with a compressed BSSID to generate an encoded or randomized addressing information (or pseudo-addressing information) for the PHY header. The compressed BSSID may be formed from a portion of the BSSID (such as multiple of the upper or lower bits of the BSSID). In some implementations, the compressed BSSID may be obtained as a function of the BSSID, and may be equal to a 32-bit CRC calculated over the BSSID contained in Beacon frames transmitted by the AP (such as the first WLAN device 110)

which is generating the HARQ PPDU, or by the AP to which the second WLAN device 120 is associated to (where the second WLAN device 120 is generating the HARQ PPDU). Encoding or randomizing the addressing information may further reduce the probability of collisions, since the AIDs and BSS Color are not unique. The second WLAN device 120 may know how the encoded or randomized address information was generated, such as based on a encoding or randomization scheme defined in the HARQ protocol, or based on an information exchange with the first WLAN device 110. Therefore, the second WLAN device 120 may be able to decode and retrieve the addressing information (such as the TX AID) from the PHY header.

In some implementations, when the first WLAN device 110 and the second WLAN device 120 exchange H-RTS and H-CTS messages (such as for determining the amount of memory to allocate to HARQ transmissions), the devices may include the RA and TA in the H-RTS and H-CTS messages. The RA and the TA may be MAC addresses having 48 bits, and MAC addresses typically do not result in collision issues since MAC addresses are expected to be unique. Also, the H-RTS and H-CTS message exchange may precede the HARQ transmission from the first WLAN device 110 to the second WLAN device 120, and therefore the second WLAN device 120 may know in advance the addressing information of the device (the first WLAN device 110) that sent the HARQ transmission.

In some implementations, the first WLAN device 110 may generate and send a HARQ PPDU that includes the acknowledgment policy in the PHY header. For example, the first WLAN device 110 may include an indication (such as one bit) in the PHY header of the HARQ PPDU to request an H-ACK message from the second WLAN device 120. The indication in the PHY header also may indicate that the first WLAN device 110 supports the HARQ protocol, and also may be used to enable or disable the HARQ protocol for a HARQ transmission. For example, when the bit is equal to 1, the first WLAN device 110 may indicate to the second WLAN device to enable the HARQ protocol and may request an H-ACK message. When the bit is equal to 0, the first WLAN device 110 may indicate to the second WLAN device to disable the HARQ protocol for the HARQ PPDU. In some implementations, when the second WLAN device 120 receives the HARQ PPDU indicating to implement the HARQ protocol and return an H-ACK message, the MAC layer at the second WLAN device 120 may be bypassed unless all of the information for an MPDU contained in the PPDU (such as codewords) are successfully received and decoded.

As described herein, the first WLAN device 110 and the second WLAN device 120 may support multiple data sessions, and each data session may be associated with a TID or an AC. In some implementations, the first WLAN device 110 and the second WLAN device 120 may generate and send HARQ transmissions that include the TID or AC information for each of the data sessions in the PHY header. The TID or AC may be included in the PHY header when the device supports multiple data sessions, and there may be different TIDs or ACs associated with the multiple data sessions.

In some implementations, the second WLAN device 120 (as the receiving device) also may include signaling in the PHY header to implement the HARQ protocol. As described herein, signaling may be included in the PHY header because the PHY header is typically received and decoded successfully, even when the MAC information is corrupted. In some implementations, the second WLAN device 120 may include an indication (such as a bit) in the PHY header of a feedback message to indicate whether the packet it sends in response to a received PPDU is an H-ACK message or a Block ACK message. For example, when the bit is equal to 1, it may indicate the feedback message is an H-ACK message. In some implementations, based on the indication in the PHY header, when the first WLAN device 110 determines the feedback message is the H-ACK message, the PHY layer of the first WLAN device 110 may process the H-ACK message and bypass the MAC layer. When the bit is equal to 0, it may indicate the feedback message is a Block ACK message. In some implementations, based on the indication in the PHY header, the PHY layer of the first WLAN device 110 may forward the Block ACK message to the MAC layer.

In some implementations, the second WLAN device 120 may include the RA and TA in the H-ACK message. The RA and TA may be MAC addresses, and therefore it may eliminate any collisions for the H-ACK message. In some implementations, if the second WLAN device 120 receives RX AID and TX AID information from the first WLAN device 110 in the HARQ PPDU, the second WLAN device 120 may map the RX AID and the TX AID to the RA and TA for use in the address fields of the H-ACK message. In some implementations, instead of mapping the RX AID and the TX AID to the RA and TA, the second WLAN device 120 may use the RX AID and the TX AID (which were included in the HARQ PPDU) in the H-ACK message.

In some implementations, when the second WLAN device 120 receives a HARQ PPDU that includes multiple MPDUs (such as an A-MPDU), the second WLAN device 120 may respond with a HARQ feedback message, such as an H-BA message, that includes one or more MPDU-level BA bitmaps, or one or more codeword-level BA bitmaps, or both. An MPDU-level BA bitmap may indicate the receive status of one or more MPDUs, including that of each of the MPDUs that the second WLAN device 120 received in the HARQ PPDU. In some implementations, the H-BA also may include one or more codeword-level BA bitmaps. Each codeword-level BA bitmap may indicate the receive status of one or more codewords sets of the HARQ PPDU, where each codeword set is identified with a starting codeword index (or codeword starting number), and optionally a codeword bitmap (which also me be referred to as CW bitmap). In some implementations, the second WLAN device 120 may not include the receive status of a codeword set if the MPDU-level BA bitmap includes the receive status of the MPDU(s) contained in that codeword set, and vice versa. In some implementations, in a second HARQ PPDU that is sent to the second WLAN device 120, the first WLAN device 110 may include information (such as codewords) for decoding a failed portion of the first HARQ PPDU, and also may include additional MPDUs, (such as MPDUs that have not been previously sent to the second WLAN device 120). The second WLAN device 120 may receive the second HARQ PPDU and determine to respond with an H-BA message that includes one or more codeword-level BA bitmaps and one or more MPDU-level BA bitmaps. The one or more codeword-level BA bitmaps may be used to indicate the successful and unsuccessful reception of the codewords, and the MPDU-level BA bitmaps may be used to indicate the successful and unsuccessful reception of the additional MPDUs. In some implementations, the mapping between each bit of a codeword bitmap and the codeword set may be negotiable during association or during the BA setup. For example, the mapping may specify that one bit of the codeword bitmap maps to one codeword, that one bit of the codeword bitmap maps to two codewords, and so on. Furthermore, in some implementations, the codeword bitmap may provide receive status information about the codeword set, or can include signaling for the codeword set (such as based on one or more bits of the codeword bitmap).

In some implementations, signaling may be added to the PHY header of a PPDU to aid in implementing ARQ or HARQ retransmissions. In some implementations, the first WLAN device 110 may provide a PPDU (such as a HARQ PPDU or a non-HARQ PPDU) to the second WLAN device 120 and the second WLAN device 120 may determine that the one or more MPDUs of the PPDU were not successfully received and decoded. As described herein, even when the reception of all the MPDUs fails, the PHY header may be received successfully by the second WLAN device 120. In some implementations, the second WLAN device 120 may use the information included in the PHY header of the PPDU (such as the TX AID, RX AID, Acknowledgment policy, PPDU duration, MCS, NSS, etc.) to generate a negative (N) ACK (N-ACK) for an ARQ protocol. The N-ACK that is generated by the second WLAN device 120 may improve collision detection, avoid exponential back-off, implement fast link adaptation, and limit losing TXOPs, as will be described in FIGS. 5 and 6.

Figure 2:
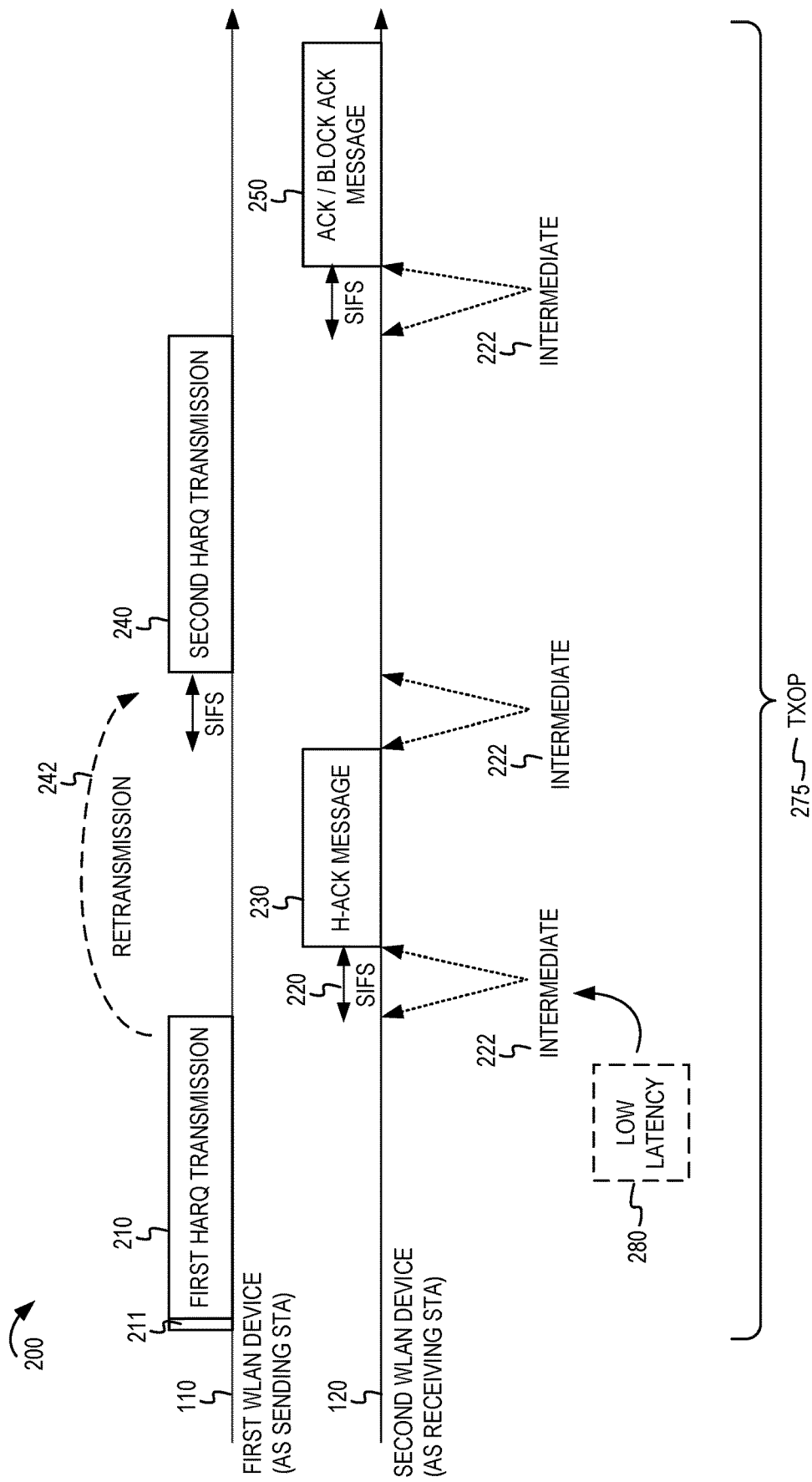
FIG. 2 depicts example HARQ transmissions for implementing a HARQ protocol.

FIG. 2 depicts example HARQ transmissions for implementing a HARQ protocol. A HARQ process 200 may begin with a first HARQ transmission 210 from the first WLAN device 110 to the second WLAN device 120. The first HARQ transmission 210 (sometimes referred to as an initial transmission) may be the initial PPDU or packet in the HARQ exchange for a particular TXOP 275. The first HARQ transmission 210 may include a HARQ indicator (such as a bit, field, or sub-field in a PHY header 211) to indicate that the transmission is a HARQ transmission. For example, a bit in the PHY header 211 may be set to 1 if the first HARQ transmission is a HARQ transmission, or the bit may be set to 0 if the first HARQ transmission is a non-HARQ transmission.

As described in FIG. 1, the first HARQ transmission 210 also may include an indication of the acknowledgement policy. For example, the PHY header 211 may include an ACK policy indicator (such as a bit, field, or sub-field in the PHY header 211) to indicate whether the first WLAN device 110 is enabling the HARQ protocol and requesting a HARQ feedback message (such as an H-ACK message 230 or an H-BA message) in response to the first HARQ transmission 210 (which may be a PPDU). The ACK policy indicator also may be used to indicate when the first WLAN device 110 is disabling the HARQ protocol for the first HARQ transmission 210 and requesting a non-HARQ feedback message (such as an MPDU-level acknowledgment or an MPDU-level block acknowledgment, or both). In some implementations, the first WLAN device 110 may use the ACK policy indicator to dynamically enable or disable the HARQ protocol and HARQ transmissions in certain scenarios. In these scenarios, due to non-uniqueness of the identifiers more than one STA may respond to the first HARQ transmission 210. For example, the identifiers in the PHY header (TX ID, RX ID, etc.) may be such that an overlapping BSS (OBSS) STA may decode the PPDU (such as the first HARQ transmission 210) and generate the HARQ feedback message (such as a H-ACK or H-BA message, such as). Hence, two STAs (intended recipient, and an OBSS STA that is expecting PPDUs with same identifiers from its OBSS peer STA) may respond to the PPDU at the same time (such as within a SIFS time period after receiving the PPDU), causing a collision. In some implementations, the first WLAN device 110 may disable HARQ transmissions if a collision is detected, such as if an H-ACK message is received from a different STA in an OBSS having the same AID (or other identifier or addressing information), or if an H-ACK message is not received and the first WLAN device 110 determines that the failure of reception might be due to a collision (such as the type of collision described herein). The first WLAN device 110 may then assign an alternate identifier or addressing information to the second WLAN device 120 so that the collision event is mitigated (such as by assigning another ID to the second WLAN device 120, or changing (or asking for a change) of the ID of the first WLAN device 110, and so on.

In response to the first HARQ transmission 210, the second WLAN device 120 may send the H-ACK message 230 (such as an H-BA message) back to the first WLAN device 110. The H-ACK message 230 may begin after a short interframe space (SIFS) 220, which represents a determinable time period to maintain synchronization in the WLAN. The H-ACK message 230 may include an H-ACK indicator (such as a bit, field, or sub-field in the PHY header 211) to indicate whether the ACK is an H-ACK message or a non-HARQ ACK message. As described in FIG. 1, the H-ACK message also may include memory management information (such as in a control field of the H-ACK message) to indicate the amount of memory that is allocated (or remaining memory, or both) by the second WLAN device 120 for processing HARQ transmissions (such as the second HARQ transmission 240). In some implementations, the second WLAN device 120 also may control the number of HARQ PPDUs that may be transmitted within a TXOP (such as the TXOP 275). For example, in addition to the initial PPDU (such as the first HARQ transmission 210), one or more additional HARQ PPDUs may be transmitted from the first WLAN device 110 to the second WLAN device 120 during a particular TXOP to try to decode and recover portions of the initial PPDU that failed. The H-ACK message 230 may include a PPDU indicator in a control field to indicate a maximum number of PPDUs that can be transmitted within a TXOP (such as a maximum number of two PPDUs). In some implementations, the second WLAN device 120 may determine that it has a limited amount of memory or no memory available to process further HARQ transmissions, and therefore the second WLAN device 120 may include an indication in the H-ACK message 230 (or alternatively send a non-HARQ ACK, such as MPDU-level ACK, N-ACK, or MPDU-level BA) to indicate to the first WLAN device 110 to use the ARQ protocol (such as by retransmitting one or more MPDUs from the initial PPDU) rather than using the HARQ protocol (retransmitting one or more codewords from the initial PPDU).

In response to receiving the H-ACK message 230, the first WLAN device 110 may send the second HARQ transmission 240 to the second WLAN device 120 (such as after a SIFS period). The second HARQ transmission 240 may represent a retransmission 242 of a least a portion of the first HARQ transmission 210 or information (such as codewords) that will be used to try to decode and recover the portions of the first HARQ transmission 210 that failed. Similar to the first HARQ transmission 210, the second HARQ transmission 240 also may include a HARQ indicator and an ACK policy indicator, such as in the PHY header. In some implementations, the second HARQ transmission 240 may contain a shorter PHY header compared to the first HARQ transmission 210. For example, the second HARQ transmission 240 may not include identifiers and other redundant information that was already contained in the initial transmission (such as the first HARQ transmission 210). As an example, the initial HARQ PPDU (such as the first HARQ transmission 210) may contain a SIG field that contains HARQ parameters (identifiers) and the second HARQ PPDU (such as the second HARQ transmission 240) may not contain that SIG field.

Following the second HARQ transmission 240, when the second WLAN device 120 has successfully recovered the MPDUs from the first HARQ transmission, or when the maximum number of PPDUs have been transmitted within the TXOP 275, the second WLAN device 120 may send either an MPDU-level ACK or MPDU-level Block ACK message 250 (such as after a SIFS period). In some implementations, the response message may not contain a codeword-level BA bitmap. In the example shown in FIG. 2, the ACK or Block ACK message 250 may complete the HARQ process 200.

In some implementations, the first WLAN device 110 (and the second WLAN device 120) may implement signaling between the PHY layer and the MAC layer to allow the MAC layer to perform traffic prioritization and scheduling during a TXOP (such as the TXOP 275). When processing a HARQ sequence, which may be one or more HARQ PPDUs for the same payload (and that ends with an ACK or BA), the MAC layer typically instructions the PHY later to begin HARQ transmissions for a TXOP (such as the TXOP 275), and the PHY layer reports back to the MAC layer either after the overall HARQ sequence has ended or after each PPDU transmission or reception end times, or both. The latter may be beneficial because it gives the opportunity to the MAC to prioritize the PPDUs sent within the TXOP, allowing delivery of higher priority traffic. For example, the PHY layer may provide an indication or estimate of the transmitter start and end times (TX START and END) and the receiver start and end times (RX START and END) of the various PPDUs that are exchanged during the TXOP 275. By having an indication or estimate of the timing of the intermediate time periods 222 between the PPDUs of the TXOP 275, the MAC layer may perform traffic prioritization and scheduling of both HARQ and non-HARQ PPDUs. For example, the MAC layer may detect a low latency transmission 280 that is higher priority than the HARQ transmissions (such as during the transmission of the first HARQ transmission 210). The MAC layer may determine the timing of the first intermediate time period 222 after the end of the first HARQ transmission 210, and may begin transmitting the low latency transmission 280 at the start of the intermediate time period 222. In some scenarios, transmitting the low latency transmission 280 may take longer than the intermediate time period 222, and thus the MAC layer may delay the rest of the HARQ transmissions in order to prioritize the scheduling of the low latency transmission 280. In some implementations, the MAC layer may abort HARQ transmissions, for example by transmitting a PPDU that contains the low latency traffic (such as the low latency transmission 280) or by transmitting a HARQ-abort message (which can be sent over the air as well to the peer device to indicate to abort HARQ transmissions).

In some implementations, the PHY layer may provide an indication to the MAC layer if an H-ACK message (such as the H-ACK message 230) is not received from the second WLAN device 120. The MAC layer may then implement ACK timeouts, which may trigger exponential back-off countermeasures in case there was a collision. In some implementations, the PHY layer may provide an indication to the MAC layer when an H-ACK message should be generated, and the MAC layer may provide parameters (such as a TXVECTOR parameter) to the PHY layer. In some implementations, the PHY layer may provide information to the MAC layer about the SIFS, point coordination function (PCF) interframe space (PIFS), and enhanced distributed channel access (EDCA) contention between PPDUs and HARQ PPDUs in a TXOP (such as the TXOP 275). This may allow the MAC layer to determine a TXOP duration and the timing of the intermediate time periods (such as the intermediate time periods 222), which may allow the MAC layer to schedule both HARQ and non-HARQ PPDUs, and truncate excessive TXOPs. Additional options and examples regarding traffic prioritization and scheduling, and PHY and MAC layer signaling and interactions are described in FIG. 10.

FIG. 3 depicts another example of HARQ transmissions for implementing a HARQ protocol. A HARQ process 300 may begin with the first WLAN device 110 sending a HARQ request to send (H-RTS) message 302 to the second WLAN device 120 to request the second WLAN device 120 permission to initiate a HARQ sequence or to indicate the amount of available memory that it will allocate to process HARQ transmissions, or both. For example, the first WLAN device 110 may include an indication (such as one or more bits in a control field) in the H-RTS message 302 to request the amount of available memory from the second WLAN device 120. The device can alternatively, or additionally, indicate the amount of memory that it requests the second WLAN device 120 to allocate. The second WLAN device 120 may send an H-CTS message 304 having an indication (such as one or more bits in a control field) of the amount of available memory that the second WLAN device 120 will allocate for processing HARQ transmissions. The second device also may indicate that it has no memory allocated for HARQ transmissions. The first WLAN device may then generate and send HARQ transmissions (such as the first HARQ transmission 210 and the second HARQ transmission 240) based on the amount of available memory at the second WLAN device 120. The second WLAN device 120 also may transmit an H-ACK message 230 (such as an H-BA message) and an ACK or Block ACK message 250, similarly as described in FIG. 2, during a TXOP (such as the TXOP 375 shown in FIG. 3), where the message also contains an indication of the remaining memory allocated for HARQ transmissions.

In some implementations, the first WLAN device 110 may send an H-RTS message 302 indicating to the second WLAN device 120 that it will send a HARQ PPDU with a first maximum amount of memory (such as, for example, a maximum of 6 MB). The second WLAN device 120 may determine the amount of available memory it will allocate to process HARQ transmissions is a second amount of memory (such as, for example, 2 MB) that is less than the first maximum amount of memory. Thus, the second WLAN device 120 may respond with an H-CTS message 304 that accepts the request for a HARQ transmission, but limiting the amount of memory associated with the HARQ transmission to 2 MB (which is the maximum amount of available memory the second WLAN device 120 will allocate for processing HARQ transmissions). As described herein, the first WLAN device 110 may generate and send the first HARQ transmission 210 and the second HARQ transmission 220 complying with the memory limits specified by the second WLAN device 120.

In some implementations, the first WLAN device 110 may generate and send the first HARQ transmission 210 based on amount of available memory indicated in the H-CTS 304, and the second WLAN device 120 may re-evaluate the amount of available memory for processing HARQ transmissions when preparing the H-ACK message 230. In some implementations, the second WLAN device 120 may indicate a different amount of available memory to allocate to processing HARQ transmissions in the H-ACK message 230 (compared to the H-CTS 304), and the first WLAN device may use this updated amount for generating and sending the second HARQ transmission 240. For example, the first WLAN device 110 may truncate the HARQ PPDU by cutting out a portion of the codewords that were not stored at the recipient (such as the second WLAN device 120). For example, if the initial HARQ PPDU had 2 MBs of payload, and the second WLAN device 120 indicated an amount of memory of 1 MBs in the H-ACK message, then the second HARQ PPDU may be truncated to 1 MBs of payload (lowest part) and the second 1 MBs (upper part) may be discarded). As described in FIG. 2, exchanging H-RTS and H-CTS messages also may allow the exchange and establishment of addressing information (such as an RA and TA) for subsequent HARQ transmissions.

Figure 4:
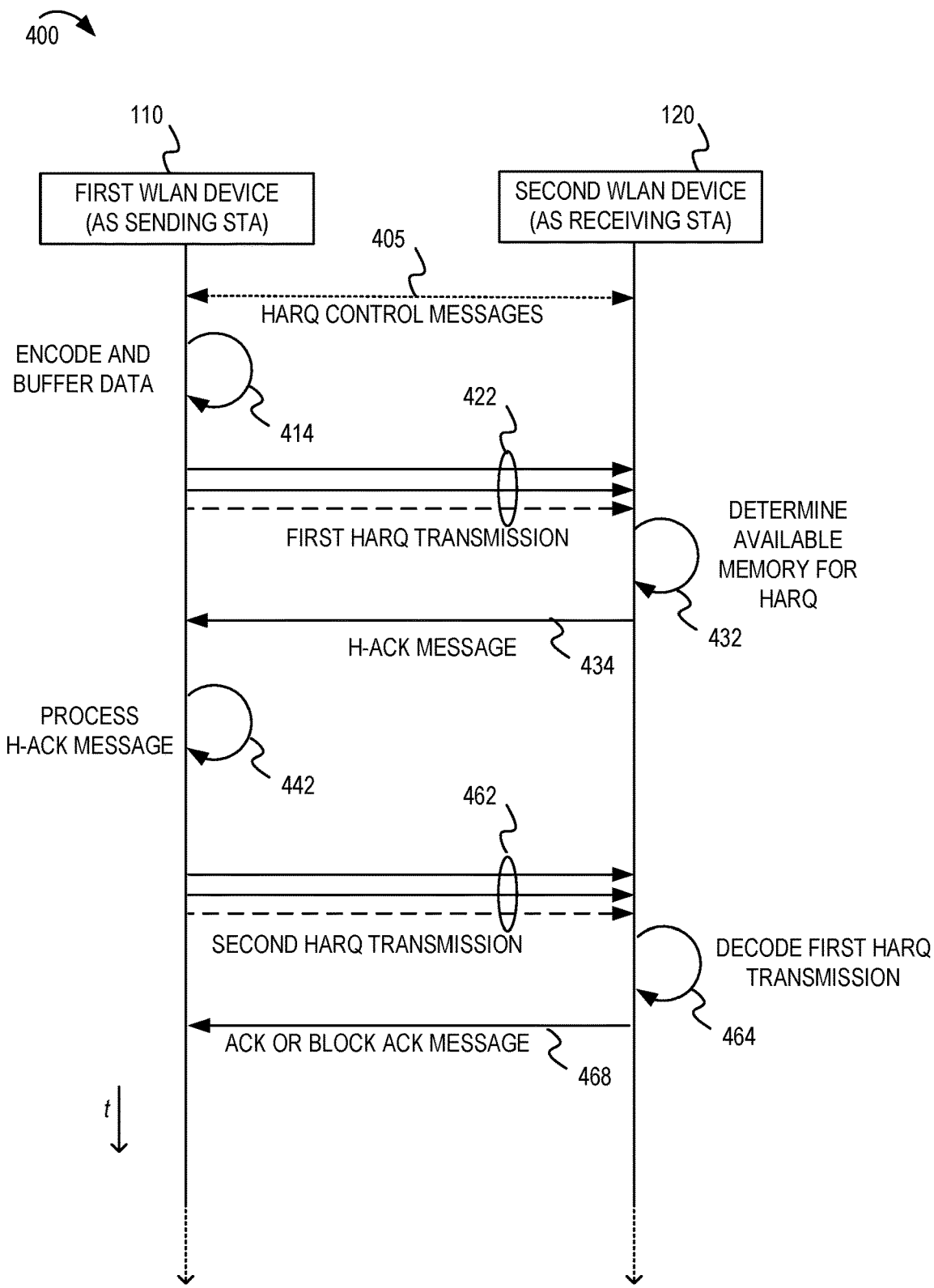
FIG. 4 depicts an example message flow diagram associated with a HARQ protocol.

FIG. 4 depicts an example message flow diagram associated with a HARQ protocol. The example message flow 400 shows the first WLAN device 110 (as the sending STA) and the second WLAN device 120 (as the receiving STA). The first WLAN device 110 and the second WLAN device 120 may optionally exchange control messages 405, such as H-RTS and H-CTS messages, for determining the amount of available memory to allocate for processing HARQ transmissions (and also for establishing addressing information for subsequent HARQ transmissions).

At process 414, the first WLAN device 110 may encode and buffer a first set of data for the HARQ sequence. The first HARQ transmission 422 may include an MPDU or multiple MPDUs or segments of the first set of data. The first WLAN device 110 also may determine the information (such as the ACK policy) to include in the PHY header of the first HARQ transmission 422, as described in FIGS. 1 and 2. At process 432, the second WLAN device 120 may receive and process the first HARQ transmission 422 from the first WLAN device 110. The second WLAN device 120 also may determine information to include in the H-ACK message 434, as described in FIGS. 1 and 2. For example, the second WLAN device 120 may determine the amount of available memory to allocate for HARQ transmissions. The second WLAN device 120 may send the H-ACK message 434 (such as an H-BA message) to the first WLAN device 110. At process 442, the first WLAN device 110 may process the H-ACK message 434 received from the second WLAN device 120, as described in FIGS. 1 and 2.

The first WLAN device 110 may generate and send a second HARQ transmission 462. In some implementations, the H-ACK message 434 may include feedback information regarding which portions of the first HARQ transmission 422 were not successfully decoded. Based on at least the feedback information, the first WLAN device 110 may prepare the second HARQ transmission 462.

At process 464, following the second HARQ transmission 462, the second WLAN device 120 may use the information of the second HARQ transmission 462 to decode and recover the remaining portions of the first HARQ transmission 422 that previously failed. The second WLAN device 120 may then send an MPDU-level ACK or MPDU-level Block ACK message 468 to the first WLAN device 110, which may end the HARQ sequence.

Figure 5:
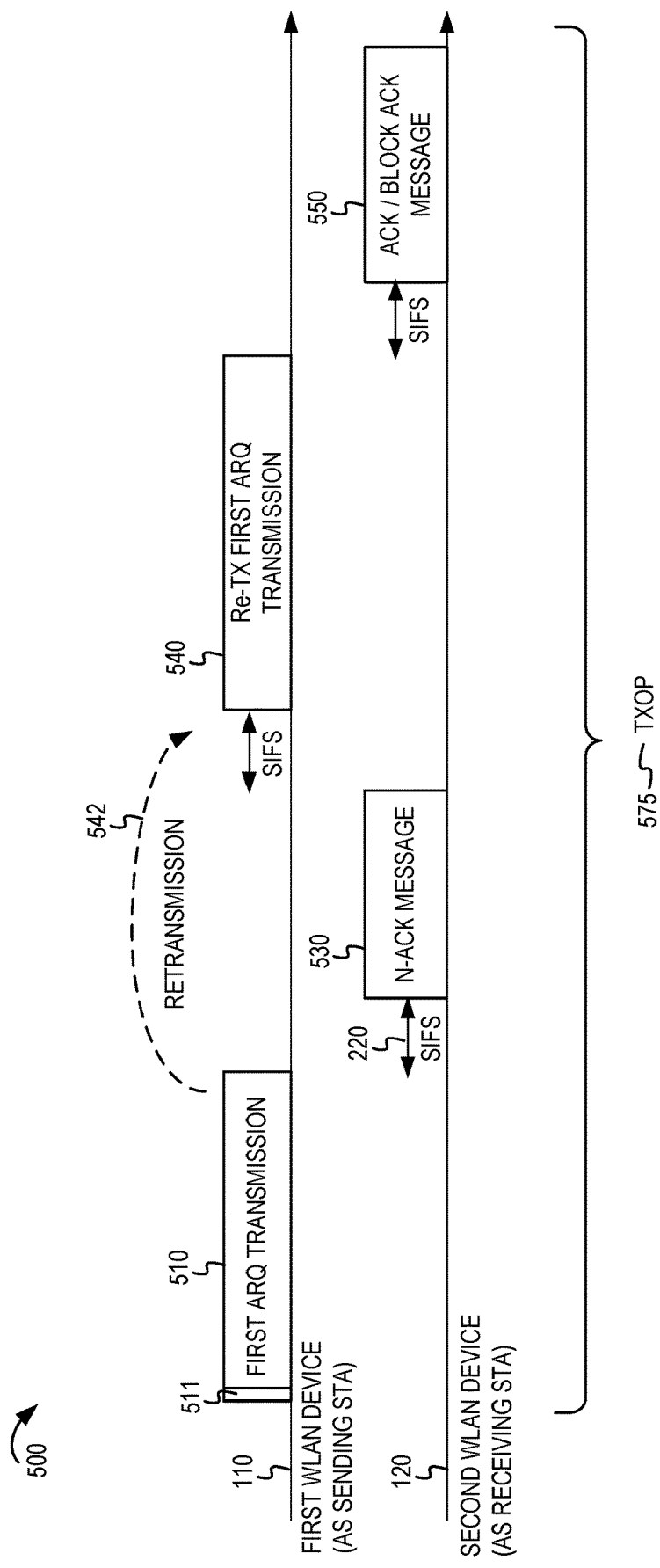
FIG. 5 depicts example automatic repeat request (ARQ) transmissions for implementing an ARQ protocol.

FIG. 5 depicts example ARQ transmissions for implementing an ARQ protocol. An ARQ process 500 may begin with a first ARQ transmission 510 from the first WLAN device 110 to the second WLAN device 120. For example, the first ARQ transmission 510 may include at least one or more MPDUs and a PHY header (such as the PHY header 511 shown in FIG. 5). As described in this disclosure, even when the one or more MPDUs of a PPDU are not successfully received, the PHY header is typically successfully received. Thus, similar to the HARQ process described in this disclosure, the first WLAN device 110 may include information in the PHY header 511 of the first ARQ transmission 510 that may be used to improve the ARQ process 500, such as by improving collision detection, performing fast link adaptation, avoiding performing unnecessary exponential back-offs, and limiting losing TXOPs. The first ARQ transmission 510 may include a TX AID, an RX AID, an ACK policy indicator, a PPDU duration indicator, a modulation and coding scheme (MCS) indicator, a number of spatial streams (NSS) indicator, a bandwidth (BW) indicator, a guard interval (GI) indicator, and an FEC indicator, among others. While these concepts and examples are described for ARQ, in some implementations these concepts and examples may be valid for HARQ as well.

The second WLAN device 120 may determine that all of the MPDUs of the PPDU associated with the first ARQ transmission 510 are corrupted or failed to be received. However, the second WLAN device 120 may successfully receive and recover the PHY header 511. After SIFS 220, the second WLAN device 120 may send a N-ACK message 530 to the first WLAN device 110 indicating the whole PSDU (such as one or more MPDUs) has failed to be received properly. Since the second WLAN device 120 received and recovered the PHY header 511, the second WLAN device 120 may determine there was not a collision, and may provide to the first WLAN device 110 in the N-ACK message 530 a recommendation or a requirement of certain parameters the first WLAN device 110 to use in a retransmission 542 to improve the chances of the second WLAN device 120 receiving the retransmitted (Re-TX) first ARQ transmission 540 or subsequent transmissions. For example, the second WLAN device 120 may determine the MCS for the PSDU of the first ARQ transmission 510 was an aggressive MCS. Thus, the second WLAN device 120 may include an indication in the N-ACK message 530 to use a lower MCS for the retransmission 542 (for example, lower from an aggressive MCS9 to a lower MCS2). As another example, the second WLAN device 120 also may recommend to increase the GI, reduce the NSS, lower the BW of the PPDU, and so on. In some implementations, this information (such as the indication to lower the MCS, increase GI, reduce NSS, lower BW, etc.) also may be included in the other types of feedback messages (such as Block ACK, ACK, H-BA, etc.).

In some implementations, the second WLAN device 120 also may include a recommended target transmit time, one or more frequency channels, and transmit power for the retransmission 542 in the N-ACK message 530 (such as for fast link adaptation). For example, the second WLAN device 120 may indicate to use a channel in the upper part of the frequency band, because the device's primary channel (where the first ARQ transmission 510 was sent) that is in the lower part of the frequency band is inappropriate for use due to interfering and ongoing traffic. The second WLAN device 120 also may be aware of concurrent OBSS transmissions that may cause interference, and may indicate to in the N-ACK message 530 a suggested transmit time (which may correspond to a time when the OBSS transmissions will end) and a channel the OBSS transmissions are using. The second WLAN device 120 also may recommend a transmit power adjustment (or a particular transmit power) in the N-ACK message 530 to increase the reception likelihood with limited interference.

The first WLAN device 110 may receive the N-ACK message 530 from the second WLAN device 120 and determine to retransmit the first ARQ transmission (send the Re-TX first ARQ transmission 540) to the second WLAN device 120. Since the first WLAN device 110 received a N-ACK message 530 (such as within an ACK timeout period), the first WLAN device 110 may determine that there wasn't a collision, and therefore may not perform exponential back-off countermeasures. The first WLAN device 110 may then use the recommended information in the N-ACK message 530 for generating and sending the Re-TX first ARQ transmission 540. The second WLAN device 120 may successfully receive the Re-TX first ARQ transmission 540 and then may send an ACK or Block ACK message 550. The ACK or Block ACK message 550 may be the last transmission sent within the TXOP 575 and may be the end of the ARQ process 500, as shown in FIG. 5.

Figure 6:
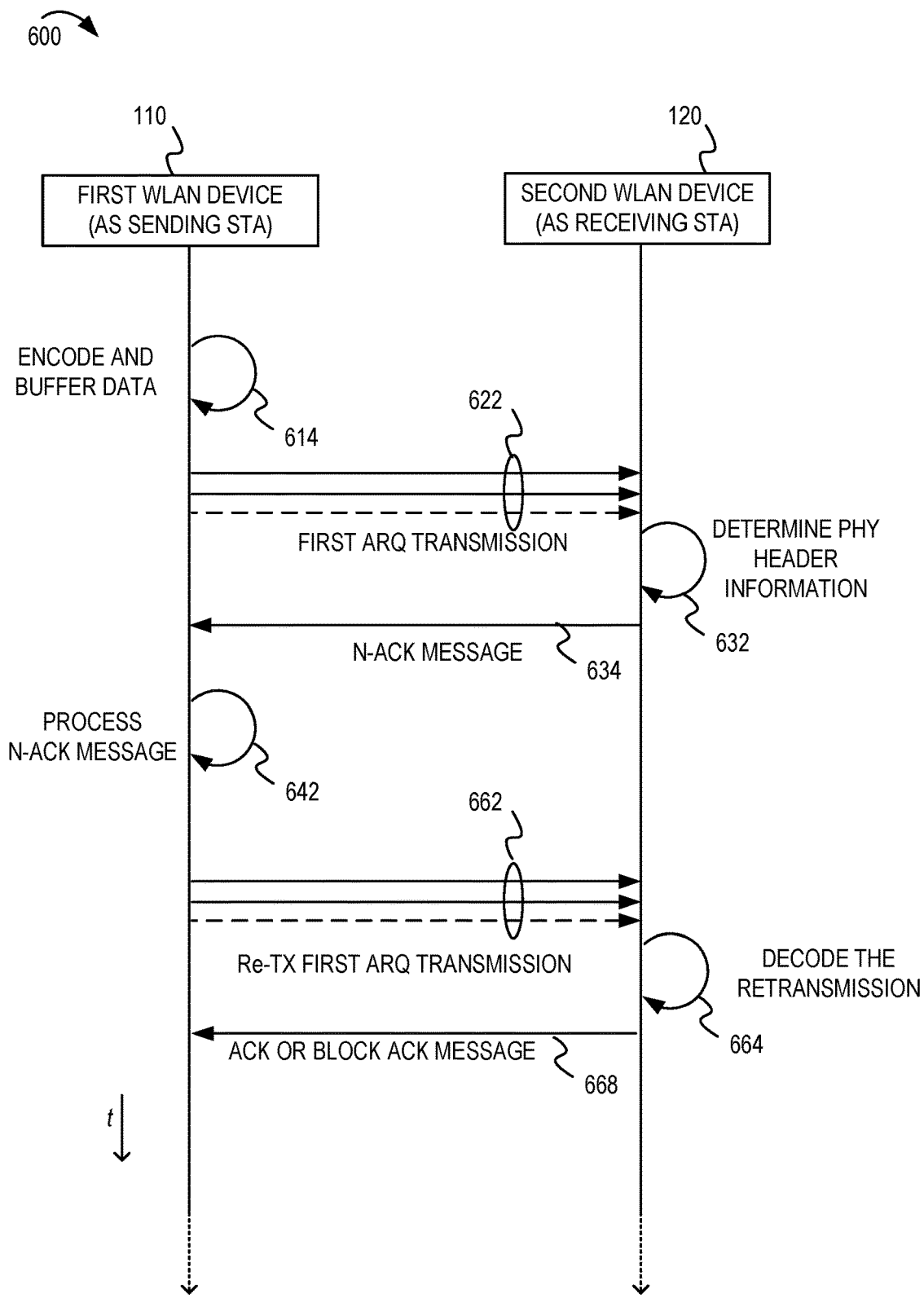
FIG. 6 depicts an example message flow diagram associated with an ARQ protocol.

FIG. 6 depicts an example message flow diagram associated with an ARQ protocol. The example message flow 600 shows the first WLAN device 110 (as the sending STA) and the second WLAN device 120 (as the receiving STA).

At process 614, the first WLAN device 110 may encode and buffer a first set of data for the ARQ process. The first ARQ transmission 622 may include an MPDU or multiple MPDUs or segments of the first set of data. As described in FIG. 5, the first WLAN device 110 also may determine the information to include in the PHY header of the first ARQ transmission 622, such as an ACK policy indicator, a PPDU duration indicator, an MCS indicator, an NSS indicator, a BW indicator, a GI indicator, and an FEC indicator, among others.

At process 632, the second WLAN device 120 may determine that the one or more MPDUs of the PPDU associated with the first ARQ transmission 622 are corrupted or failed to be received. However, the second WLAN device 120 may successfully receive and recover the PHY header of the first ARQ transmission 622. As described in FIG. 5, the second WLAN device 120 use the information in the PHY header of the first ARQ transmission 622 (and channel and network conditions) to recommend the first WLAN device 110 use certain parameters in the retransmission of the first ARQ transmission 622. For example, the second WLAN device 120 may generate a N-ACK message 634 that includes an indication of various recommended parameters for the retransmission, such as a lower MCS, a target transmit time, a target channel, and a transmit power (or transmit power adjustment). The second WLAN device 120 may send the N-ACK message 634 to the first WLAN device 110. At process 642, the first WLAN device 110 may process the N-ACK message 634 received from the second WLAN device 120. Also, the first WLAN device 110 may determine the recommended parameters and other information in the N-ACK message 634, and may generate and transmit the Re-TX first ARQ transmission 662 based on the recommended parameters.

At process 664, the second WLAN device may successfully receive the Re-TX first ARQ transmission 662, and may then send an ACK or Block ACK message 668 to the first WLAN device 110, which may end the ARQ process.

Figure 7:
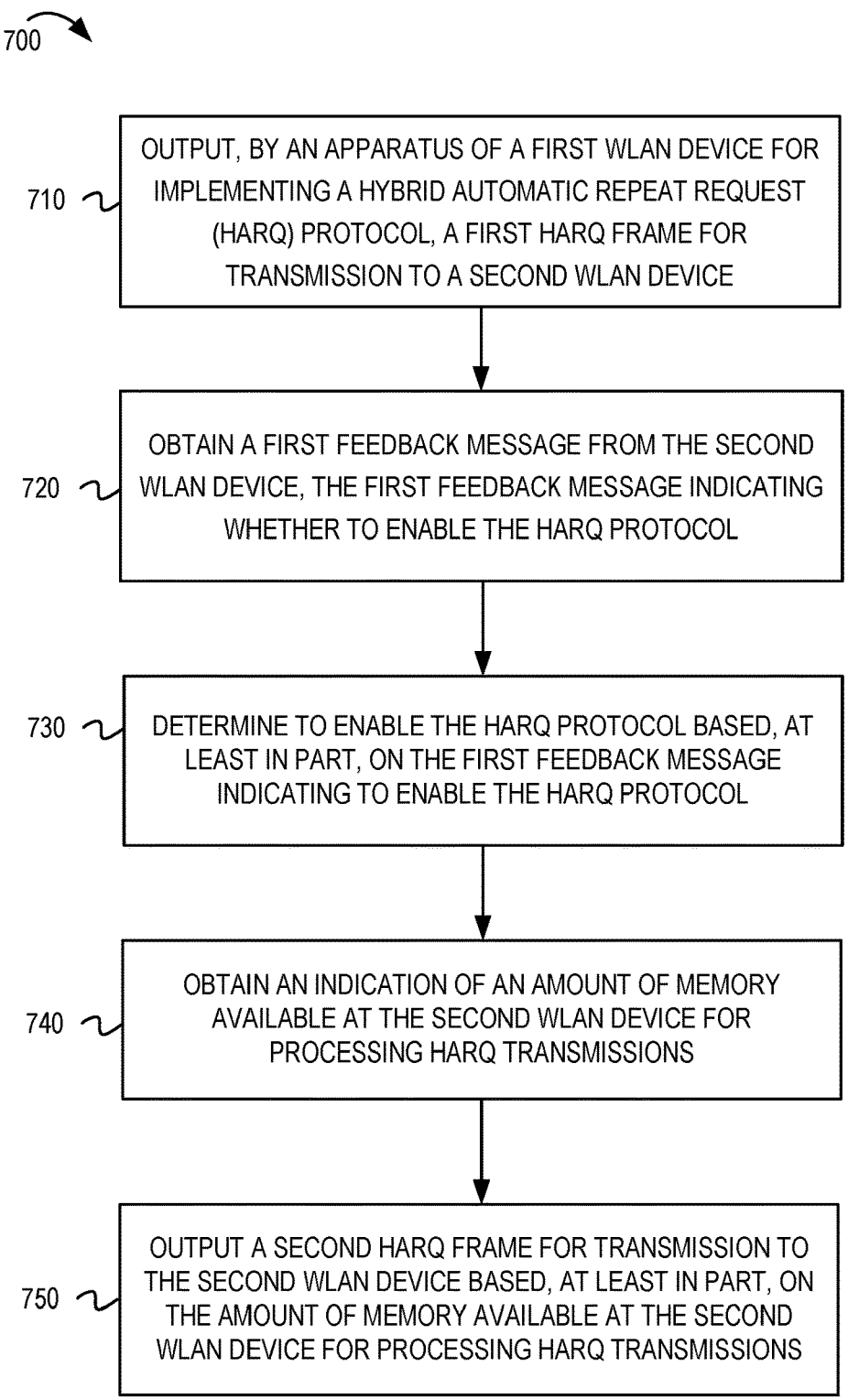
FIG. 7 depicts a flowchart with example operations performed by an apparatus of a first WLAN device for implementing a HARQ protocol.

FIG. 7 depicts a flowchart 700 with example operations performed by an apparatus of a first WLAN device for implementing a HARQ protocol. The first WLAN device may be the sending STA and the second WLAN device may be the receiving STA.

At block 710, an apparatus of the first WLAN device may output a first HARQ frame for transmission to the second WLAN device.

At block 720, the apparatus of the first WLAN device may obtain a first feedback message from the second WLAN device. The first feedback message may indicate whether to enable the HARQ protocol.

At block 730, the apparatus of the first WLAN device may determine to enable the HARQ protocol based, at least in part, on the first feedback message indicating to enable the HARQ protocol. For example, the apparatus of the first WLAN device may determine that the first feedback message is an H-ACK message (such as an H-BA message) that indicates to enable the HARQ protocol.

At block 740, the apparatus of the first WLAN device may obtain an indication of an amount of memory available at the second WLAN device for processing HARQ transmissions. In some implementations, the apparatus of the first WLAN device may obtain an indication of the amount of memory available at the second WLAN device for processing HARQ transmissions via the first feedback message. For example, the apparatus of the first WLAN device may obtain the indication of the amount of memory available at the second WLAN device for processing HARQ transmissions based on the H-ACK message (such as an H-BA message) received from the second WLAN device. In some implementations, the apparatus of the first WLAN device may determine the amount of memory available at the second WLAN device for processing HARQ transmissions based on a second HARQ-related communication. The second HARQ-related communication may be an H-CTS message (received in response to sending an H-RTS message), a management frame (received during association), or a Block ACK setup message. In some implementations, prior to transmission of the first HARQ frame (i.e., the first HARQ transmission 210 shown in FIG. 3), the apparatus of the first WLAN device may output an H-RTS message for transmission to the second WLAN device. The H-RTS packet may include a request for the amount of memory available at the second WLAN device for processing HARQ transmissions. The apparatus of the first WLAN device may obtain an H-CTS message from the second WLAN device in response to transmission of the H-RTS. The H-CTS message may include the indication of the amount of memory available at the second WLAN device for processing HARQ transmissions. In some implementations, prior to transmission of the first HARQ frame (such as during association), the apparatus of the first WLAN device may obtain a management frame from the second WLAN device, which may include the indication of the amount of memory available at the second WLAN device for processing HARQ transmissions. In some implementations, prior to transmission of the first HARQ frame (such as during the Block ACK setup message exchange), the apparatus of the first WLAN device may obtain a Block ACK setup message from the second WLAN device, which may include the indication of the amount of memory available at the second WLAN device for processing HARQ transmissions.

At block 750, the apparatus of the first WLAN device may output a second HARQ frame for transmission to the second WLAN device based, at least in part, on the amount of memory available at the second WLAN device for processing HARQ transmissions.

Figure 8:
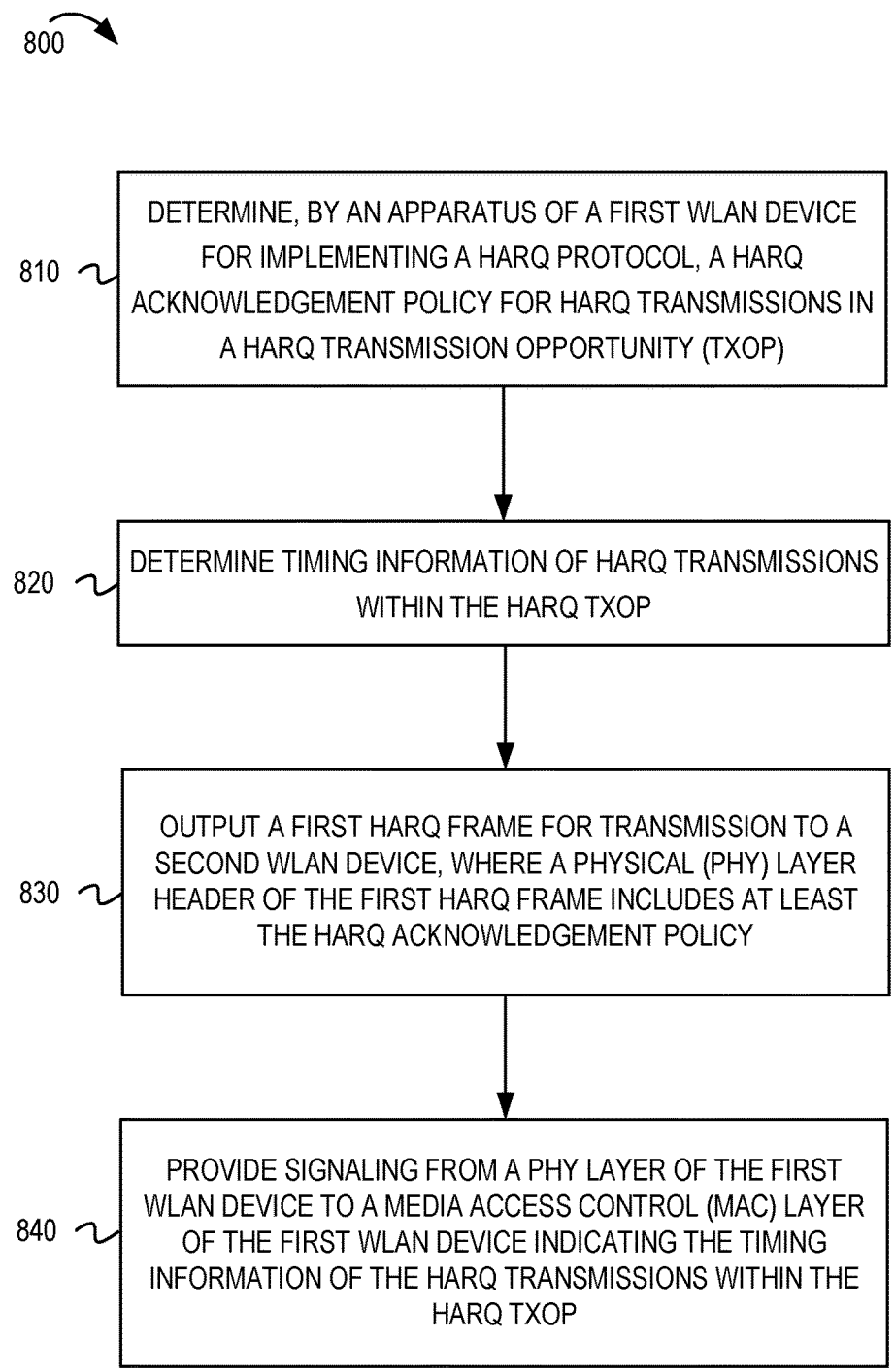
FIG. 8 depicts a flowchart with example operations performed by an apparatus of a first WLAN device for implementing a HARQ protocol.

FIG. 8 depicts a flowchart 800 with example operations performed by an apparatus of a first WLAN device for implementing a HARQ protocol. The first WLAN device may be the sending STA and the second WLAN device may be the receiving STA.

At block 810, an apparatus of the first WLAN device may determine a HARQ acknowledgement policy for HARQ transmissions in a HARQ transmission opportunity (TXOP). For example, the HARQ acknowledgement policy may indicates whether to enable the HARQ protocol and whether an H-BA message is requested from the second WLAN device.

At block 820, the apparatus of the first WLAN device may determine timing information of HARQ transmissions within the HARQ TXOP. For example, the PHY layer of the first WLAN device may determine start and end times of each of the HARQ transmissions within the HARQ TXOP to determine intermediate time periods between HARQ transmissions within the HARQ TXOP.

At block 830, the apparatus of the first WLAN device may output a first HARQ frame for transmission to a second WLAN device. A PHY layer header of the first HARQ frame may include at least the HARQ acknowledgement policy.

At block 840, the apparatus of the first WLAN device may provide signaling from a PHY layer of the first WLAN device to the MAC layer of the first WLAN device indicating the timing information of the HARQ transmissions within the HARQ TXOP. The MAC layer of the first WLAN device may use the intermediate time periods for traffic prioritization and scheduling purposes, such as prioritizing the scheduling of low latency transmissions (as described in FIG. 2).

Figure 9:
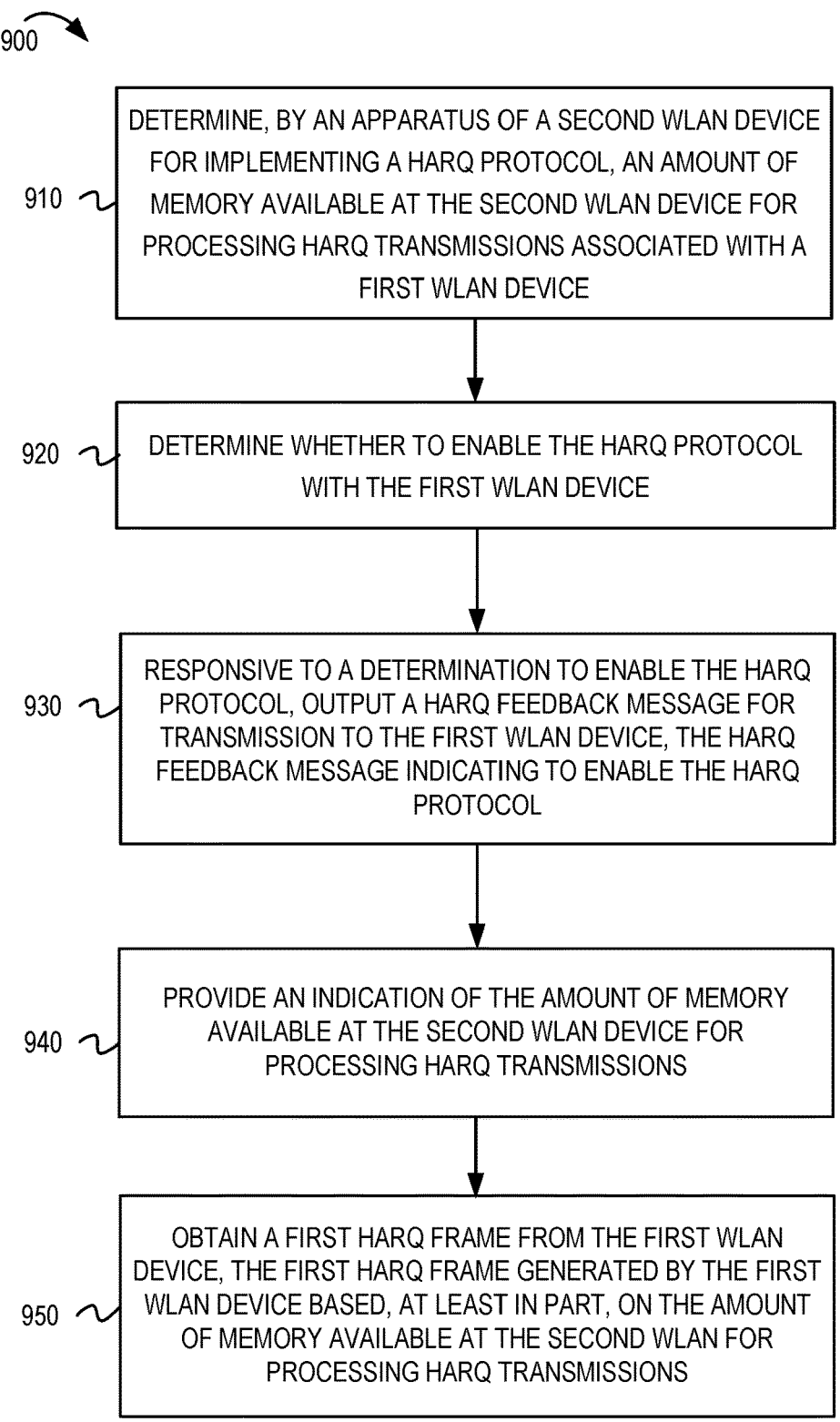
FIG. 9 depicts a flowchart with example operations performed by an apparatus of a second WLAN device for implementing a HARQ protocol.

FIG. 9 depicts a flowchart 900 with example operations performed by an apparatus of a second WLAN device for implementing a HARQ protocol. The second WLAN device may be the receiving STA, and the first WLAN device may be the sending STA.

At block 910, the apparatus of the second WLAN device may determine an amount of memory available at the second WLAN device for processing HARQ transmissions associated with the first WLAN device.

At block 920, the apparatus of the second WLAN device may determine whether to enable the HARQ protocol with the first WLAN device.

At block 930, responsive to a determination to enable the HARQ protocol, the apparatus of the second WLAN device may output a HARQ feedback message (such as an H-ACK message or an H-BA message) for transmission to the first WLAN device. The HARQ feedback message may indicate to enable the HARQ protocol.

At block 940, the apparatus of the second WLAN device may provide an indication of the amount of memory available at the second WLAN device for processing HARQ transmissions. In some implementations, the HARQ feedback message may include an indication of the amount of memory available at the second WLAN device for processing HARQ transmissions. In some implementations, a second HARQ-related communication may include an H-CTS message (sent in response to receiving an H-RTS message), a management frame (sent during association), or a block ACK setup message. For example, the apparatus of the second WLAN device may provide an indication of the amount of memory available at the second WLAN device for processing HARQ transmissions in at least one of the HARQ feedback message (such as an H-ACK message or an H-BA message), the H-CTS message, the management frame, or the Block ACK setup message.

At block 950, the apparatus of the second WLAN device may obtain a first HARQ frame from the first WLAN device.

The first HARQ frame may be generate by the first WLAN device based, at least in part, on the amount of memory available at the second WLAN for processing HARQ transmissions.

Figure 10:
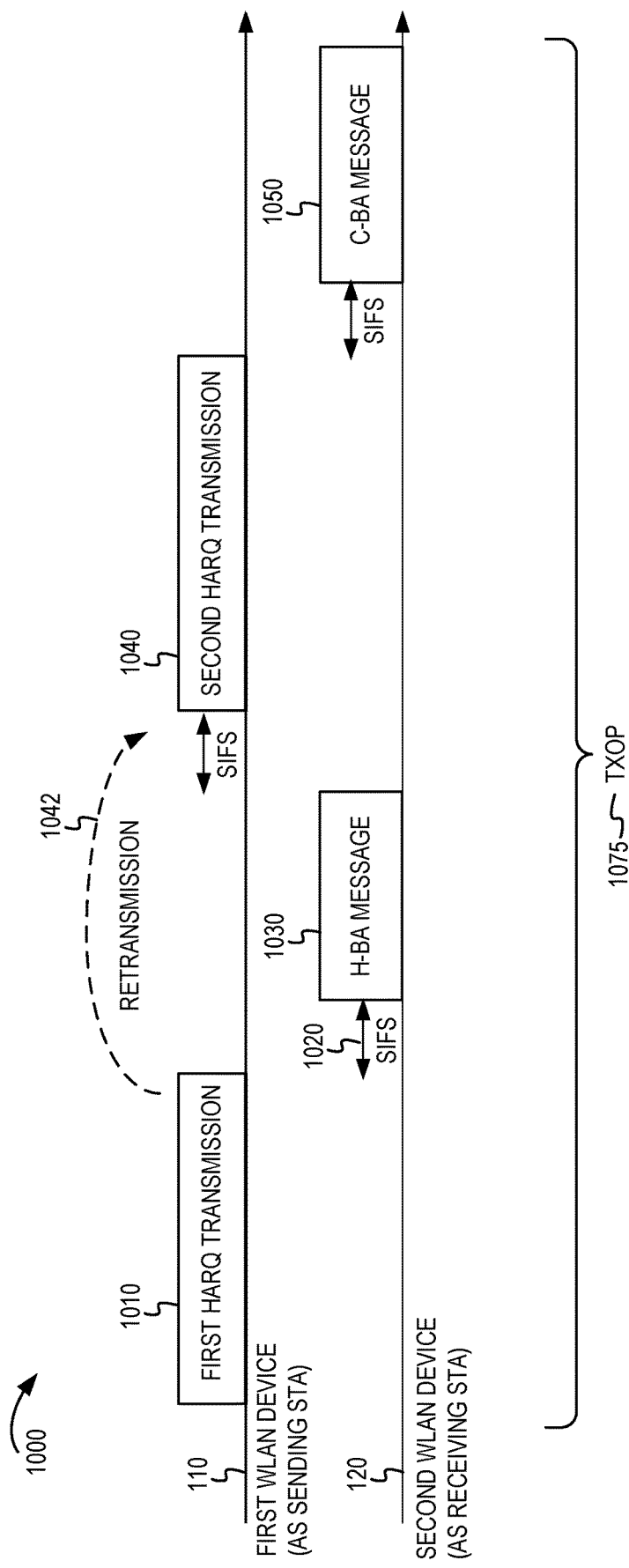
FIG. 10 depicts another example of HARQ transmissions for implementing a HARQ protocol using Block Acknowledgement (ACK) messages.

FIG. 10 depicts another example of HARQ transmissions for implementing a HARQ protocol using Block ACK messages. Similar to FIG. 2, a HARQ process 1000 may begin with a first HARQ transmission 1010 from the first WLAN device 110 to the second WLAN device 120. The first HARQ transmission 1010 may be the initial PPDU or packet in the HARQ exchange for a particular TXOP 1075. The first HARQ transmission 1010 may include a HARQ indicator (such as a bit, field, or sub-field) to indicate that the transmission is a HARQ transmission. For example, a bit in the PHY header may be set to 1 if the first HARQ transmission is a HARQ transmission, or the bit may be set to 0 if the first HARQ transmission is a non-HARQ transmission. In some implementations, the MAC of the first WLAN device 110 may select the HARQ indicator that indicates the transmission is a HARQ transmission.

In some implementations, the first WLAN device 110 may initialize and maintain a codeword list for the first HARQ transmission 1010 (such as a HARQ PPDU). For example, the MAC of the first WLAN device 110 may initialize and maintain the codeword list. The first HARQ transmission 1010 may include one or more codeword bitmaps of contiguous codewords or of codeword groups. The codeword list may include a codeword start index and a codeword end index for each codeword bitmap. In some implementations, the codewords may be LDPC codewords. After initializing the codeword list, the MAC of the first WLAN device 110 may instruct the PHY of the first WLAN device 110 to generate the first HARQ transmission 1010 and to store the codewords. The PHY may construct the PHY header of the first HARQ transmission 1010 and may store the codewords of the first HARQ transmission 1010. The PHY header may include the HARQ-related information that is described in this disclosure, such as HARQ indicating information, addressing information, acknowledgement policy information, etc. When the PHY begins transmitting the first HARQ transmission 1010, the PHY may provide (such as on-the-fly) an index of the transmitted codewords to the MAC. Thus, the MAC may maintain and update a codeword scoreboard of the transmitted codewords. For example, after receiving an H-BA message, the MAC may update the codeword scoreboard to indicate which codewords were successfully received, and which codewords were not successfully received and may be retransmitted.

In some implementations, the second WLAN device 120 may receive the first HARQ transmission 1010 and may process the PHY header. For example, the PHY of the second WLAN device 120 may determine the transmission is a HARQ transmission based on the HARQ indicator in the PHY header, and may determine the transmission is intended for the second WLAN device 120 using the addressing information in the PHY header (such as the RX AID, the TX AID, and the BSS Color). In some implementations, the PHY of the second WLAN device 120 may provide the codeword list associated with the first HARQ transmission 1010 to the MAC. The PHY also may provide (on-the-fly) an index or indication of the successfully received codewords of the first HARQ transmission 1010 to the MAC. The MAC may initialize and maintain the codeword list (including the codeword start index and codeword end for each of the codeword bitmaps) for the first HARQ transmission

1010, and also may maintain an indication of the codewords that were successfully received (and not successfully received).

In response to receiving and processing the first HARQ transmission 1010, the second WLAN device 120 may send an H-BA message 1030 to the first WLAN device 110. The H-BA message 1030 may begin after the SIFS 1020. In some implementations, the second WLAN device 120 may generate the H-BA message 1030 for transmission to the first WLAN device 110 when the second WLAN device 120 successfully received at least some of the codewords of the first HARQ transmission 1010. In some implementations, the H-BA message 1030 may include one or more codeword-level bitmaps that indicate the receive status of the codewords of the first HARQ transmission 1010. For example, the one or more codeword-level bitmaps may indicate the receive status of the LDPC codewords of the first HARQ transmission 1010. For example, for each LDPC codeword, a codeword-level bitmap may indicate success or failure of decoding the LDPC codeword. In some implementations, the H-BA message 1030 may include one or more codeword-level bitmaps that indicate the receive status of codeword groups of the first HARQ transmission 1010. For example, for each codeword group, a codeword-level bitmap may indicate success or failure of decoding the codeword group. In some implementations, the H-BA message 1030 also may include one or more MPDU-level bitmaps that indicate the receive status of the MPDUs of the first HARQ transmission 1010. The H-BA message 1030 may include one or more codeword-level bitmaps, or one or more MPDU-level bitmaps, or both. The H-BA message 1030 also may include an indication of the memory available at the second WLAN device 120 for HARQ transmissions, as described in FIGS. 1-4. In some implementations, instead of sending the H-BA message 1030, the second WLAN device 120 may generate a C-BA message. For example, the second WLAN device 120 may generate the C-BA message when it determines to disable the HARQ protocol and instead follow a baseline acknowledgement procedure (such as the ARQ protocol). In some implementations, the C-BA message may include one or more MPDU-level bitmaps that indicate the receive status of the MPDUs of the first HARQ transmission 1010. In some implementations, instead of sending the H-BA message 1030, the second WLAN device 120 may generate a N-ACK message. For example, the second WLAN device 120 may generate the N-ACK message when the PHY header of the first HARQ transmission 1010 is successfully received, but no MPDUs or codewords of the first HARQ transmission 1010 are received correctly.

In some implementations, the first WLAN device 110 may not receive a feedback or ACK message (such as an H-BA, C-BA and N-ACK message) after transmitting the first HARQ transmission 1010. If the first WLAN device 110 does not receive a feedback or ACK message before an ACK time period (or ACK timeout) expires, the first WLAN device 110 may transmit a HARQ Block ACK request (HARQ BAR or H-BAR) message to the second WLAN device 120. The H-BAR may include an H-BA request or a HARQ reset request as further described in FIG. 15.

In response to receiving the H-BA message 1030, the first WLAN device 110 may transmit the second HARQ transmission 1040 to the second WLAN device 120 (such as after a SIFS period). The second HARQ transmission 1040 may represent a retransmission 1042 of a least a portion of the first HARQ transmission 1010 or information (such as codewords) that will be used to try to decode and recover the portions of the first HARQ transmission 1010 that failed. For example, the first WLAN device 110 may process the H-BA message 1030 and determine the codewords or codeword groups that were successfully decoded or were not successfully decoded by the second WLAN device 120 based on the one or more codeword-level bitmaps included in the H-BA 1030. In some implementations, since the second HARQ transmission 1040 is a retransmission (instead of an initial HARQ transmission), the MAC of the first WLAN device 110 may provide to the PHY a codeword list of the codewords or codeword groups that will be included in the second HARQ transmission 1040. For example, the codeword list may indicate the codewords or codeword groups that were not successfully decoded by the second WLAN 120 and will be included in the second HARQ transmission 1040. The PHY may construct the second HARQ transmission 1040 based on the codeword list received from the MAC. In some implementations, when the HARQ transmission is an initial transmission (such as the first HARQ transmission 1010), the MAC may provide a codeword list that is null to indicate the HARQ transmission is an initial HARQ transmission.

Following the second HARQ transmission 1040, when the second WLAN device 120 has successfully recovered the first HARQ transmission 1010, the second WLAN device 120 may send a C-BA message 1050 (such as after a SIFS period). In the example shown in FIG. 10, the C-BA message 1050 may complete the HARQ process 1000. In some implementations, if additional MPDUs or codewords were not correctly received after the second HARQ transmission 1040, the second WLAN device 120 may send a second H-BA message indicating the receive status of the MPDUs, the codewords, or both. The first WLAN device 110 may then respond with a third HARQ transmission similarly as described with reference to the second HARQ transmission 1040.

In some implementations, a sending STA (such as an AP) may generate a transmission having both HARQ and non-HARQ information for different receiving STAs. For example, the sending STA may generate a downlink (DL) multi-user (MU) PPDU having a non-HARQ PSDU for a first receiving STA and a HARQ PSDU for a second receiving STA. In some implementations, the sending STA may include trigger frames or TRS control fields in the MPDUs of the PSDUs, or may send a MU BAR trigger frame. In some implementations, the sending STA may transmit a trigger frame to trigger one or more receiving STAs to send uplink (UL) MU PPDUs. Various features, frame information, and frame formats that may be used for the DL MU PPDUs or the UL MU PPDUs having both HARQ and non-HARQ information are further described in FIGS. 16 and 17.

Figure 11:
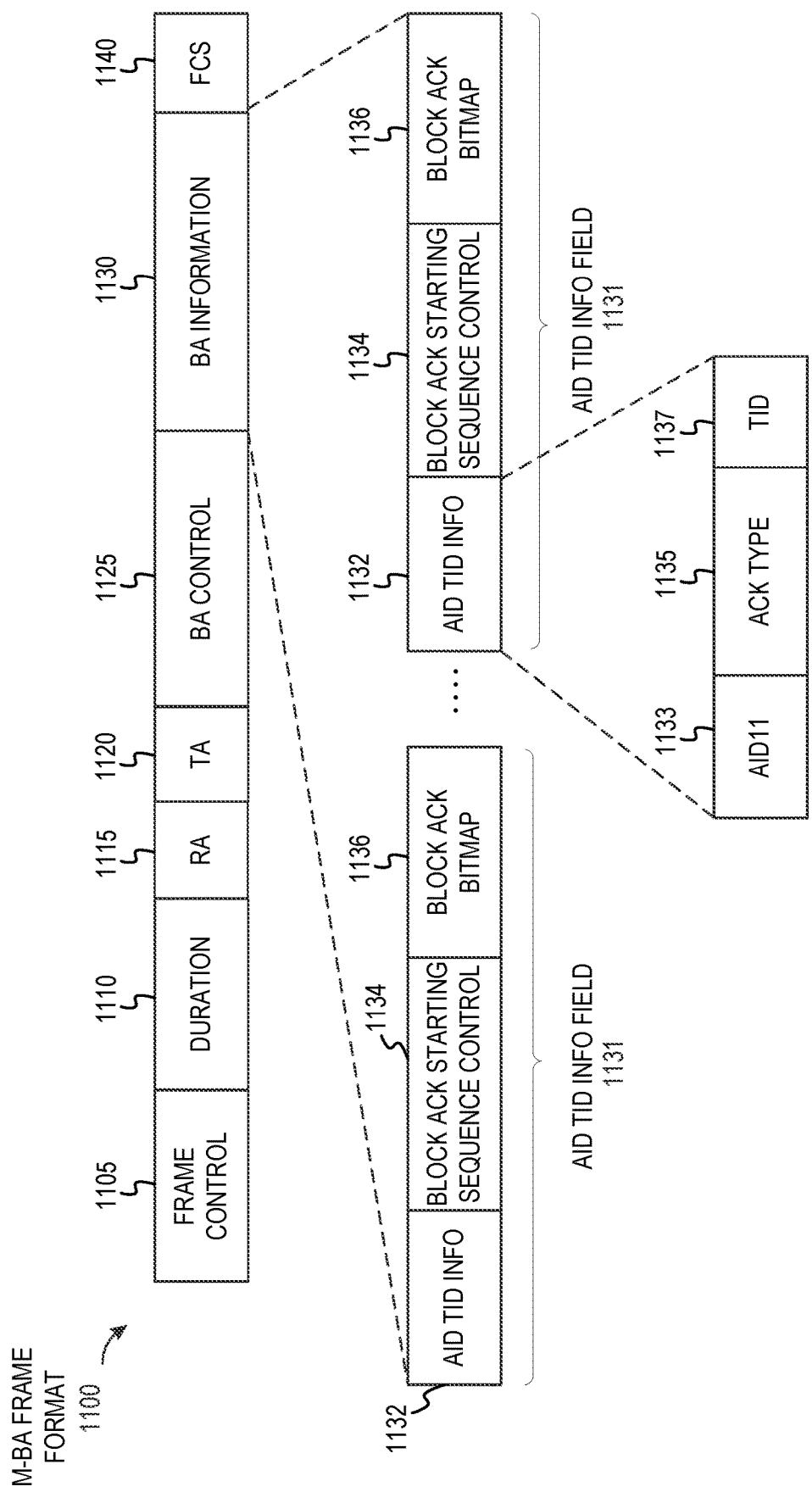
FIG. 11 depicts an example multi-STA Block ACK (M-BA) frame format for use in HARQ feedback messages.

FIG. 11 depicts an example M-BA frame format for use in HARQ feedback messages. As described herein, the H-BA, C-BA and N-ACK messages may be generated using an M-BA frame format. As shown in FIG. 11, the M-BA frame format 1100 may include a frame control field 1105, a duration field 1110, an RA field 1115, a TA field 1120, a BA control field 1125, a BA information field 1130, and a frame check sequence (FCS) field 1140. In some implementations, the BA information field 1130 may include one or more AID TID information fields 1131. Each AID TID information field 1131 may include an AID TID information subfield 1132, a block ACK starting sequence control subfield 1134, and a block ACK bitmap subfield 1136. Each AID TID information subfield 1132 may include an AID11 1133, an ACK type 1135, and a TID 1137.

In some implementations, the AID11 1133 may include an identifier that identifies the intended recipient of the transmission. For example, if the second WLAN device 120 transmits an H-BA having the M-BA frame format to the first WLAN device 110, the AID11 1133 may include an identifier for the first WLAN device 110. The ACK type 1135 may indicate whether the transmission is an ACK or a Block ACK. The TID 1137 may identify the type of traffic. Several combinations of ACK type and TID may be reserved. In some implementations, some of the combinations of ACK type and TID that are reserved may be assigned to various HARQ-related messages, such as N-ACK, H-BA, A-Control messages, as described in FIGS. 12-14.

Figure 12:
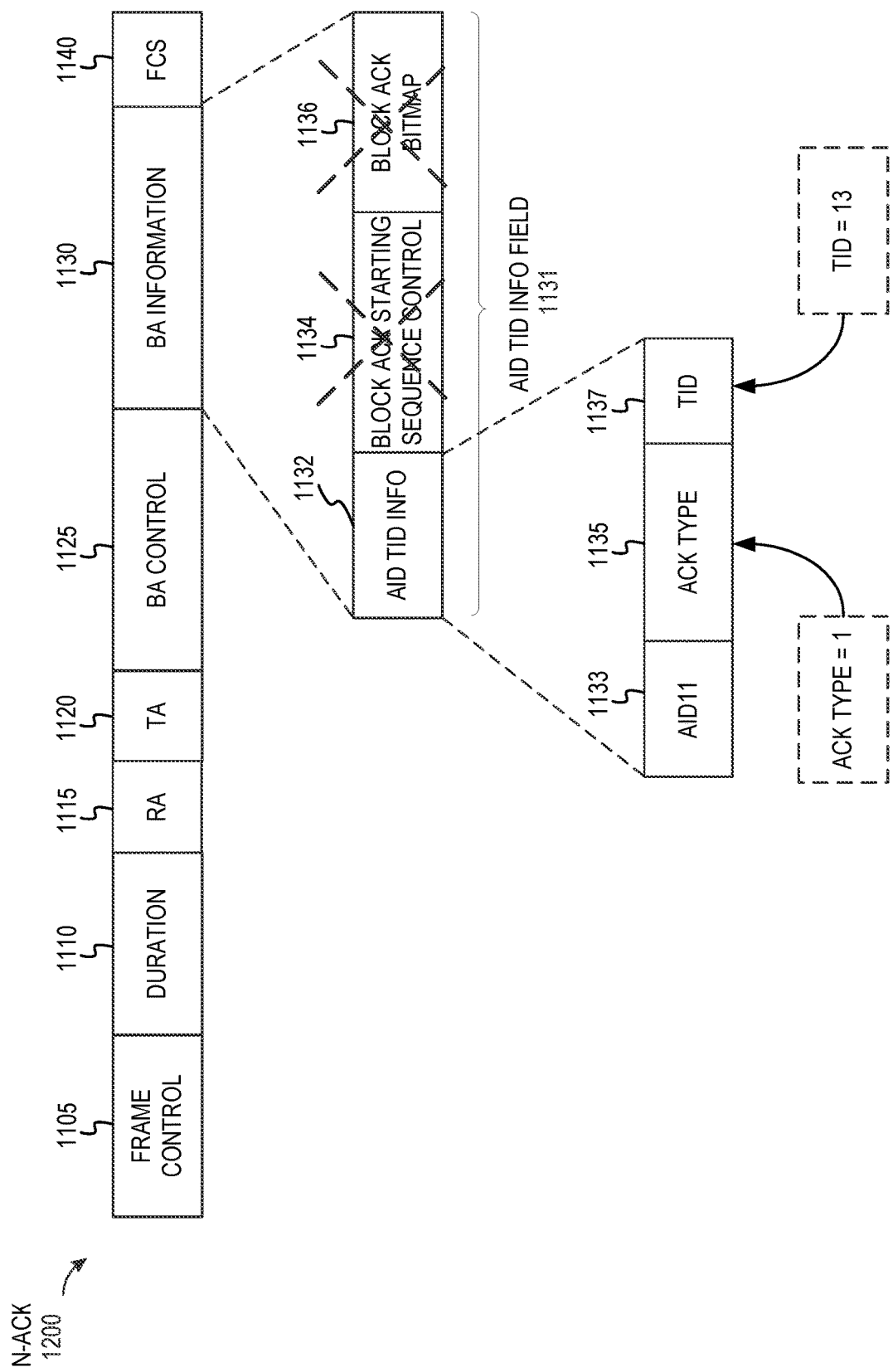
FIG. 12 depicts an example negative ACK (N-ACK) having an M-BA frame format.

FIG. 12 depicts an example N-ACK having an M-BA frame format. The N-ACK 1200 may have the M-BA frame format 1100 shown in FIG. 11. In some implementations, the second WLAN device 120 may transmit the N-ACK 1200 as a feedback message to the first WLAN device 110 when the second WLAN device 120 did not successfully receive any MPDUs of a HARQ transmission (such as the first HARQ transmission 1010). The AID11 1133 may include an indication of the intended recipient of the N-ACK 1200, such as the first WLAN device 110. As shown in FIG. 12, the ACK type 1135 may be set to 1 to indicate the N-ACK 1200 is an ACK frame, and the TID 1137 may be set to 13. Thus, the <ACK type, TID> combination being <1, 13> for the N-ACK 1200 may use one of the reserved combinations of ACK type and TID. As shown in FIG. 12, the block ACK starting sequence control subfield 1134 and the block ACK bitmap subfield 1136 may not be present in the N-ACK 1200. In some implementations, the N-NACK 1200 may have a total length of 24 octets.

Figure 13:
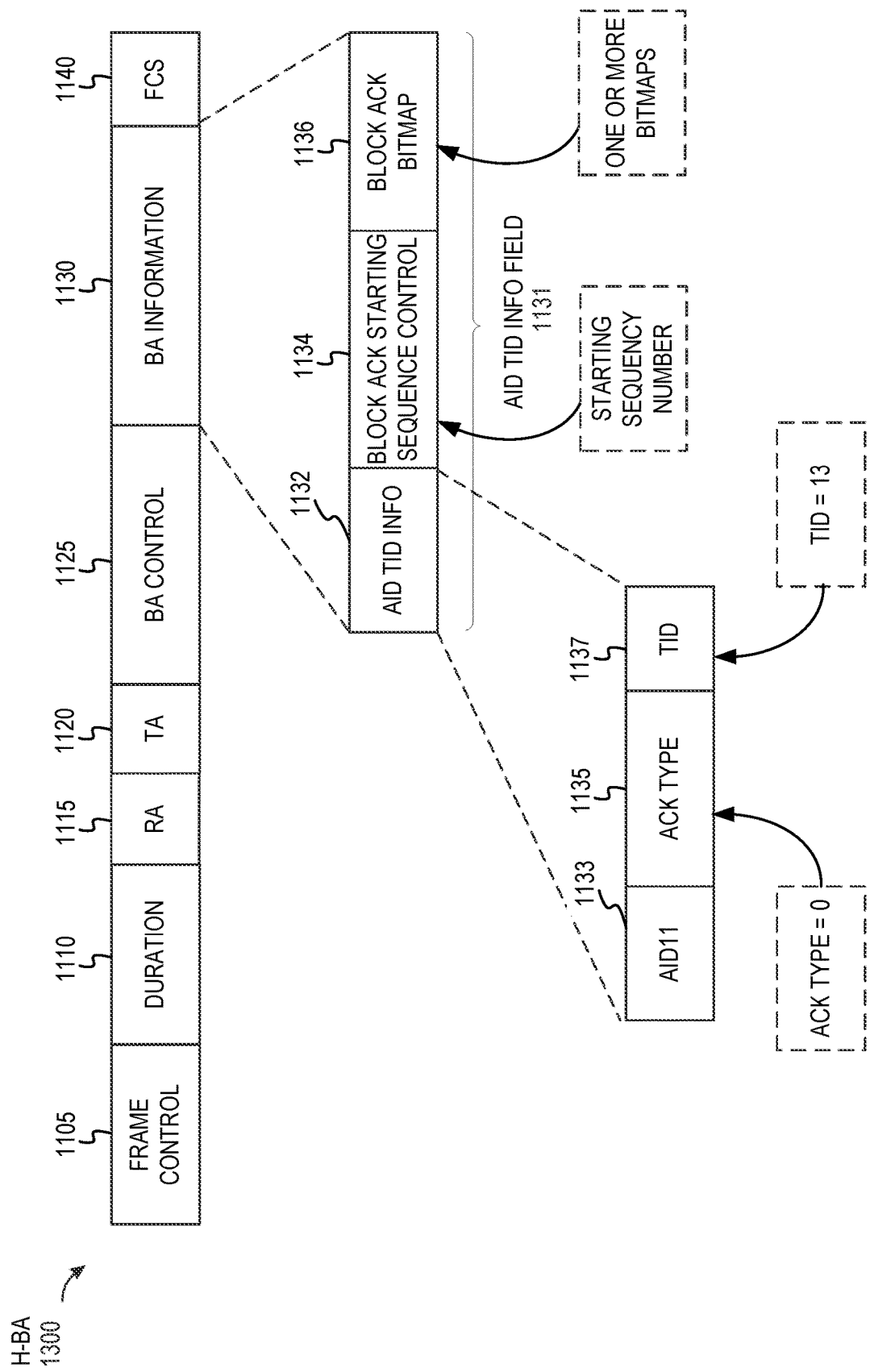
FIG. 13 depicts an example HARQ Block ACK (H-BA) having an M-BA frame format.

FIG. 13 depicts an example H-BA having an M-BA frame format. The H-BA 1300 may have the M-BA frame format 1100 shown in FIG. 11. In some implementations, the second WLAN device 120 may transmit the H-BA 1300 as a feedback message to the first WLAN device 110 including one or more codeword-level bitmaps, or one or more MPDU-level bitmaps, or both (such as one or more codeword-level bitmaps and one or more MPDU-level bitmaps) that indicate the receive status of codewords or MPDUs that were included in a HARQ transmission (such as the first HARQ transmission 1010). The AID11 1133 may include an indication of the intended recipient of the H-BA 1300, such as the first WLAN device 110. As shown in FIG. 13, the ACK type 1135 may be set to 0 to indicate the H-BA 1300 is a BA frame, and the TID 1137 may be set to 13. Thus, the <ACK type, TID> combination being <0, 13> for the H-BA 1300 may use one of the reserved combinations of ACK type and TID. As shown in FIG. 13, the block ACK starting sequence control subfield 1134 may include a starting sequence number which may indicate the start codeword index or indicate the HARQ memory. The block ACK starting sequence control subfield 1134 also may include a fragment number that may indicate the length of a Block ACK bitmap subfield 1136 (such as 0, 4, 8, 16, or 32 octets). The block ACK bitmap subfield 1136 may include one or more bitmaps. In some implementations, the H-BA 1300 may have a total length of between 30 and 58 octets. In some implementations, when the block ACK bitmap subfield 1136 is up to 128 octets, the H-BA 1300 may have a total length of between 30 and 154 octets.

Figure 14:
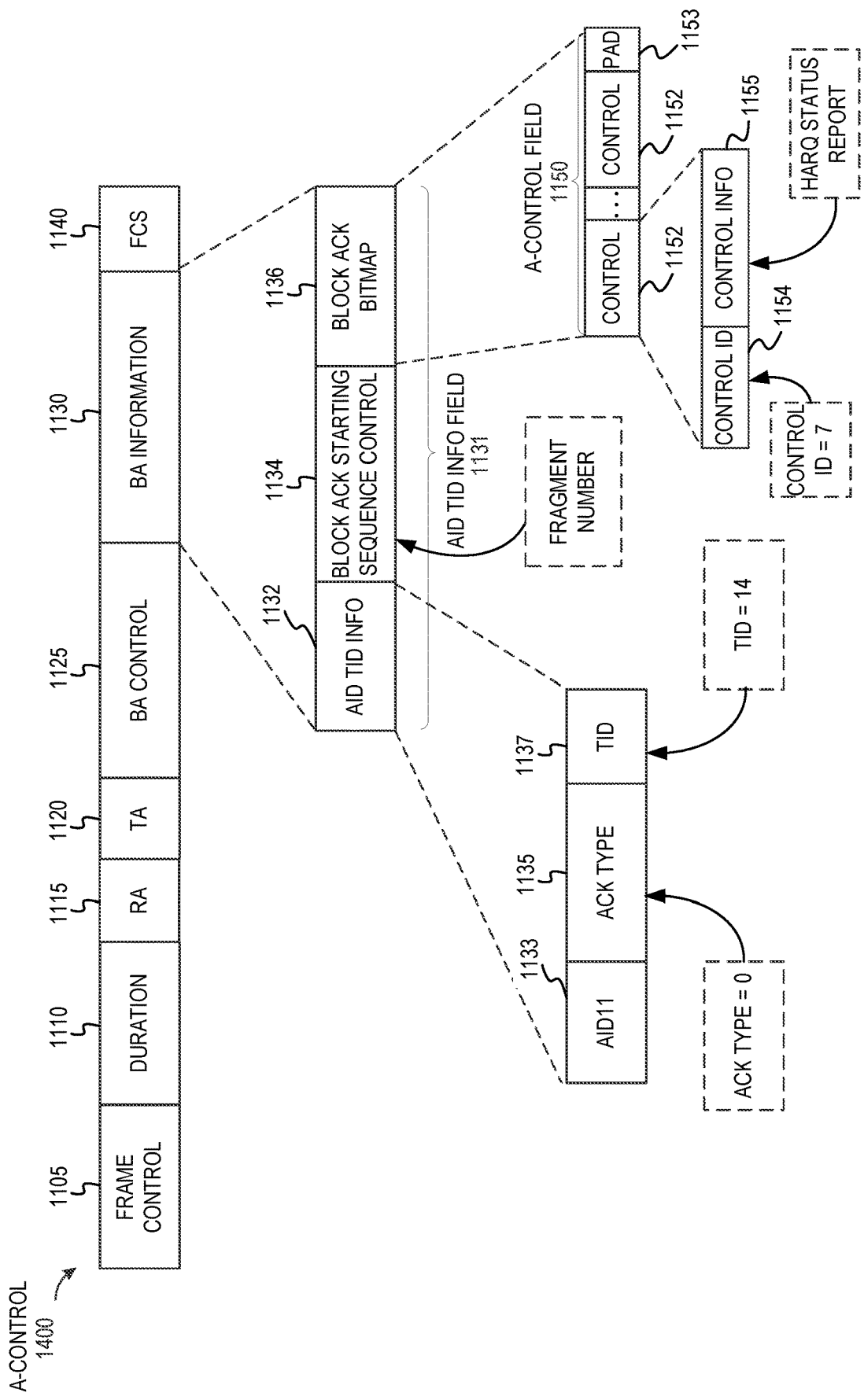
FIG. 14 depicts an example A-Control frame having an M-BA frame format.

FIG. 14 depicts an example A-Control frame having an M-BA frame format. The A-Control 1400 may have the M-BA frame format 1100 shown in FIG. 11. In some implementations, the second WLAN device 120 may transmit the A-Control 1400 as a feedback message to the first WLAN device 110 to indicate the amount of memory available for HARQ transmissions at the second WLAN device 120. The AID11 1133 may include an indication of the intended recipient of the A-Control 1400, such as the first WLAN device 110. As shown in FIG. 14, the ACK type 1135 may be set to 0 to indicate the A-Control 1400 is a BA frame, and the TID 1137 may be set to 14. Thus, the <ACK type, TID> combination being <0, 14> for the A-Control 1400 may use one of the reserved combinations of ACK type and TID. As shown in FIG. 14, the block ACK starting sequence control subfield 1134 may include a fragment number that may indicate the length of a Block ACK bitmap (such as 0, 4, 8, 16, or 32 octets). The block ACK bitmap subfield 1136 may be used as an A-Control field 1150 for the A-Control 1400. The A-Control field 1150 may include one or more control subfields 1152 and a pad subfield 1153. Each of the one or more control subfields 1152 may include a control ID 1154 and control information 1155. In some implementations, the control information 1155 may provide a HARQ status report that may indicate the amount of memory available for HARQ transmissions. Several control IDs associated with the control subfields 1152 may be reserved. In some implementations, one of the reserved control IDs may be assigned to indicate the control information 1155 includes the HARQ status report. For example, a control ID may set to 7 to indicate the control information 1155 includes the HARQ status report. In some implementations, the A-Control 1400 may have a total length of between 30 and 58 octets. In some implementations, when the block ACK bitmap subfield 1136 (and the A-Control field 1150) is up to 128 octets, the A-Control 1400 may have a total length of between 30 and 154 octets.

Figure 15:
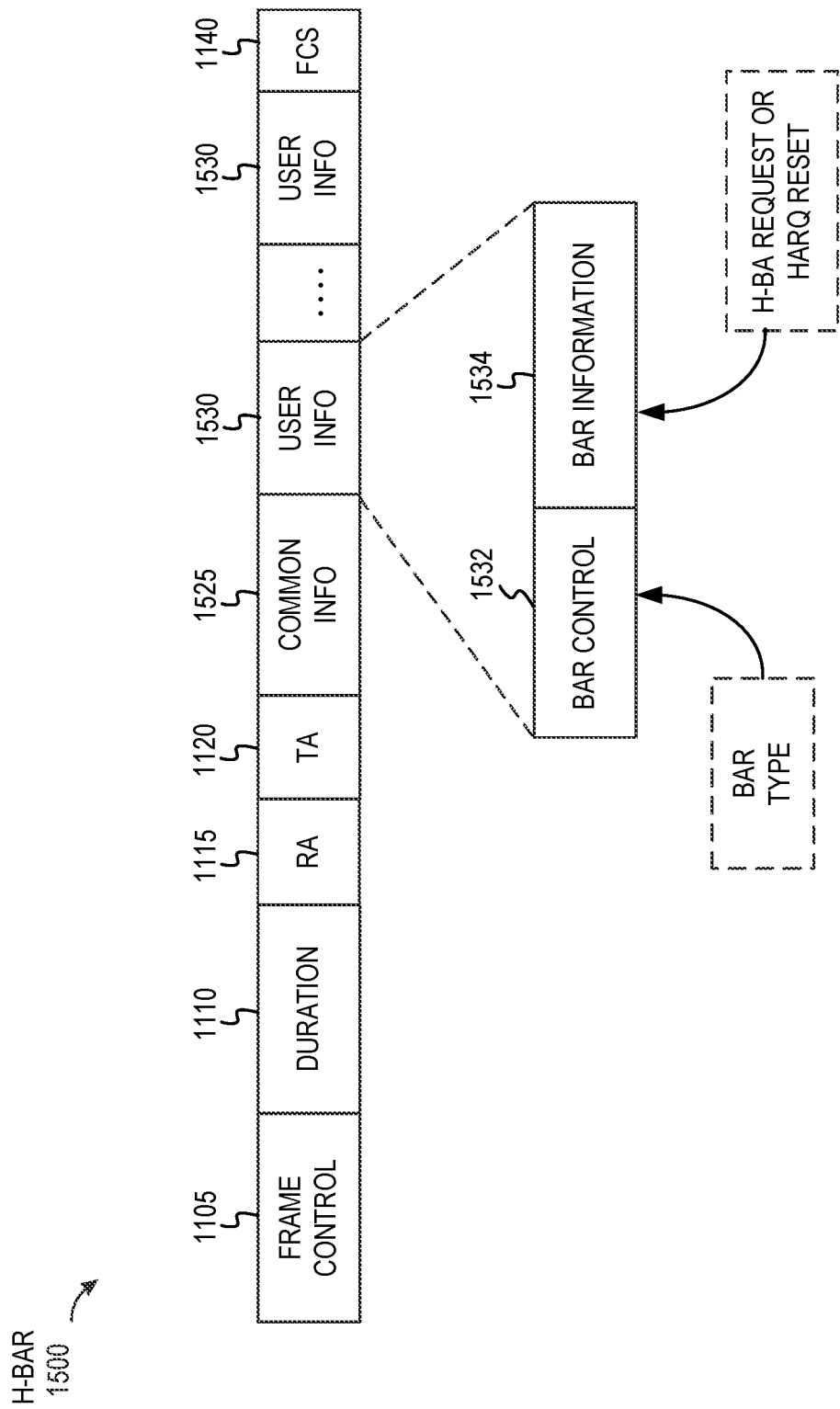
FIG. 15 depicts an example frame format for a HARQ BA request (H-BAR) trigger frame.

FIG. 15 depicts an example frame format for an H-BAR trigger frame 1500. In some implementations, the second WLAN device 120 may transmit the H-BAR trigger frame 1500 as a feedback message to the first WLAN device 110 to request an H-BA or to request a HARQ reset. As shown in FIG. 15, the H-BAR trigger frame 1500 may include a frame control field 1105, a duration field 1110, an RA field 1115, a TA field 1120, a common information field 1525, one or more user information field 1530, and a frame check sequence (FCS) field 1140. In some implementations, each user information field 1530 may include a BAR control subfield 1532 and a BAR information subfield 1534.

In some implementations, the BAR control subfield 1532 may include an indication that the BAR frame type (or variant) associated with the H-BAR trigger frame is a HARQ BAR frame type. In some implementations, when the H-BAR trigger frame 1500 includes a request for an H-BA, the BAR information subfield 1534 may include a codeword list associated with the H-BA being requested. When the H-BAR trigger frame 1500 includes a request for a HARQ reset, the BAR information subfield 1534 may include an indication of a HARQ reset. In some implementations, the H-BAR trigger frame 1500 may be a self-contained H-BAR trigger frame or may be part of a MU BAR trigger frame.

Figure 16:
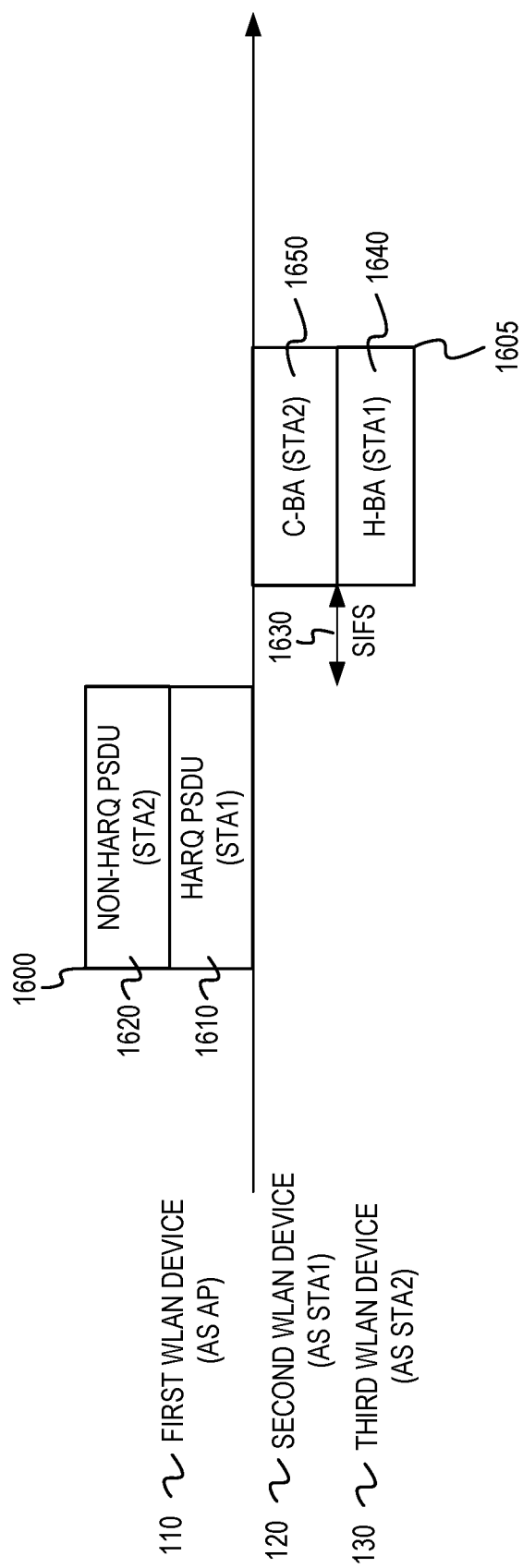
FIG. 16 depicts an example downlink (DL) multi-user (MU) physical convergence layer protocol data unit (PPDU) that may include a HARQ transmission and a non-HARQ transmission.

FIG. 16 depicts an example DL MU PPDU 1600 that may include a HARQ transmission and a non-HARQ transmission. In some implementations, the first WLAN device 110 may transmit the DL MU PPDU 1600 to one or more WLAN devices. For example, the first WLAN device 110 may transmit the DL MU PPDU 1600 to the second WLAN device 120 (such as STA1) and a third WLAN device 130 (such as STA2). The DL MU PPDU 1600 may include a first PSDU, which may be a HARQ PSDU 1610 having an enabled HARQ indicator, for the second WLAN device 120, and a second PSDU, which may be a non-HARQ PSDU 1620 having a disabled HARQ indicator, for the third WLAN device 130. After a SIFS 1630, the first WLAN device 110 may receive a high-efficiency (HE) trigger-based (TB) PPDU 1605 that may include the feedback messages from the second WLAN device 120 and the third WLAN device 130. For example, the HE TB PPDU 1605 may include an H-BA 1640 from the second WLAN device 120 and a C-BA 1650 from the third WLAN device 130.

In some implementations, the first WLAN device 110 may include trigger frames or trigger response scheduling (TRS) control fields in the MPDUs of the HARQ PDSU 1610 or the non-HARQ PDSU 1620, or both. The trigger frames or the TRS control fields may trigger the feedback messages from the second WLAN device 120 and the third WLAN device 130. In some implementations, if the MPDUs with the trigger frames or the TRS control fields are not successfully received, the first WLAN device 110 may transmit an H-BAR trigger frame or an MU BAR trigger frame to request the second WLAN device 120 and the third WLAN device 130 to transmit the H-BA 1640 and the C-BA 1650, respectively.

Figure 17:
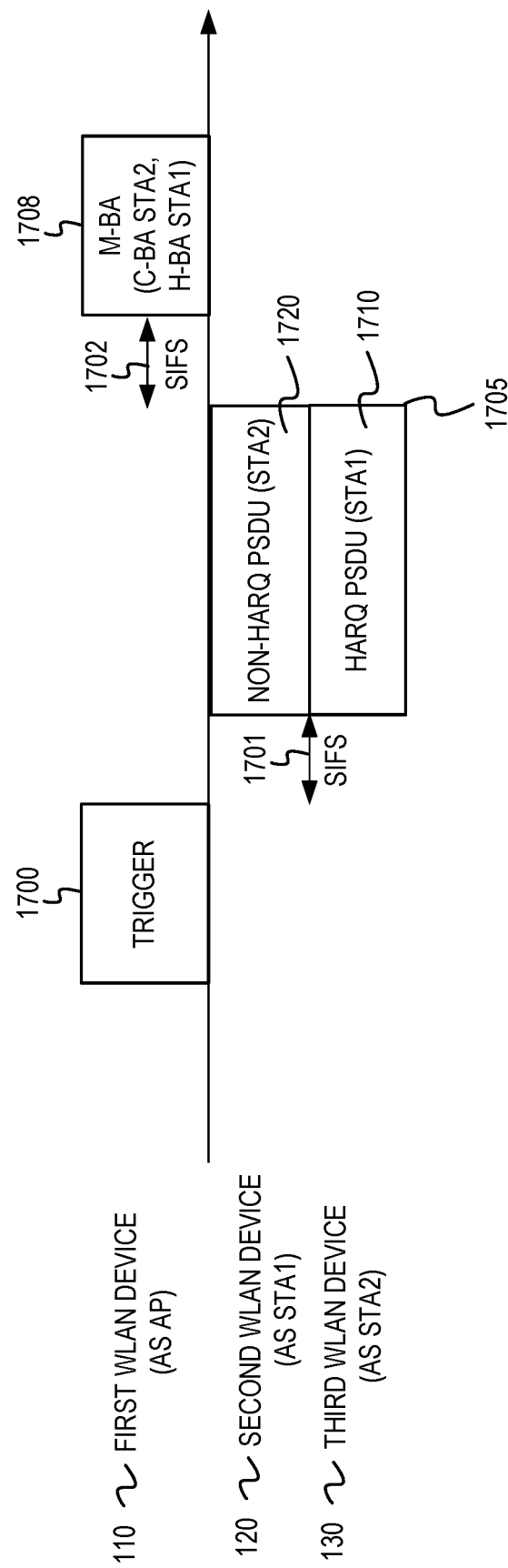
FIG. 17 depicts an example trigger frame that may trigger an uplink (UL) MU PPDU that may include a HARQ transmission and a non-HARQ transmission.

FIG. 17 depicts an example trigger frame 1700 that may trigger an UL MU PPDU 1705 that may include a HARQ transmission and a non-HARQ transmission. In some implementations, the first WLAN device 110 may transmit the trigger frame 1700 (such as an H-BAR trigger frame) to one or more WLAN devices. In some implementations, one or more PSDUs of the trigger frame 1700 having an enabled HARQ indicator may request a HARQ transmission and one or more PSDUs of the trigger frame 1700 having a disabled HARQ indicator may request a non-HARQ transmission. For example, the first WLAN device 110 may transmit the trigger frame 1700 to the second WLAN device 120 (such as STA1) requesting a HARQ transmission and to a third WLAN device 130 (such as STA2) requesting a non-HARQ transmission.

In some implementations, after a SIFS 1701, the first WLAN device 110 may receive the UL MU PPDU 1705 from the second WLAN device 120 and the third WLAN device 130 in response to the trigger frame 1700. The UL MU PPDU 1705 may include a HARQ PSDU 1710 provided by the second WLAN device 120 and a non-HARQ PSDU 1720 provided by the third WLAN device 130. In some implementations, trigger frame 1700 may include a codeword list to request the second WLAN device 120 to provide the codewords in the codeword list in the response. The second WLAN device 120 may include the codewords in the codeword list in the HARQ PSDU 1710. In some implementations, the trigger frame 1700 also may request the second WLAN device 120 to use certain TX parameters in the response. For example, the trigger frame 1700 may request the second WLAN device 120 to use a modulation and coding scheme (MCS), a number of spatial streams (NSS), a guard interval (GI), a TX power, a bandwidth (BW), among others, in the response. The second WLAN device 120 may generate and transmit the HARQ PSDU 1710 using the TX parameters specified by the first WLAN device 110 in the trigger frame 1700.

In some implementations, the first WLAN device 110 may receive the UL MU PPDU 1705 and may respond with an M-BA 1708. For example, after the SIFS 1702, the first WLAN device 110 may transmit the M-BA 1708 that includes an H-BA for the second WLAN device 120 and a C-BA for the first WLAN device 110.

Figure 18:
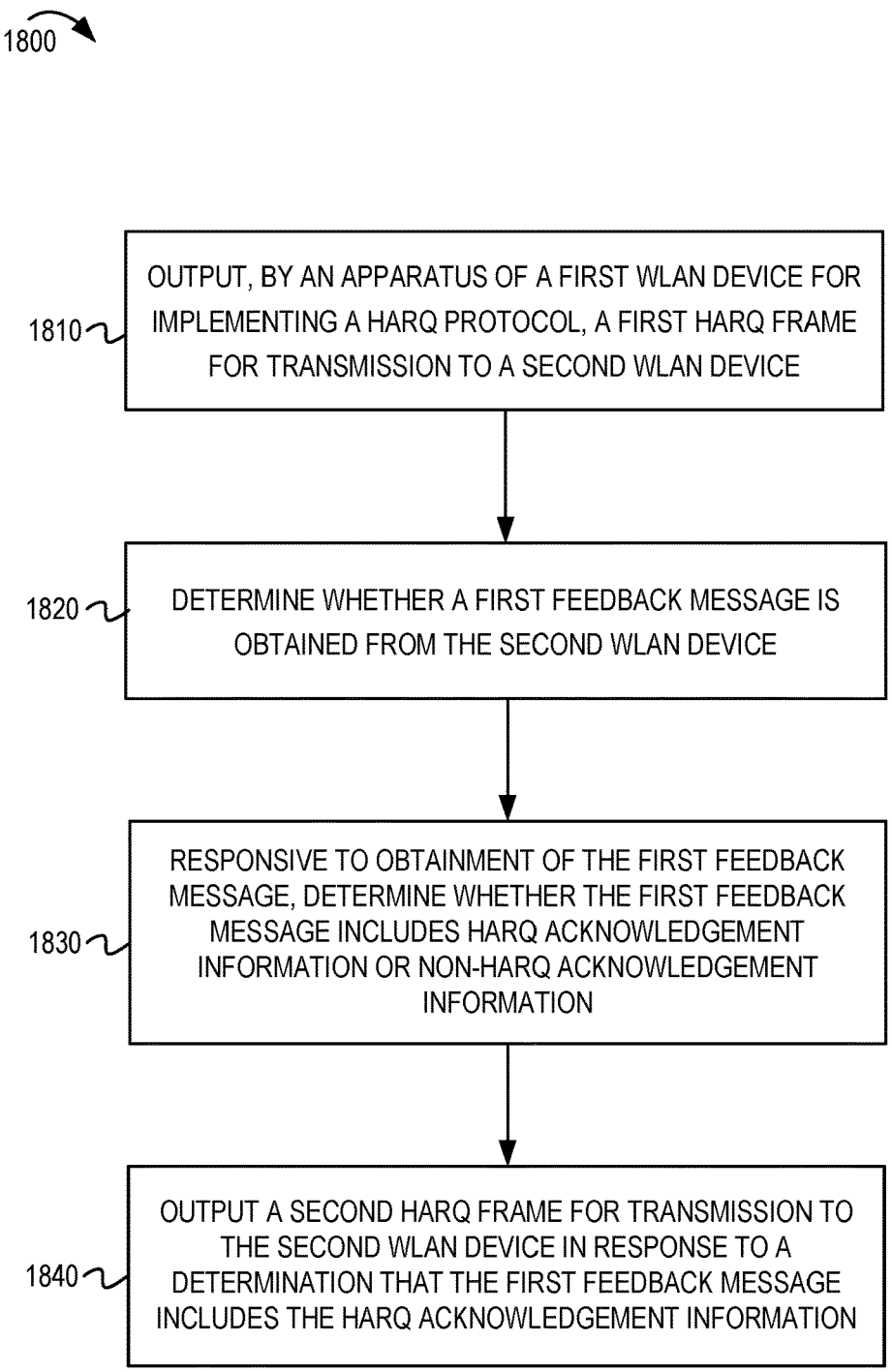
FIG. 18 depicts a flowchart with example operations performed by an apparatus of a first WLAN device for implementing a HARQ protocol using Block ACK messages.

FIG. 18 depicts a flowchart 1800 with example operations performed by an apparatus of a first WLAN device for implementing a HARQ protocol using Block ACK messages. The first WLAN device may be the sending STA and the second WLAN device may be the receiving STA.

At block 1810, an apparatus of the first WLAN device may output a first HARQ frame for transmission to the second WLAN device.

At block 1820, the apparatus of the first WLAN device may determine whether a first feedback message is obtained from the second WLAN device.

At block 1830, responsive to obtainment of the first feedback message, the apparatus of the first WLAN device may determine whether the first feedback message includes HARQ acknowledgement information or non-HARQ acknowledgment information. In some implementations, the apparatus of the first WLAN device may determine it obtained a first feedback message that includes HARQ acknowledgment information. The first feedback message that includes the HARQ acknowledgment information may be an H-BA message that includes one or more bitmaps. The one or more bitmaps may include one or more codeword-level bitmaps, one or more MPDU-level bitmaps, or both. The codeword-level bitmaps may provide a receive status of codewords associated with the first HARQ frame. The one or more MPDU-level bitmaps may provide a receive status of MPDUs associated with the first HARQ frame. In some implementations, the H-BA message may have an M-BA frame format. The M-BA frame format may include a first indicator to indicate the first feedback message is an H-BA message. In some implementations, a BA information field of the M-BA frame format may include at least the first indicator and one or more codeword-level bitmaps of the H-BA message.

In some implementations, the apparatus of the first WLAN device may determine it obtained a first feedback message that includes non-HARQ acknowledgment information. In some implementations, the first feedback message that includes non-HARQ acknowledgment information may be a C-BA message that includes one or more MPDU-level bitmaps. In some implementations, the first feedback message that includes non-HARQ acknowledgment information may be a N-ACK message.

At block 1840, the apparatus of the first WLAN device may output a second HARQ frame for transmission to the second WLAN device in response to a determination that the first feedback message (such as an H-BA message) includes the HARQ acknowledgment information. In some implementations, the apparatus of the first WLAN device may generate the second HARQ frame based, at least in part, on the one or more bitmaps included in the H-BA message. In some implementations, in response to a determination that a first feedback message that includes non-HARQ acknowledgment information was received, the apparatus of the first WLAN device may generate a non-HARQ frame for transmission to the second WLAN device. In some implementations, the non-HARQ frame may be a retransmission frame that is generated using the ARQ (or baseline) protocol.

In some implementations, if the apparatus of the first WLAN device does not obtain a first feedback message within a ACK time period (such as an ACK timeout period) after transmitting the first HARQ frame, the apparatus of the first WLAN device may retransmit the first HARQ frame to the second WLAN device, may output a different HARQ frame for transmission to the second WLAN device, or may output an H-BAR message for transmission to the second WLAN device. In some implementations, an H-BAR message may include an H-BA request or a HARQ reset request.

FIG. 19 depicts a flowchart 1900 with example operations performed by an apparatus of a second WLAN device for implementing a HARQ protocol using Block ACK messages. The second WLAN device may be the receiving STA, and the first WLAN device may be the sending STA.

At block 1910, an apparatus of the second WLAN device may receive a first HARQ frame from the first WLAN device.

At block 1920, the apparatus of the second WLAN device may determine whether to generate a first feedback message that includes HARQ acknowledgment information or non-HARQ acknowledgment information based, at least in part, on the first HARQ frame. In some implementations, the first feedback message that includes HARQ acknowledgment information may be an H-BA message that includes one or more bitmaps. In some implementations, the apparatus of the second WLAN device may determine to generate the H-BA message based, at least in part, on a determination that at least a portion of the codewords associated with the first HARQ frame were successfully received and a remaining portion of the codewords were unsuccessfully received. The apparatus of the second WLAN device also may determine to generate the H-BA message based, at least in part, on a determination to enable the HARQ protocol (such as based on HARQ memory considerations).

At block 1930, responsive to a determination to generate the first feedback message that includes HARQ acknowledgment information, the apparatus of the second WLAN device may generate the first feedback message for transmission to the first WLAN device. The one or more bitmaps may include one or more codeword-level bitmaps, one or more MPDU-level bitmaps, or both. The codeword-level bitmaps may provide a receive status of codewords associated with the first HARQ frame. The one or more MPDU-level bitmaps may provide a receive status of MPDUs associated with the first HARQ frame. In some implementations, after sending the H-BA message, the apparatus of the second WLAN device may obtain a second HARQ frame that is responsive to the H-BA message.

In some implementations, the apparatus of the second WLAN device may determine to disable the HARQ protocol based, at least in part, on the first HARQ frame (such as based on HARQ memory considerations). The apparatus of the second WLAN device may determine to generate, for transmission to the first WLAN device, a first feedback message that includes non-HARQ acknowledgment information based, at least in part, on a determination to disable the HARQ protocol. In some implementations, the first feedback message that includes non-HARQ acknowledgment information may be a C-BA message including one or more MPDU-level bitmaps. In some implementations, the first feedback message that includes non-HARQ acknowledgment information may be a N-ACK message that may be indicate a reception failure of the first HARQ frame.

In some implementations, the apparatus of the second WLAN device may obtain an H-BAR message from the first WLAN device. For example, the first WLAN device may send an H-BAR message when it has not received a feedback message from the second WLAN device after transmitting a HARQ frame to the second WLAN device. The apparatus of the second WLAN device may determine whether the H-BAR message includes an H-BA request or a HARQ reset request. In response to a determination that the H-BAR message includes the H-BA request, the apparatus of the second WLAN device may generate an H-BA message for transmission to the first WLAN device. In response to a determination that the H-BAR message includes the HARQ reset request, the apparatus of the second WLAN device may perform a HARQ reset and generate an ACK message for transmission to the first WLAN device to acknowledge completion of the HARQ reset.

Figure 20:
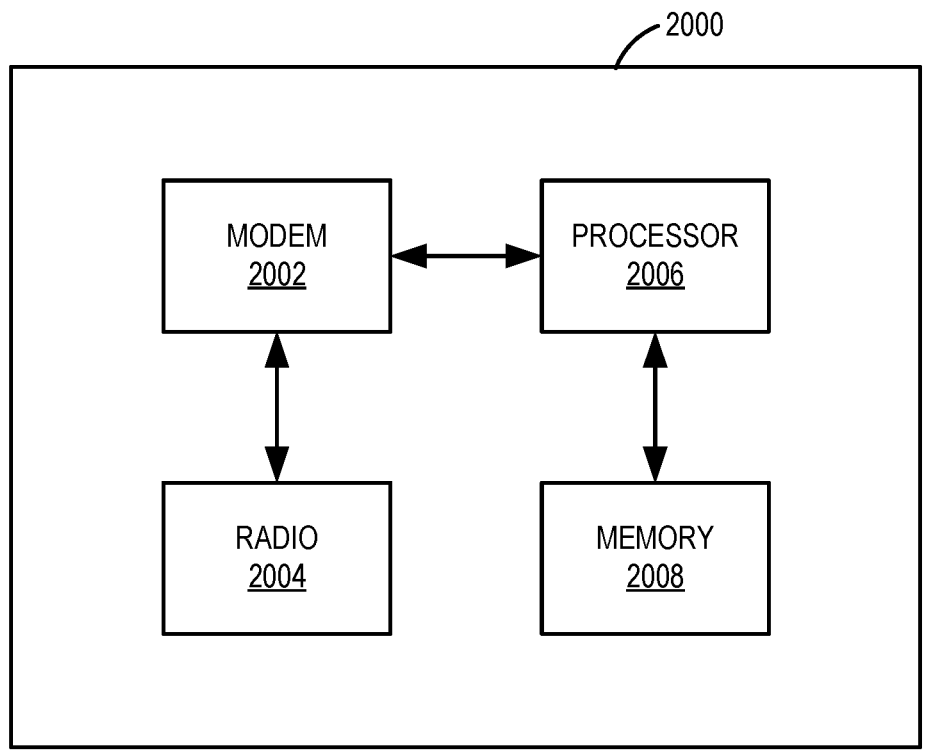
FIG. 20 shows a block diagram of an example wireless communication device.

FIG. 20 shows a block diagram of an example wireless communication device 2000. In some implementations, the wireless communication device 2000 can be an example of a device for use in a STA such as one of the STAs 104 described herein. In some implementations, the wireless communication device 2000 can be an example of a device for use in an AP such as the AP 102 described herein. The wireless communication device 2000 is capable of transmitting (or outputting for transmission) and receiving wireless communications (for example, in the form of wireless packets). For example, the wireless communication device 2000 can be configured to transmit and receive packets in the form of PPDUs and MPDUs conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 2000 can be, or can include, a chip, system on chip (SoC), chipset, package or device that includes one or more modems 2002, for example, a Wi-Fi (IEEE 802.11 compliant) modem. In some implementations, the one or more modems 2002 (collectively "the modem 2002") additionally include a WWAN modem (for example, a 3GPP 4G LTE or 5G compliant modem). In some implementations, the wireless communication device 2000 also includes one or more radios 2004 (collectively "the radio 2004"). In some implementations, the wireless communication device 2000 further includes one or more processors, processing blocks or processing elements (collectively "the processor 2006") and one or more memory blocks or elements (collectively "the memory 2008"). In some implementations, the processor 2006 and the memory 2008 may be referred to as the processing system.

The modem 2002 can include an intelligent hardware block or device such as, for example, an application-specific integrated circuit (ASIC) among other possibilities. The modem 2002 is generally configured to implement a PHY layer. For example, the modem 2002 is configured to modulate packets and to output the modulated packets to the radio 2004 for transmission over the wireless medium. The modem 2002 is similarly configured to obtain modulated packets received by the radio 2004 and to demodulate the packets to provide demodulated packets. In addition to a modulator and a demodulator, the modem 2002 may further include digital signal processing (DSP) circuitry, automatic gain control (AGC), a coder, a decoder, a multiplexer and a demultiplexer. For example, while in a transmission mode, data obtained from the processor 2006 is provided to a coder, which encodes the data to provide encoded bits. The encoded bits are then mapped to points in a modulation constellation (using a selected MCS) to provide modulated symbols. The modulated symbols may then be mapped to a number Nss of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 2004. In implementations involving beamforming, the modulated symbols in the respective spatial streams are precoded via a steering matrix prior to their provision to the IFFT block.

While in a reception mode, digital signals received from the radio 2004 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 2006) for processing, evaluation or interpretation.

The radio 2004 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 2000 can include, or be coupled with, multiple transmit antennas (each with a corresponding transmit chain) and multiple receive antennas (each with a corresponding receive chain). The symbols output from the modem 2002 are provided to the radio 2004, which then transmits the symbols via the coupled antennas. Similarly, symbols received via the antennas are obtained by the radio 2004, which then provides the symbols to the modem 2002. In some implementations, the radio 2004 and the one or more antennas may form one or more network interfaces (which also may be referred to as "interfaces").

The processor 2006 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 2006 processes information received through the radio 2004 and the modem 2002, and processes information to be output through the modem 2002 and the radio 2004 for transmission through the wireless medium. For example, the processor 2006 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 2006 may generally control the modem 2002 to cause the modem to perform various operations described above.

The memory 2008 can include tangible storage media such as random-access memory (RAM) or read-only memory (ROM), or combinations thereof. The memory 2008 also can store non-transitory processor- or computer-executable software (SW) code containing instructions that, when executed by the processor 2006, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

In some implementations, the wireless communication device 2000 may include a HARQ protocol unit (not shown). The HARQ protocol unit may be similar to the HARQ protocol unit 112 or the HARQ protocol unit 122 described with reference to FIG. 2 and may implement any of the HARQ techniques described herein. In some implementations, the HARQ protocol unit may be implemented by the processor 2006 and the memory 2008 (which may be referred to as the processing system). The memory 2008 can include computer instructions executable by the processor 2006 to implement the functionality of the HARQ protocol unit. Any of these functionalities may be partially (or entirely) implemented in hardware or on the processor 2006.

In some implementations, the wireless communication device 2000 may include a HARQ transmission unit (not shown), a HARQ reception unit (not shown), a HARQ feedback unit (not shown), or any combination thereof, similar to the HARQ transmission unit 114, the HARQ reception unit 123, and the HARQ feedback unit 124, respectively, as described with reference to FIG. 2. The HARQ transmission unit, the HARQ reception unit, or the HARQ feedback unit may implement any of the HARQ techniques described herein. In some implementations, the HARQ transmission unit, the HARQ reception unit, or the HARQ feedback unit may be implemented by the processor 2006 and the memory 2008 (which may be referred to as the processing system). The memory 2008 can include computer instructions executable by the processor 2006 to implement the functionality of the HARQ transmission unit, the HARQ reception unit, or the HARQ feedback unit. Any of these functionalities may be partially (or entirely) implemented in hardware or on the processor 2006.

Figure 21B:
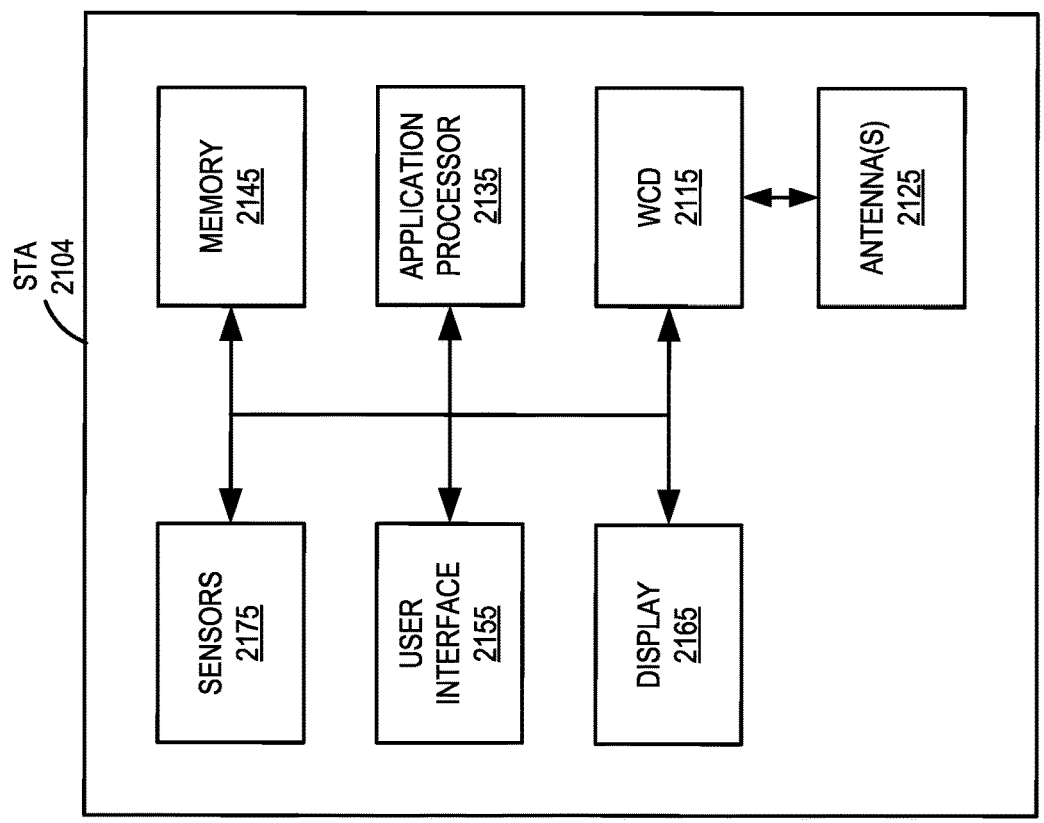
FIG. 21B shows a block diagram of an example STA.
Figure 21A:
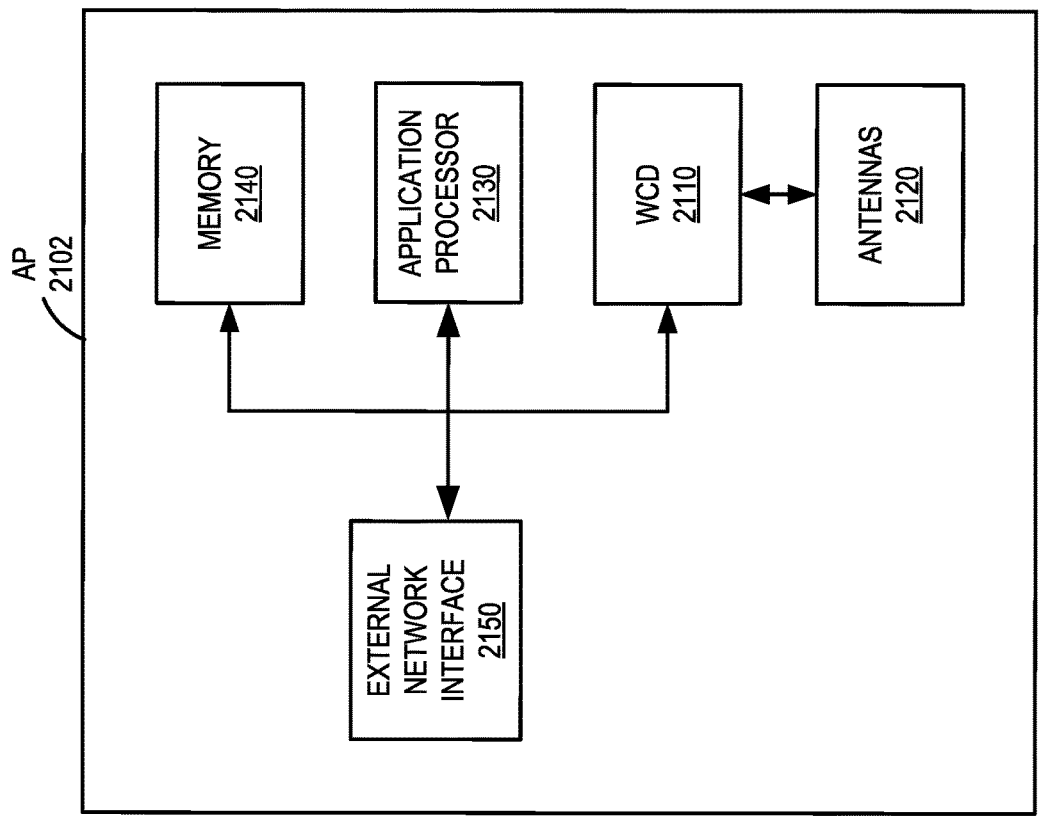
FIG. 21A shows a block diagram of an example AP.

FIG. 21A shows a block diagram of an example AP 2102. For example, the AP 2102 can be an example implementation of the AP 102 described herein. The AP 2102 includes a wireless communication device (WCD) 2110. For example, the wireless communication device 2110 may be an example implementation of the wireless communication device 2000 described with reference to FIG. 20. The AP 2102 also includes multiple antennas 2120 coupled with the wireless communication device 2110 to transmit and receive wireless communications. In some implementations, the AP 2102 additionally includes an application processor 2130 coupled with the wireless communication device 2110, and a memory 2140 coupled with the application processor 2130. The AP 2102 further includes at least one external network interface 2150 that enables the AP 2102 to communicate with a core network or backhaul network to gain access to external networks including the Internet. For example, the external network interface 2150 may include one or both of a wired (for example, Ethernet) network interface and a wireless network interface (such as a WWAN interface). Ones of the aforementioned components can communicate with other ones of the components directly or indirectly, over at least one bus. The AP 2102 further includes a housing that encompasses the wireless communication device 2110, the application processor 2130, the memory 2140, and at least portions of the antennas 2120 and external network interface 2150.

FIG. 21B shows a block diagram of an example STA 2104. For example, the STA 2104 can be an example implementation of the STA 104 described herein. The STA 2104 includes a wireless communication device 2115. For example, the wireless communication device 2115 may be an example implementation of the wireless communication device 2000 described with reference to FIG. 20. The STA 2104 also includes one or more antennas 2125 coupled with the wireless communication device 2115 to transmit and receive wireless communications. The STA 2104 additionally includes an application processor 2135 coupled with the wireless communication device 2115, and a memory 2145 coupled with the application processor 2135. In some implementations, the STA 2104 further includes a user interface (UI) 2155 (such as a touchscreen or keypad) and a display 2165, which may be integrated with the UI 2155 to form a touchscreen display. In some implementations, the STA 2104 may further include one or more sensors 2175 such as, for example, one or more inertial sensors, accelerometers, temperature sensors, pressure sensors, or altitude sensors. Ones of the aforementioned components can communicate with other ones of the components directly or indirectly, over at least one bus. The STA 2104 further includes a housing that encompasses the wireless communication device 2115, the application processor 2135, the memory 2145, and at least portions of the antennas 2125, UI 2155, and display 2165.

Figure 22:
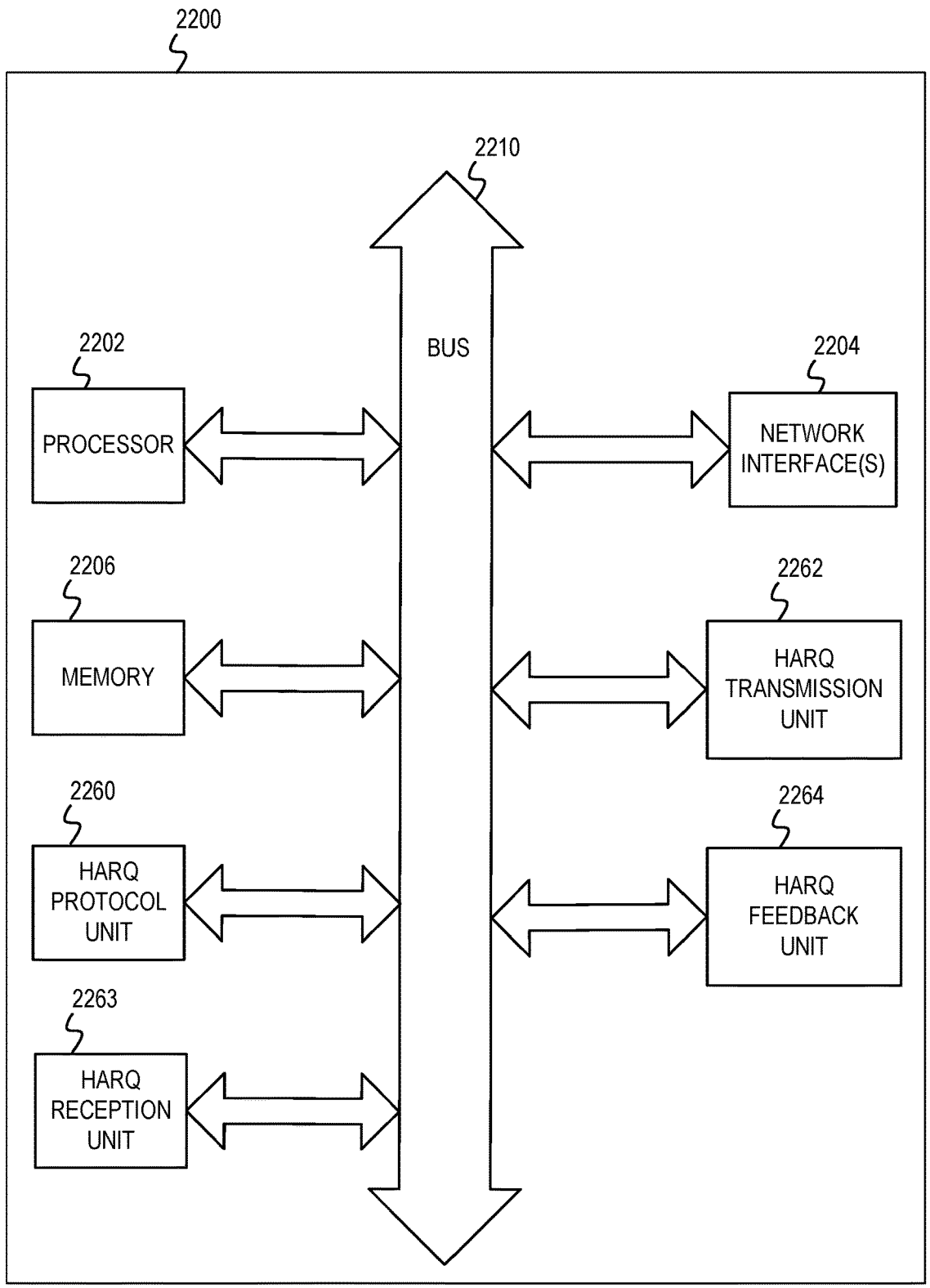
FIG. 22 shows a block diagram of an example electronic device for implementing aspects of this disclosure.

FIG. 22 shows a block diagram of an example electronic device for implementing aspects of this disclosure. In some implementations, the electronic device 2200 may be one of an access point (including any of the APs described herein), a range extender, stations (including any of the STAs described herein), or other electronic systems. The electronic device 2200 can include a processor 2202 (possibly including multiple processors, multiple cores, multiple nodes, or implementing multi-threading, etc.). The electronic device 2200 also can include a memory 2206. The memory 2206 may be system memory or any one or more of the possible realizations of computer-readable media described herein. The electronic device 2200 also can include a bus 2210 (such as PCI, ISA, PCI-Express, Hyper-Transport®, InfiniBand®, NuBus®, AHB, AXI, etc.), and a network interface 2204 that can include at least one of a wireless network interface (such as a WLAN interface, a Bluetooth® interface, a WiMAX® interface, a ZigBee® interface, a Wireless USB interface, etc.) and a wired network interface (such as an Ethernet interface, a powerline communication interface, etc.). In some implementations, the electronic device 2200 may support multiple network interfaces—each of which is configured to couple the electronic device 2200 to a different communication network.

The electronic device 2200 may include HARQ protocol unit 2260, a HARQ transmission unit 2262, the HARQ reception unit 2263, and a HARQ feedback unit 2264. In some implementations, the HARQ protocol unit 2260, the HARQ transmission unit 2262, the HARQ reception unit 2263, and the HARQ feedback unit 2264 may be distributed within the processor 2202, the memory 2206, and the bus 2210. The HARQ protocol unit 2260, the HARQ transmission unit 2262, the HARQ reception unit 2263, and the HARQ feedback unit 2264 can perform some or all the operations described herein. For example, the HARQ protocol unit 2260 may be similar to the HARQ protocol unit 112 or the HARQ protocol unit 122 as described in FIG. 1. The HARQ transmission unit 2262 may be similar to the HARQ transmission unit 114 described in FIG. 1. The HARQ reception unit 2263 may be similar to the HARQ reception unit 123 described in FIG. 1. The HARQ feedback unit 2264 may be similar to the HARQ feedback unit 124 described in FIG. 1. Depending on whether the electronic device 2200 is a sending STA or a receiving STA for a HARQ process, the electronic device 2200 may use either of the HARQ transmission unit 2262, or the HARQ reception unit 2263 and the HARQ feedback unit 2264 to perform the features described in this disclosure.

The memory 2206 can include computer instructions executable by the processor 2202 to implement the functionality of the implementations described in FIGS. 1-21. Any of these functionalities may be partially (or entirely) implemented in hardware or on the processor 2202. For example, the functionality may be implemented with an application specific integrated circuit, in logic implemented in the processor 2202, in a co-processor on a peripheral device or card, etc. Further, realizations may include fewer or additional components not illustrated in FIG. 22 (such as video cards, audio cards, additional network interfaces, peripheral devices, etc.). The processor 2202, the memory 2206, and the network interface 2204 are coupled to the bus 2210. Although illustrated as being coupled to the bus 2210, the memory 2206 may be coupled to the processor 2202.

FIGS. 1-22 and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method performed by an apparatus of a first wireless local area network (WLAN) device, comprising:
    transmitting a first hybrid automatic repeat request (HARQ) frame to a second WLAN device;
    receiving, in response to the first HARQ frame, a first feedback message from the second WLAN device that indicates whether to enable a HARQ protocol or a non-HARQ protocol; and
    transmitting a frame to the second WLAN device based at least in part on the first feedback message, the frame being a second HARQ frame if the first feedback message indicates to enable the HARQ protocol and the frame being a non-HARQ frame if the first feedback message indicates to enable the non-HARQ protocol.

2. The method of claim 1, wherein the first feedback message is a HARQ Block Acknowledgement (H-BA) message and includes one or more bitmaps.

3. The method of claim 2, wherein the one or more bitmaps of the H-BA message include at least one of:
    one or more codeword-level bitmaps; and
    one or more media access control protocol data units (MPDU)-level bitmaps.

4. The method of claim 3, wherein:
    the one or more codeword-level bitmaps provide a receive status of codewords associated with the first HARQ frame; and
    the one or more MPDU-level bitmaps provide a receive status of MPDUs.

5. The method of claim 3, wherein codewords of each of the one or more codeword-level bitmaps are identified by one or more starting codeword indexes.

6. The method of claim 3, wherein the one or more codeword-level bitmaps identify one or more groups of codewords.

7. The method of claim 2, wherein transmitting the frame to the second WLAN device is based, at least in part, on the one or more bitmaps included in the H-BA message.

8. The method of claim 1, wherein the first feedback message is an H-BA message having a multi-station Block ACK (M-BA) frame format, the M-BA frame format including a first indicator to indicate the first feedback message is the H-BA message.

9. The method of claim 8, wherein the M-BA frame format includes a BA information field, the BA information field including at least the first indicator and one or more codeword-level bitmaps of the H-BA message.

10. The method of claim 9, wherein the BA information field includes one or more BA control fields and each of the one or more BA control fields includes the first indicator.

11. An apparatus of a first wireless local area network (WLAN) device, comprising:
one or more interfaces configured to:
transmitting a first hybrid automatic repeat request (HARQ) (HARQ) frame to a second WLAN device; and
one or more processors configured to:
receive, in response to the first HARQ frame, a first feedback message from the second WLAN device that indicates whether to enable a HARQ protocol or a non-HARQ protocol; and
the one or more interfaces configured to:
transmit a frame to the second WLAN device based at least in part on the first feedback message, the frame being a second HARQ frame if the first feedback message indicates to enable the HARQ protocol and the frame being a non-HARQ frame if the first feedback message indicates to enable the non-HARQ protocol.

12. The apparatus of claim 11, wherein the first feedback message is a HARQ Block Acknowledgement (H-BA) message and includes one or more bitmaps.

13. The apparatus of claim 12, wherein the one or more bitmaps of the H-BA message include at least one of:
one or more codeword-level bitmaps; and
one or more media access control protocol data units (MPDU)-level bitmaps.

14. The apparatus of claim 13, wherein:
the one or more codeword-level bitmaps provide a receive status of codewords associated with the first HARQ frame; and
the one or more MPDU-level bitmaps provide a receive status of MPDUs.

15. The apparatus of claim 14, wherein codewords of each of the one or more codeword-level bitmaps are identified by one or more starting codeword indexes.

16. The apparatus of claim 14, wherein the one or more codeword-level bitmaps identify one or more groups of codewords.

17. An apparatus of a second wireless local area network (WLAN) device, comprising:
one or more interfaces configured to:
receive a first hybrid automatic repeat request (HARQ) frame from a first WLAN device; and
one or more processors configured to:
determine whether to enable a HARQ protocol or a non-HARQ protocol based at least in part on the first HARQ frame; and
the one or more interfaces configured to:
transmit a first feedback message to the first WLAN device that indicates whether to enable the HARQ protocol or the non-HARQ protocol.

18. The apparatus of claim 17, wherein the first feedback message is a HARQ Block Acknowledgement (H-BA) message.

19. The apparatus of claim 18, wherein the H-BA message includes at least one of:
one or more codeword-level bitmaps; and
one or more media access control protocol data units (MPDU) level bitmaps.

20. The apparatus of claim 18, wherein the one or more processors are configured to:
determine to generate the H-BA message based, at least in part, on
a determination that at least a portion of codewords associated with the first HARQ frame were successfully received and a remaining portion of the codewords were unsuccessfully received, and
a determination to enable the HARQ protocol.

\* \* \* \* \*